(12) United States Patent
Deering et al.

(10) Patent No.: US 6,795,076 B2
(45) Date of Patent: Sep. 21, 2004

(54) GRAPHICS SYSTEM WITH REAL-TIME CONVOLVED PIXEL READBACK

(75) Inventors: Michael F. Deering, Los Altos, CA (US); Nathaniel David Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 351 days.

(21) Appl. No.: 09/894,068

(22) Filed: Jun. 28, 2001

(65) Prior Publication Data

US 2003/0011609 A1 Jan. 16, 2003

(51) Int. Cl.[7] .............................................. G06F 15/16
(52) U.S. Cl. ...................... 345/502; 345/520; 345/506
(58) Field of Search .................................. 345/501, 520, 345/502, 506, 536–538, 558, 418, 419

(56) References Cited

U.S. PATENT DOCUMENTS

| | | | |
|---|---|---|---|
| 6,100,899 A | | 8/2000 | Ameline et al. |
| 2002/0000988 A1 | * | 1/2002 | Nelson et al. ............. 345/443 |
| 2003/0122815 A1 | * | 7/2003 | Deering .................... 345/419 |

OTHER PUBLICATIONS

"OpenGL Reference Manual", 1992, pp. 252–256.
Thermal Performer Webpage www.dorbie.com/thermal.html, 1998, 5 pages.
SGIX Webpage http://oss.sgi.com/projects/ogl-sample/registry/SGIX/async-pixel.txt, 1998, 4 pages.

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A graphics system comprising a control unit and a series of calculation units coupled together in a closed chain by a segmented communication bus. The calculation unit collaboratively generate one or more video signals. Each calculation unit is programmably assigned to contribute its locally-generated pixels to one of the video streams. The control unit sends a frame readback request to a selected one of the calculation units through the segmented communication bus. The frame readback request specifies some subset of the pixels in one of the video streams for readback to the control unit. In response to the frame readback request, the selected calculation unit transmits the subset of pixels of the specified video stream to the control unit, and the control unit forwards the subset of pixels to a target memory block (e.g. in system memory of a host computer or memory within the graphics system).

27 Claims, 32 Drawing Sheets

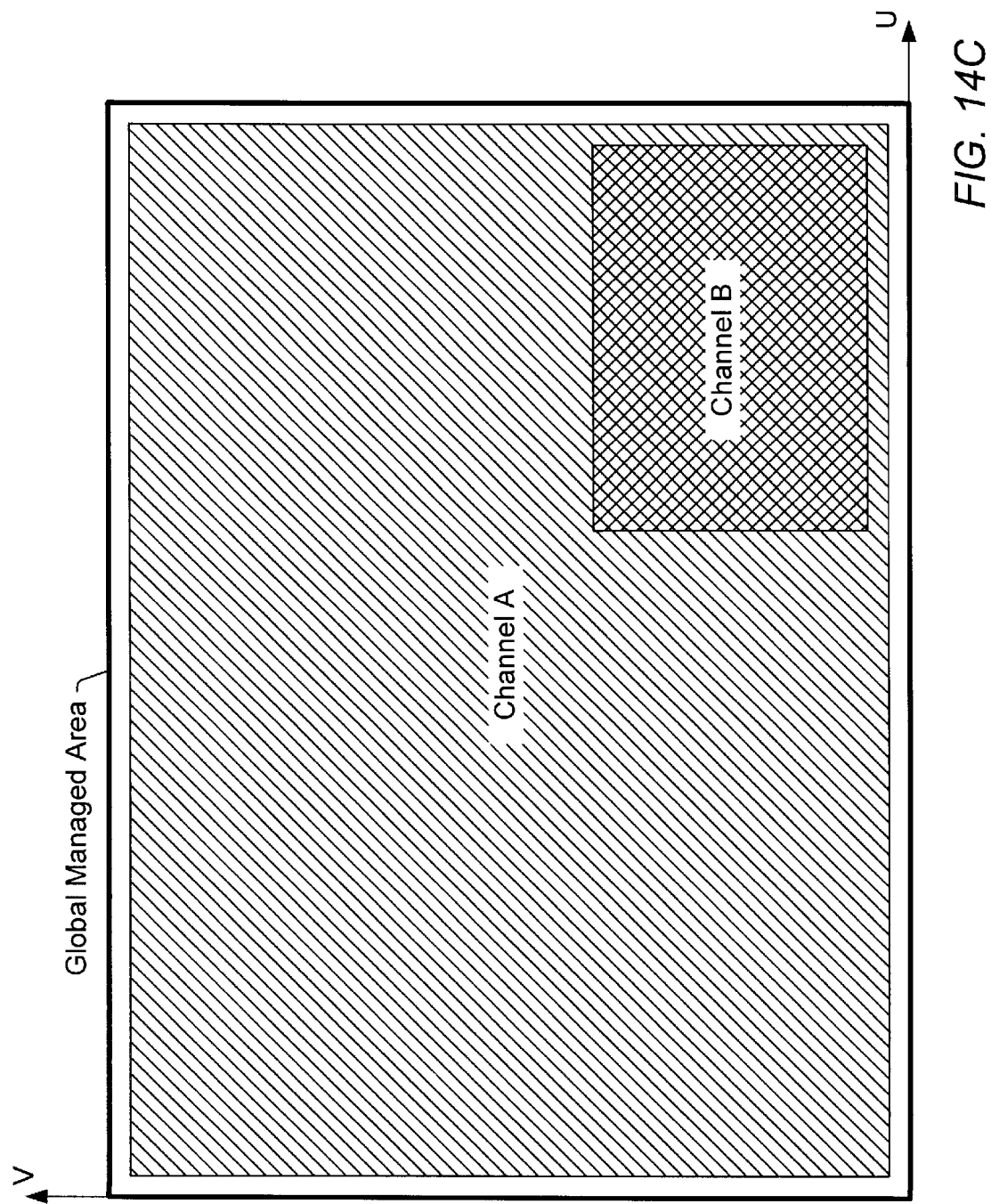

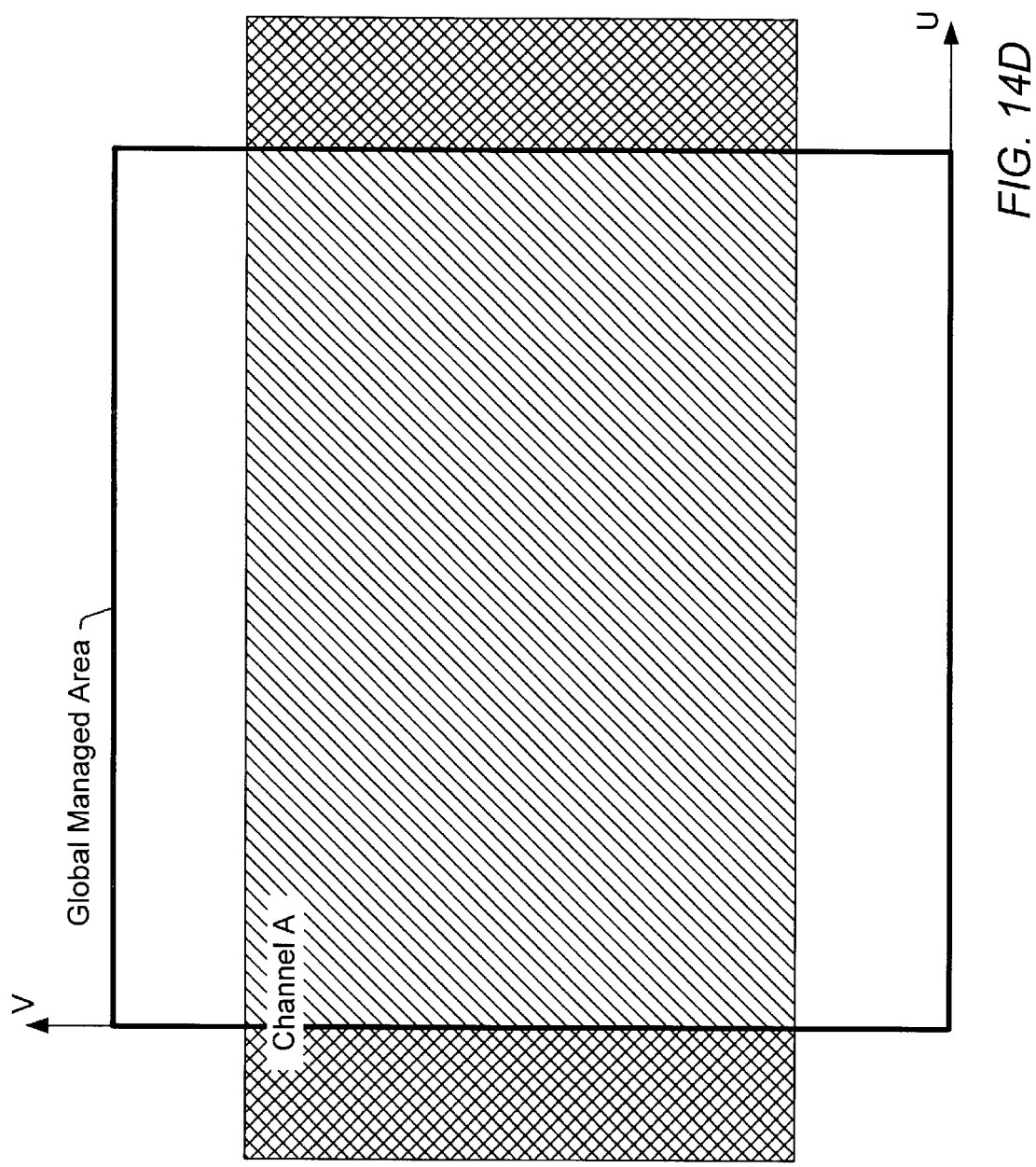

GRAPHICS SYSTEM WITH REAL-TIME CONVOLVED PIXEL READBACK

BACKGROUND OF THE INVENTION

1. Field of the Invention

This invention relates generally to the field of computer graphics and, more particularly, to a flexible system architecture for generating video signals in a graphics environment.

2. Description of the Related Art

A computer system may be used to drive one or more display devices (such as monitors or projectors). The computer system may provide analog or digital video signals to drive the display devices. The computer system may include a graphics system for the rendering and display of 2D graphics and/or 3D graphics. The graphics system may supply the video signals which drive the display devices. In addition, the computer system may include a system unit, and input devices such as a keyboard, mouse, etc.

In general, prior art graphics systems do not have a scalable video architecture, i.e. they are not able to flexibly allocate hardware resources in proportion to the number of video signals to be generated and the respective pixel bandwidths of the video signals. Thus, graphics consumers are often forced to use a more powerful, and thus, more expensive graphics system than would be optimal for a given graphics scenario. Thus, there exists a need for a graphics system which could flexibly allocate hardware resources to video signals in proportion to their respective pixel bandwidths.

Furthermore, prior art graphics systems typically do not provide a mechanism enabling multiple hardware devices (e.g. graphics boards) to collaborate in generating one or more video signals. Thus, graphics consumers may be forced into the inefficient mode of using one hardware device (e.g. one graphics board) per video signal. In this case, some or all of the graphics boards may operate at significantly less than maximum capacity. Therefore, there exists a need for a graphics system and methodology which could enable multiple hardware devices to collaborate in the generation of one or more video signals.

For many reasons, users of a graphics system often desire to capture into system memory (or some other memory) one or more frames of video generated by the graphics system. Thus, more particularly, there exists a need for a graphics system configured to collaboratively generate one or more video signals and simultaneously transfer selected frames (or portions of frames) to a selected memory destination.

SUMMARY OF THE INVENTION

In one set of embodiments, a graphics system may be configured to (a) generate one or more video signals in response to received graphics data and (b) transfer to a desired target memory selected frames (or portions of frames) of a selected one of the video signals. The graphics system may comprise a control unit and a series of calculation units. The control unit is configured for coupling to a host computer though an interconnecting bus. The series of calculation units may be configured to generate the one or more video streams in response to sample data accessed from a sample buffer.

Each of the calculation units in the series may be programmably assigned to generate image pixels for a portion (e.g. a rectangular region) of one of the video streams. Each calculation unit contributes its locally generated image pixels to its assigned video stream. Thus, a video stream gradually matures from a null stream of dummy pixels to a completed video stream as it passes through successive calculation units.

A segmented communication bus comprising multiple bus segments couples the control unit and the calculation units in a closed chain configuration. Data may flow around the chain in one direction. Thus, the data interface between successive elements in the chain (i.e. the control unit and the calculation units) may have a simple structure.

The control unit may receive a get frame request from the host computer through the interconnecting bus. The get frame request may specify (a) one of the calculation units which is to source a transfer of video pixels, (b) a target block in a target memory which is serve as the destination of the pixel transfer, (c) one of the video streams from which the video pixels are to be taken, and (d) a subset of the specified video stream from which video pixels are to be taken. The control unit transmits a frame readback request to the selected calculation unit, i.e. the calculation unit selected in (a), through the segmented communication bus. The frame readback request may include an indication of selected video stream and the selected video pixel subset. The selected subset of the selected video stream may be a rectangular window in a frame of the selected video stream. In one embodiment, the selected subset is a rectangular window in the "next frame", i.e. the frame immediately following the get frame request. It should be noted that according to standard mathematical usage, a subset Y of a set X may equal X or something less than X. Thus, the selected subset may comprise the whole of the next frame.

In response to receiving the frame readback request, the selected calculation unit may transfer the selected subset of the selected video stream to the control unit through the segmented communication bus. The control unit forwards the selected subset of video pixels to the target block in the target memory. The target memory may be the system memory of the computer. In some embodiments, the target memory may also be a memory resident within the graphics system. The control unit may include a DMA engine to facilitate the video pixel transfer within host CPU intervention.

In some embodiments, the segmented communication bus also supports read and write transactions from/to memory locations (e.g. control registers, data tables, etc.) in the calculation units. Thus, a host application executing on the host computer may control the state of any or all of the calculation units by writing to calculation units through the control unit and segmented communication bus. Also, the host application may read memory locations in any of the calculation unit through the segmented communication bus. This read mechanism may be used to gather debug data or collect operational statistics from the calculation units.

BRIEF DESCRIPTION OF THE DRAWINGS

The foregoing, as well as other objects, features, and advantages of this invention may be more completely understood by reference to the following detailed description when read together with the accompanying drawings in which:

FIG. 14C illustrates a situation where the channel B subregion is entirely contained within the channel B subregion;

FIG. 14D illustrates a situation where the channel A subregion extends outside the global managed area;

Figure 1:
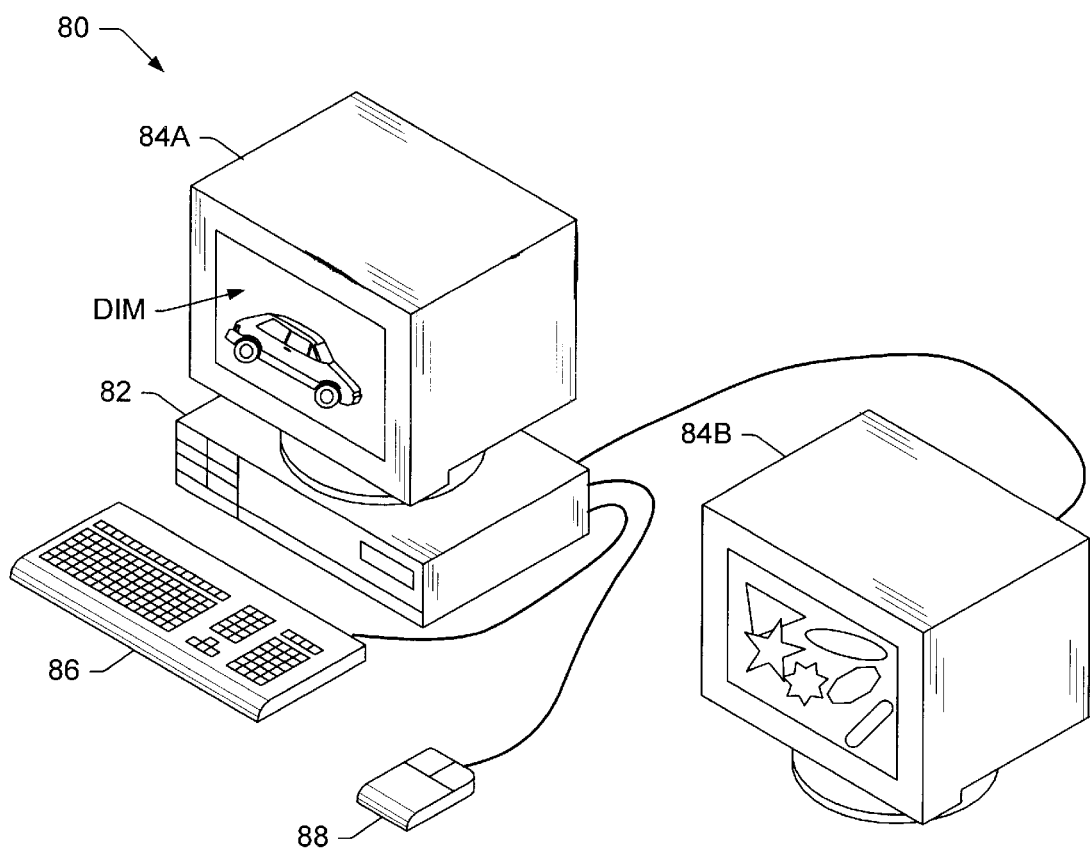
FIG. 1 illustrates one embodiment of a computer system which includes a graphics system 112 according to the present invention for driving one or more display devices.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

FIG. 1 illustrates one embodiment of a computer system 80 which performs three-dimensional (3-D) graphics according to the present invention. Computer system 80 comprises a system unit 82 which may couple to one or more display devices such as display devices 84A and 84B. The display devices may be realized by any of a variety of display technologies. For example, the display devices may utilize CRT, LCD, gas-plasma, digital micromirror, or LCOS technology, or any combination thereof. System unit 82 may control an arbitrary number of display devices. However, only two display devices are shown for convenience. The display devices may include projection devices, head mounted displays, monitors, etc.

System unit 82 may also couple to various input devices such as a keyboard 86, a mouse 88, a video camera, a trackball, a digitizing tablet, a six-degree of freedom input device, a head tracker, an eye tracker, a data glove, body sensors, etc. Application software may be executed by computer system 80 to display 3-D graphical objects on display devices 84A and/or 84B.

Figure 2A:
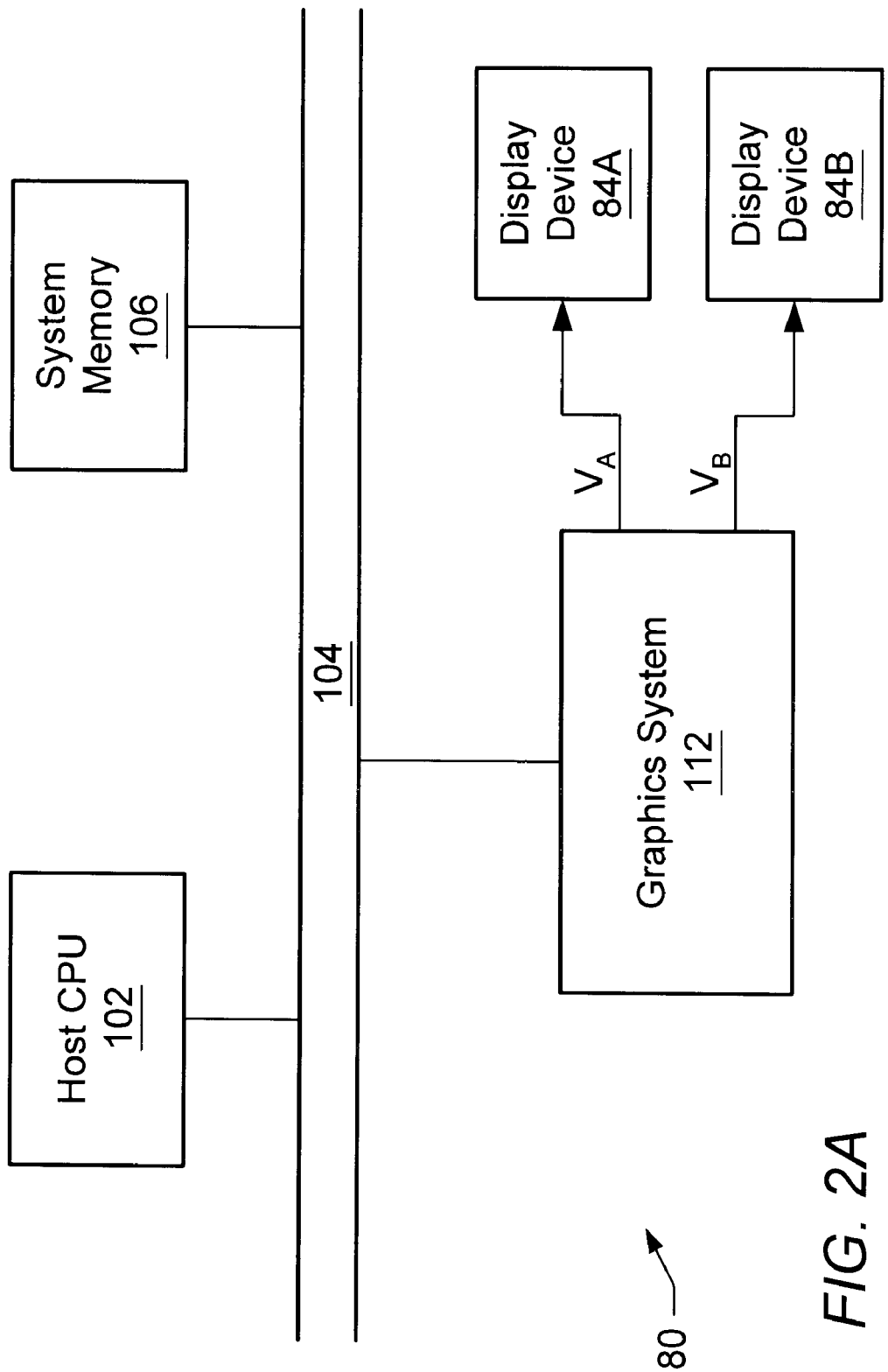
FIG. 2A is a simplified block diagram of the computer system of FIG. 1.

FIG. 2A presents a simplified block diagram for one embodiment of computer system 80. Computer system 80 comprises a host central processing unit (CPU) 102 and a 3-D graphics system 112 coupled to system bus 104. A system memory 106 may also be coupled to system bus 104. Other memory media devices such as disk drives, CD-ROMs, tape drives, etc. may be coupled to system bus 104.

Host CPU 102 may be realized by any of a variety of processor technologies. For example, host CPU 102 may comprise one or more general purpose microprocessors, parallel processors, vector processors, digital signal processors, etc., or any combination thereof. System memory 106 may include one or more memory subsystems representing different types of memory technology. For example, system memory 106 may include read-only memory (ROM) and/or random access memory (RAM)—such as static random access memory (SRAM), synchronous dynamic random access memory (SDRAM) and/or Rambus dynamic access memory (RDRAM).

System bus 104 may comprise one or more communication buses or host computer buses (for communication between host processors and memory subsystems). In addition, various peripheral devices and peripheral buses may be connected to system bus 104.

In one set of embodiments, graphics system 112 is configured to generate up to two video signals. Graphics system 112 may comprise one or more graphics boards (also referred to herein as graphics pipelines) configured according to the principles of the present invention. The graphics boards may be coupled together in a linear chain as suggested by FIG. 2B, and may collaborate in the generation of video signals $V_A$ and $V_B$. Video signals $V_A$ and $V_B$ drive display devices 84A and 84B respectively. The number R of graphics boards comprising graphics system 112 may be chosen to match the combined pixel input bandwidth required by display devices 84A and 84B. The graphics boards may also couple to system bus 104 (e.g. by crossbar switches or any other type of bus connectivity logic). The first graphics board in the linear chain is denoted GB(0), and the generic $K^{th}$ graphics board in the linear chain is denoted GB(K).

It is noted the graphics boards may be programmed to allocate all their processing resources to the generation of a single video signal when needed or desired. For example, some users/customers may have a single high bandwidth display device. In this situation, all the graphics boards in graphics system 112 may be dedicated to one video channel, e.g. the channel which drives video signal $V_A$.

In one embodiment, host CPU 102 may transfer data to and/or receive data from each graphics board GB(K) according to a programmed input/output (I/O) protocol over system bus 104. In a second embodiment, each graphics board GB(K) may access system memory 106 according to a direct memory access (DMA) protocol or through intelligent bus-mastering. In yet another embodiment, the graphics boards may be coupled to system memory 106 through a direct port, such as an Advanced Graphics Port (AGP) promulgated by Intel Corporation.

One or more graphics applications conforming to an application programming interface (API) such as OpenGL® or Java 3D™ may execute on host CPU 102. The graphics application(s) may control a scene composed of geometric objects in a world coordinate system. Each object may comprise a collection of graphics primitives (e.g. triangles). The graphics application may compress the graphics primitives, and transfer the compressed graphics data to one or more of the graphics boards GB(0), GB(1), GB(2), ..., GB(R−1).

The first graphics board GB(0) generates digital video streams $X_0$ and $Y_0$. The second graphics board GB(1) receives digital video streams $X_0$ and $Y_0$ from the first graphics board GB(0), and transmits digital video streams $X_1$ and $Y_1$ to the third graphics board GB(2). In general, graphics board GB(K), for K between 1 and (R−2) inclusive, receives digital video streams $X_{K-1}$ and $Y_{K-1}$ from a previous graphics board GB(K−1), and transmits digital video streams $X_K$ and $Y_K$ to a next graphics board GB(K+1).

Each graphics board is responsible for filling in a portion of first video signal $V_A$ and/or the second video signal $V_B$. Thus, each digital video stream $X_K$ may be more "filled in" than its predecessor $X_{K-1}$. The same observation holds for the digital video streams $Y_0, Y_1, \ldots, Y_{R-1}$. The last graphics board GB(R−1) receives digital video streams $X_{R-2}$ and $Y_{R-2}$ from the next-to-last graphics board GB(R−2), and generates digital video streams $X_{R-1}$ and $Y_{R-1}$. In addition to filling in the pixels for which it is responsible, the last graphics board GB(R−1) converts the digital video streams $X_{R-1}$ and $Y_{R-1}$ into analog video signals $V_A$ and $V_B$ respectively for presentation to display devices 84A and 84B respectively. Thus, the last graphics board GB(R−1) includes D/A conversion hardware. In one embodiment, the graphics boards are interchangeable, and thus, each of the graphics boards includes D/A conversion hardware. It is noted that display device 84A and/or 84B may be configured to receive digital video data, in which case the D/A conversion may be bypassed.

It is noted that the graphics boards comprising 3-D graphics system 112 may couple to one or more busses of various types in addition to system bus 104. Furthermore, some or all of the graphics boards may couple to a communication port, and thereby, directly receive graphics data from an external source such as the Internet or a local area network.

Graphics boards may receive graphics data from any of various sources including: host CPU 102, system memory 106 or any other memory, external sources such as a local area network, or a broadcast medium (e.g. television). While graphics system 112 is depicted as part of computer system 80, graphics system 112 may also be configured as a stand-alone device.

Graphics system 112 may be comprised in any of various systems, including a network PC, a gaming play-station, an Internet appliance, a television (including an HDTV system or an interactive television system), or other devices which display 2D and/or 3D graphics.

Figure 3:
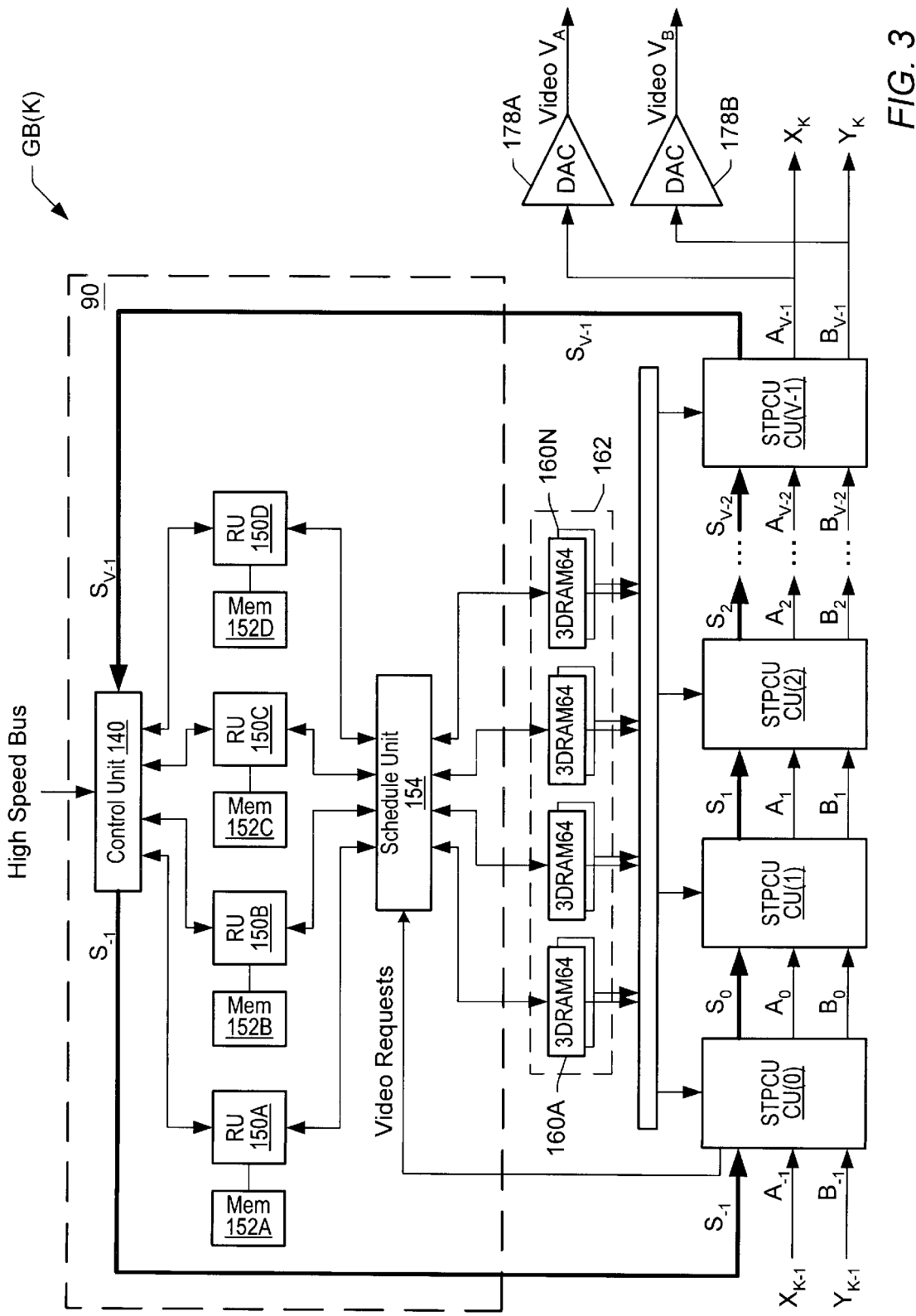
FIG. 3 illustrates one embodiment of a graphics board according to the present invention.

FIG. 3: Graphics Board GB(K)

FIG. 3 presents a block diagram for one embodiment of generic graphics board GB(K) for K=0, 1, 2, ..., R−1. Graphics board GB(K) may comprise a graphics processing unit (GPU) 90, a super-sampled sample buffer 162, and one or more sample-to-pixel calculation units CU(0) through CU(V−1). Graphics board GB(K) may also comprise two digital-to-analog converters (DACs) 178A and 178B.

Graphics processing unit 90 may comprise any combination of processor technologies. For example, graphics processing unit 90 may comprise specialized graphics processors or calculation units, multimedia processors, DSPs, general purpose processors, programmable logic, reconfigurable logic, discrete logic, or any combination thereof. In addition, graphics processing unit 90 may comprise a control unit 140, one or more rendering units such as rendering units 150A–D, one or more data memories such as data memories 152A–D, and one or more schedule units such as schedule unit 154. Sample buffer 162 may comprise one or more sample memories 160A–160N.

Graphics board GB(K) may include two digital video input ports for receiving digital video streams $X_{K-1}$ and $Y_{K-1}$ (e.g. from a previous graphics board GB(K−1) in the linear chain of graphics boards). Similarly, graphics board GB(K) may include two digital video output ports for transmitting digital video streams $X_K$ and $Y_K$ to the next graphics board GB(K+1) in cases where graphics board GB(K) is not the last graphics board in the linear chain.

The principles described herein for the configuration of a two-channel graphics board naturally generalize to an arbitrary number of video channels. The present invention contemplates a graphics board GB(K) which supports L video channels, where L is any positive integer. Thus, graphics board GB(K) may have L input ports and L output ports, L digital-to-analog converters, etc. The parameter L is limited by fundamental design constraints such as cost, maximum power consumption, maximum board area, etc.

A. Control Unit 140

Control unit 140 operates as the interface between graphics board GB(K) and computer system 80 by controlling the transfer of data between graphics board GB(K) and computer system 80. In embodiments of graphics board GB(K) that comprise two or more rendering units 150A–D, control unit 140 may also partition the stream of data received from computer system 80 into a corresponding number of sub-streams that are routed to the individual rendering units 150A–D. The graphics data may be received from computer system 80 in a compressed form. Graphics data compression may advantageously reduce the data traffic between computer system 80 and graphics board GB(K). In one embodiment, control unit 140 may be configured to split and route the received data stream to rendering units 150A–D in compressed form.

The graphics data may comprise one or more graphics primitives. As used herein, the term graphics primitive includes polygons, parametric surfaces, splines, NURBS (non-uniform rational B-splines), sub-division surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996.

It is noted that the embodiments and examples of the invention presented herein are described in terms of polygons for the sake of simplicity. However, any type of graphics primitive may be used instead of or in addition to polygons in these embodiments and examples.

Control unit 140 communicates with sample-to-pixel calculation units CU through a segmented communication bus SCB. The segmented communication bus comprises segments $S_{-1}, S_0, S_1, S_2, \ldots, S_{V-1}$. Control unit 140 couples to sample-to-pixel calculation unit CU(0) through the first segment $S_{-1}$ and to sample-to-pixel calculation unit CU(V−1) through the last segment $S_{V-1}$. Control unit 140 writes data to and reads data from the sample-to-pixel calculation units CU through the segmented communication bus. Control unit 140 and sample-to-pixel calculation units CU are coupled by the bus segments $S_{-1}, S_0, S_1, S_2, \ldots, S_{V-1}$ of the segmented communication bus in a closed chain configuration.

In a normal operational mode, control unit 140 is the bus master for read and write operations occurring on the segmented communication bus. Control unit 140 asserts data targeted for one of the sample-to-pixel calculation units onto the first segment $S_{-1}$. Each sample-to-pixel calculation unit CU(K) receives the data from its input segment $S_{K-1}$ and forwards the data onto its output segment $S_K$ until the data reaches the targeted sample-to-pixel calculation unit. (In one set of embodiments, each transmitted data packet may comprise a header with identification information that designates the targeted sample-to-pixel calculation unit.) In this fashion, control unit 140 may write to memory locations (e.g. registers, tables) in any or all of the sample-to-pixel calculation units.

In addition, control unit 140 may read from memory locations in any or all of the sample-to-pixel calculation units. Control unit 140 may send a read request signal to a sample-to-pixel calculation unit CU(K), where K takes any value in the range from zero to V−1 inclusive, requesting read access from a memory location in the memory space of the sample-to-pixel calculation unit. The sample-to-pixel calculation unit CU(K) asserts the requested data onto its output segment $S_K$. Each succeeding sample-to-pixel calculation unit CU(K+j) receives the requested data from its input segment $S_{K+j-1}$ and forwards the requested data onto its output segment $S_{K+j}$. Control unit 140 reads the requested data from the last segment $S_{V-1}$.

Control unit 140 may be further configured to assist in the transfer of video pixels (corresponding to a selected video channel) from one of the sample-to-pixel calculation units to system memory 106. In one set of embodiments, control unit 140 may receive a GET FRAME request from host software (e.g. from the user application and/or from a system software routine that interprets a higher level command asserted by the user application) via system bus 104. In response to the GET FRAME request, control unit 140 may send a FRAME READBACK request to a designated one of the sample-to-pixel calculation units. The FRAME READBACK request induces the designated sample-to-pixel calculation unit to transfer a frame (or a portion of a frame) of pixel data to control unit 140 through the segmented communication bus. Control unit 140 forwards the pixel data to a buffer in system memory 106. Control unit 140 preferably includes a DMA engine (i.e. a DMA controller) to facilitate the transfer of the pixel data to system memory without host CPU intervention.

B. Rendering Units

Rendering units 150A–D (also referred to herein as draw units) are configured to receive graphics instructions and data from control unit 140 and then perform a number of functions which depend on the exact implementation. For example, rendering units 150A–D may be configured to perform decompression (if the received graphics data is presented in compressed form), transformation, clipping, lighting, texturing, depth cueing, transparency processing, set-up and virtual screen rendering of various graphics primitives occurring within the graphics data. Rendering units 150A–D are intended to represent an arbitrary number of rendering units. Each rendering unit 150 may include a high performance processor (e.g., a specialized graphics processor, a multimedia processor, a digital signal processor, or a general purpose processor). In one embodiment, each of rendering units 150 may include (a) a high-performance processor for performing decompression, format conversion, transformation and lighting operations and (b) a dedicated ASIC chip for performing screen space setup, screen space rasterization and sample rendering.

The graphics data received by each of rendering units 150A–D may be decompressed into a stream of graphics "primitives" which may then be rendered. The term primitive refers to components of objects that define its shape (e.g., points, lines, triangles, polygons in two or three dimensions, polyhedra, or free-form surfaces in three dimensions).

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gouraud, or Phong), lighting may be evaluated at a number of different locations. For example, if constant shading is used (i.e., each pixel of a polygon has the same lighting), then the lighting need only be calculated once per polygon. If Gouraud shading is used, then the lighting is calculated once per vertex.

Clipping refers to the elimination of graphics primitives or portions of graphics primitives that lie outside of a 3-D view volume in world space. The 3-D view volume may represent that portion of world space that is visible to a virtual observer situated in world space. For example, the view volume may be a solid truncated pyramid generated by a 2-D view window and a viewpoint located in world space. The solid truncated pyramid may be imagined as the union of all rays emanating from the viewpoint and passing through the view window. The viewpoint may represent the world space location of the virtual observer. Primitives or portions of primitives that lie outside the 3-D view volume are not currently visible and may be eliminated from further processing. Primitives or portions of primitives that lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport that may be more convenient for clipping against.

Generally, set-up refers to computations necessary to prepare for sample value computations (e.g., calculating triangle edge slopes and/or coefficients for triangle plane equations and initial pixel positions).

Graphics primitives or portions of primitives which survive a clipping computation may be projected onto a 2-D viewport. Instead of clipping in 3-D, graphics primitives may be projected onto a 2-D view plane (which includes the 2-D viewport) and then clipped with respect to the 2-D viewport.

Virtual screen rendering refers to calculations that are performed to generate samples for projected graphics primitives. For example, the vertices of a triangle in 3-D may be projected onto the 2-D viewport. The projected triangle may be populated with samples, and values (e.g. red, green, blue and z values) may be assigned to the samples based on the corresponding values already determined for the projected vertices. (For example, the red value for each sample in the projected triangle may be interpolated from the known red values of the vertices.) These sample values for the projected triangle may be stored in sample buffer 162. A virtual image accumulates in sample buffer 162 as successive primitives are rendered. Thus, the 2-D viewport is said to be a virtual screen on which the virtual image is rendered. The sample values comprising the virtual image are stored into sample buffer 162. Points in the 2-D viewport are described in terms of virtual screen coordinates x and y, and are said to reside in "virtual screen space". See FIG. 4 for an illustration of the two-dimensional viewport 420 populated with samples.

When the virtual image is complete, e.g., when all graphics primitives corresponding to a frame have been rendered, sample-to-pixel calculation units CU(0) through CU(V−1) may read the rendered samples from sample buffer 162, and filter the samples to generate pixel values. Each sample-to-pixel calculation unit CU(J) may be assigned a region of the virtual screen space, and may operate on samples corresponding to the assigned region. It is generally advantageous for the union of these regions to cover 2-D viewport 420 to minimize waste of rendering bandwidth. Sample-to-pixel calculation units CU(0) through CU(V−1) may operate in parallel.

In the embodiment of graphics board GB(K) shown in FIG. 3, rendering units 150A–D calculate sample values instead of pixel values. This allows rendering units 150A–D to perform super-sampling, i.e. to calculate more than one sample per pixel. Super-sampling in the context of the present invention is discussed more thoroughly below. More details on super-sampling are discussed in the following books:

"Principles of Digital Image Synthesis" by Andrew S. Glassner, 1995, Morgan Kaufinan Publishing (Volume 1);

The Renderman Companion" by Steve Upstill, 1990, Addison Wesley Publishing; and

"Advanced Renderman: Beyond the Companion" by Anthony A. Apodaca.

Sample buffer 162 may be double-buffered so that rendering units 150A–D may write samples for a first virtual image into a first portion of sample buffer 162, while a second virtual image is simultaneously read from a second portion of sample buffer 162 by sample-to-pixel calculation units CU.

C. Data Memories

Each of rendering units 150A–D may be coupled to a corresponding one of instruction and data memories 152A–D. In one embodiment, each of memories 152A–D may be configured to store both data and instructions for a corresponding one of rendering units 150A–D. While implementations may vary, in one embodiment, each data memory 152A–D may comprise two 8 MByte SDRAMs, providing a total of 16 MBytes of storage for each of rendering units 150A–D. In another embodiment, RDRAMs (Ram-bus DRAMs) may be used to support the decompression, transformation and lighting operations of each rendering unit, while SDRAMs may be used to support the texturing and sample-fill operations of each rendering unit. Data memories 152A–D may also be referred to as texture and render memories 152A–D.

D. Schedule Unit

Schedule unit 154 may be coupled between rendering units 150A–D and sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by rendering units 150A–D. As used herein, the term "sample buffer" refers to one or more memories which store samples. As previously noted, samples may be filtered to form each output pixel value. Output pixel values may be provided to display device 84A and/or display device 84B.

Sample buffer 162 may be configured to support super-sampling, critical sampling, or sub-sampling with respect to pixel resolution. In other words, the average distance between samples ($X_k$, $Y_k$) may be smaller than, equal to, or larger than the average distance between pixel centers in virtual screen space. Furthermore, because the convolution kernel C(X,Y) may take non-zero functional values over a neighborhood which spans several pixel centers, a single sample may contribute to several output pixel values.

Sample memories 160A–160N may comprise any of various types of memories (e.g., SDRAMs, SRAMs, RDRAMs, 3DRAMs, or next-generation 3DRAMs) in varying sizes. In one embodiment, each schedule unit 154 is coupled to four banks of sample memories, where each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel. 3DRAM-64 memories are specialized memories configured to support full internal double buffering with single buffered Z in one chip. The double buffered portion comprises two RGBX buffers, where X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories which may soon be available from Mitsubishi Electric Corporation's Semiconductor Group. In one embodiment, 32 chips used in combination are sufficient to create a double-buffered 1280×1024 super-sampled sample buffer with eight samples per pixel.

Since the 3DRAM-64 memories are internally double-buffered, the input pins for each of the two frame buffers in the double-buffered system are time multiplexed (using multiplexers within the memories). The output pins may be similarly time multiplexed. This allows reduced pin count while still providing the benefits of double buffering. 3DRAM-64 memories further reduce pin count by not having z output pins. Since z comparison and memory buffer selection are dealt with internally, use of the 3DRAM-64 memories may simplify the configuration of sample buffer 162. For example, sample buffer 162 may require little or no selection logic on the output side of the 3DRAM-64 memories. The 3DRAM-64 memories also reduce memory bandwidth since information may be written into a 3DRAM-64 memory without the traditional process of reading data out, performing a z comparison or blend operation, and then writing data back in. Instead, the data may be simply written into the 3DRAM-64 memory, with the memory performing the steps described above internally.

However, in other embodiments of graphics board GB(K), other memories (e.g., SDRAMs, SRAMs, RDRAMs, or current generation 3DRAMs) may be used to form sample buffer 162.

Graphics processing unit 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processing unit 90 determines which samples fall within the polygon based upon the sample positions. Graphics processing unit 90 renders the samples that fall within the polygon and stores rendered samples in sample memories 160A–N. Red, green, blue, alpha, z depth, and other per-sample values may also be calculated in the rendering process.

F. Sample-to-pixel Calculation Units

Sample-to-pixel calculation units CU(0) through CU(V-1) (collectively referred to as sample-to-pixel calculation units CU) may be coupled together in a linear succession as shown in FIG. 3. The first sample-to-pixel calculation unit CU(0) in the linear succession may be programmed to receive digital video streams $X_{K-1}$ and $Y_{K-1}$ from a previous graphics board GB(K-1), and the last sample-to-pixel calculation unit CU(V-1) in the linear succession may be programmed to transmit digital video streams $X_K$ and $Y_K$ to the next graphics board GB(K+1).

Figure 2B:
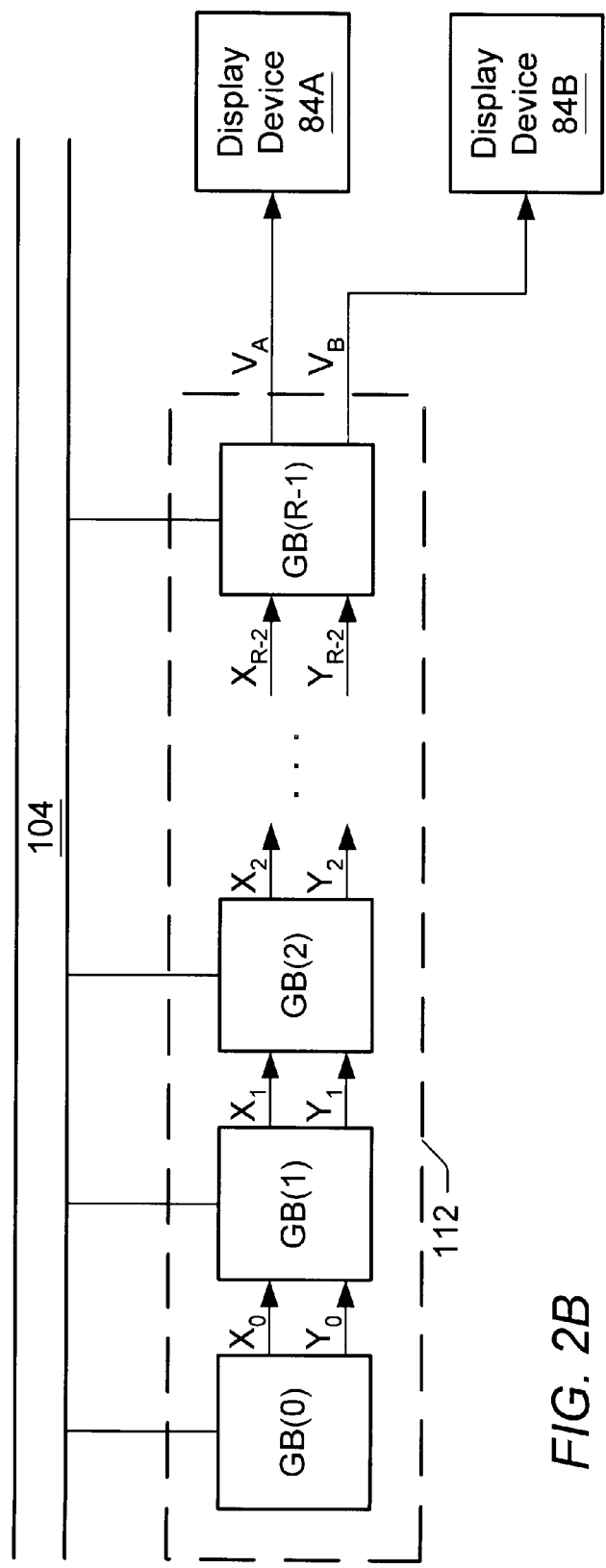
FIG. 2B illustrates one embodiment of graphics system 112 in which multiple graphics boards couple together in a linear chain and cooperatively generate two video streams for two display devices respectively.

If graphics board GB(K) is the first graphics board in the linear chain of graphics boards shown in FIG. 2B, first sample-to-pixel calculation unit CU(0) may be programmed to disable its input FIFOs since there is no previous board driving input signals $X_{K-1}$ and $Y_{K-1}$. If graphics board GB(K) is the last graphics board in the linear chain, the last sample-to-pixel calculation unit CU(V-1) may be programmed to provide the digital video streams $X_K$ and $Y_K$ to digital-to-analog conversion units 178A and 178B respectively.

In one alternative embodiment, the first graphics board in the linear chain of graphics boards may be configured to receive one or more video streams from one or more digital cameras. The video streams may be provided to input ports $X_{K-1}$ and $Y_{K-1}$.

In cases where J takes a value between 1 and V-2 inclusive, sample-to-pixel calculation unit CU(J) is configured to receive digital video input streams $A_{J-1}$ and $B_{J-1}$ from a previous sample-to-pixel calculation unit CU(J-1), and to transmit digital video output streams $A_J$ and $B_J$ to the next sample-to-pixel calculation unit CU(J+1). The first sample-to-pixel calculation CU(0) is configured to receive digital video streams $X_{K-1}$ and $Y_{K-1}$ from a previous graphics board GB(K-1), and to transmit digital video stream $A_0$ and $B_0$ to the second sample-to-pixel calculation unit CU(1). For notational uniformity, the digital video streams $X_{K-1}$ and $Y_{K-1}$ are also referred to as digital video streams $A_{-1}$ and $B_{-1}$ respectively. The last sample-to-pixel calculation unit CU(V-1) receives digital video streams $A_{V-2}$ and $B_{V-2}$ from the previous sample-to-pixel calculation unit CU(V-2), and generates digital video streams $X_K$ and $Y_K$ (which are also referred to herein as video streams $A_{V-1}$ and $B_{V-1}$). Sample-to-pixel calculation unit CU(V-1) may be programmed to supply the digital video streams $X_K$ and $Y_K$ to a next graphics board GB(K+1) and/or to DAC units 178A/178B.

Video streams $X_0, X_1, \ldots, X_{R-1}$ generated by the linear chain of graphics boards, and video streams $A_0, A_1, \ldots, A_{V-1}$ generated by the sample-to-pixel calculation units in each of the graphics boards are said to belong to video stream A. Similarly, video streams $Y_0, Y_1, \ldots, Y_{R-1}$ generated by the linear chain of graphics boards, and video streams $B_0, B_1, \ldots, B_{V-1}$ generated by the sample-to-pixel calculation units in each of the graphics boards are said to belong to video stream B.

As described above, rendering units 150A–D are configured to generate samples for graphics primitives, and to store the samples into sample buffer 162. As successive graphics primitives are rendered, a sampled virtual image accumulates in sample buffer 162. When the sampled virtual image is complete, i.e., when all graphics primitives corresponding to a frame have been rendered, each sample-to-pixel calculation unit CU(J) may access samples of the virtual image from sample buffer 162, and may filter the samples to generate pixel values. Each sample-to-pixel calculation unit CU(J) may operate on samples residing in a corresponding region of the virtual screen space. The region assigned to each sample-to-pixel calculation unit CU(J) may be programmed at system initialization time (and/or dynamically reprogrammed during system operation). Often, it is desirable for the union of the regions to cover 2-D viewport 420. Thus, the sample-to-pixel calculation units may partition the labor of transforming sample values into pixel values.

Sample-to-pixel calculation unit CU(J) may perform a spatial convolution of a portion of the sampled virtual image with respect to a convolution kernel C(x,y) to generate pixel values. For example, a red value $R_p$ for a pixel P may be computed at a location $(x_p,y_p)$ in virtual screen space based on the relation $$R_p = \frac{1}{E}\sum C(x_k - x_p, y_k - y_p)R(x_k, y_k),$$

where the summation is evaluated at samples $(x_k,y_k)$ in the vicinity of location $(x_p,y_p)$. Since convolution kernel C(x,y) is defined in a neighborhood of the origin, the displaced kernel $C(x-x_p, y-y_p)$ is defined only in a corresponding neighborhood of location $(x_p,y_p)$.

Figure 4:
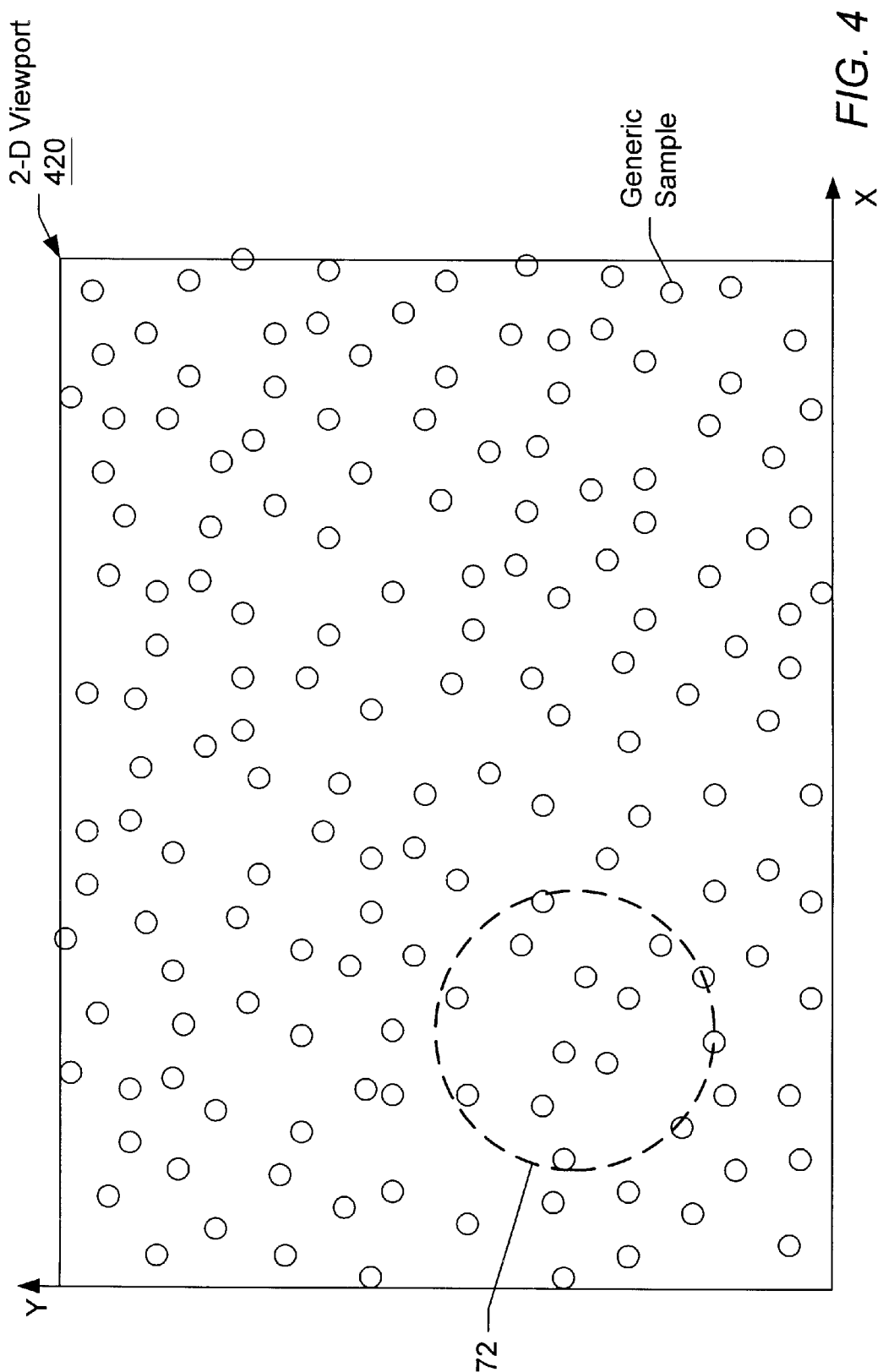
FIG. 4 illustrates a collection of samples representing a virtual image and populating a two-dimensional viewport 420.

The value E is a normalization value that may be computed according to the relation:

$$E=\Sigma C(x_k-x_p,y_k-y_p),$$

where the summation is evaluated for the same samples $(x_k,y_k)$ as in the red pixel value summation above. The summation for the normalization value E may be performed in parallel with the red pixel value summation. The location $(x_p,y_p)$ may be referred to herein as a virtual pixel center or virtual pixel origin. FIG. 4 shows the support 72 (i.e. footprint) of a convolution kernel. In this case, the virtual pixel center $(x_p,y_p)$ corresponds to the center of the support disk 72.

Similar summations may be performed to compute green, blue and alpha pixel values in terms of the green, blue and alpha sample values respectively. An adder tree may be employed to speed up the computation of such summations. Two or more adder trees may be employed in a parallel fashion, i.e. to concurrently perform two or more of the red, green, blue, alpha and normalization constant summations.

Sample-to-pixel calculation unit CU(J) mixes (e.g. blends or injects) the pixel values it computes into either video stream A or video stream B. The assignment of sample-to-pixel calculation unit CU(J) to video stream A or video stream B may be performed at system initialization time. For example, if sample-to-pixel calculation unit CU(J) has been assigned to video stream A, sample-to-pixel calculation unit CU(J) mixes its computed pixel values into video stream A, and passes video stream B unmodified to the next sample-to-pixel calculation unit CU(J+1), or next graphics board. In other words, sample-to-pixel calculation unit CU(J) mixes at least a subset of the dummy pixel values present in video stream $A_{J-1}$ with its locally computed pixel values. The resultant video stream $A_J$ is transmitted to the next sample-to-pixel calculation unit or graphics board.

In one embodiment, sample-to-pixel calculation units CU(J) may implement a super-sampled reconstruction band-pass filter to compute pixel values from samples stored in sample buffer 162. The support of the band-pass filter may cover a rectangular area in virtual screen space which is $M_p$ pixels high and $N_p$ pixels wide. Thus, the number of samples covered by the band-pass filter is approximately equal to $M_pN_pS$, where S is the number of samples per pixel region. A variety of values for $M_p$, $N_p$ and S are contemplated. For example, in one embodiment of the band-pass filter $M_p=N_p=5$. It is noted that with certain sample positioning schemes (see the discussion attending FIGS. 5A, 5B and 5C), the number of samples that fall within the filter support may vary as the filter center (i.e. the virtual pixel center) is moved in the virtual screen space.

In other embodiments, sample-to-pixel calculation units CU(J) may filter a selected number of samples to calculate an output pixel value. The selected samples may be multiplied by a spatial weighting function that gives weights to samples based on their position with respect to the filter center (i.e. the virtual pixel center).

Any of a variety of filters may be used either alone or in combination, e.g., the box filter, the tent filter, the cone filter, the cylinder filter, the Gaussian filter, the Catmull-Rom filter, the Mitchell-Netravali filter, the windowed sinc filter, or in general, any form of bandpass filter or any of various approximations to the sinc filter. Furthermore, the support of the filters used by sample-to-pixel calculation unit CU(J) may be circular, elliptical, rectangular (e.g. square), triangular, hexagonal, etc.

Sample-to-pixel calculation unit CU(J) may also be configured with one or more of the following features: color look-up using pseudo color tables, direct color, inverse gamma correction, and conversion of pixels to non-linear light space. Other features of sample-to-pixel calculation unit CU(J) may include programmable video timing generators, programmable pixel clock synthesizers, cursor generators, and crossbar functions.

G. Digital-to-analog Converters

Digital-to-analog converter (DAC) 178A receives digital video stream $X_K$ from last sample-to-pixel calculation unit CU(V−1), and converts digital video stream $X_K$ into an analog video signal $V_A$ for transmission to display device 84A. Similarly, DAC 178B receives digital video stream $Y_K$ from last sample-to-pixel calculation unit CU(V−1), and converts digital video stream $Y_K$ into an analog video signal $V_B$ for transmission to display device 84B. Digital-to-Analog Converters (DACs) 178A and 178B are collectively referred to herein as DACs 178. It is noted that DACs 178 may be disabled in all graphics boards except for the last graphics board GB(R−1) which is physically coupled to display devices 84A and 84B. See FIG. 2B.

In the preferred embodiment, last sample-to-pixel calculation unit CU(V−1) provides digital video stream $X_K$ to DAC 178A without an intervening frame buffer. Similarly, last sample-to-pixel calculation unit CU(V−1) provides digital video stream $Y_K$ to DAC 178B without an intervening frame buffer.

DAC 178A and/or DAC 178B may be bypassed or omitted completely in order to output digital pixel data in lieu of analog video signals. This may be useful where display devices 84A and/or 84B are based on a digital technology (e.g., an LCD-type display, an LCOS display, or a digital micro-mirror display).

It is noted that various embodiments of graphics board GB(K) are contemplated with varying numbers of render units and varying numbers of sample-to-pixel calculation units. Furthermore, alternative embodiments of graphics board GB(K) are contemplated for generating more than (or less than) two simultaneous video streams.

Figure 5:
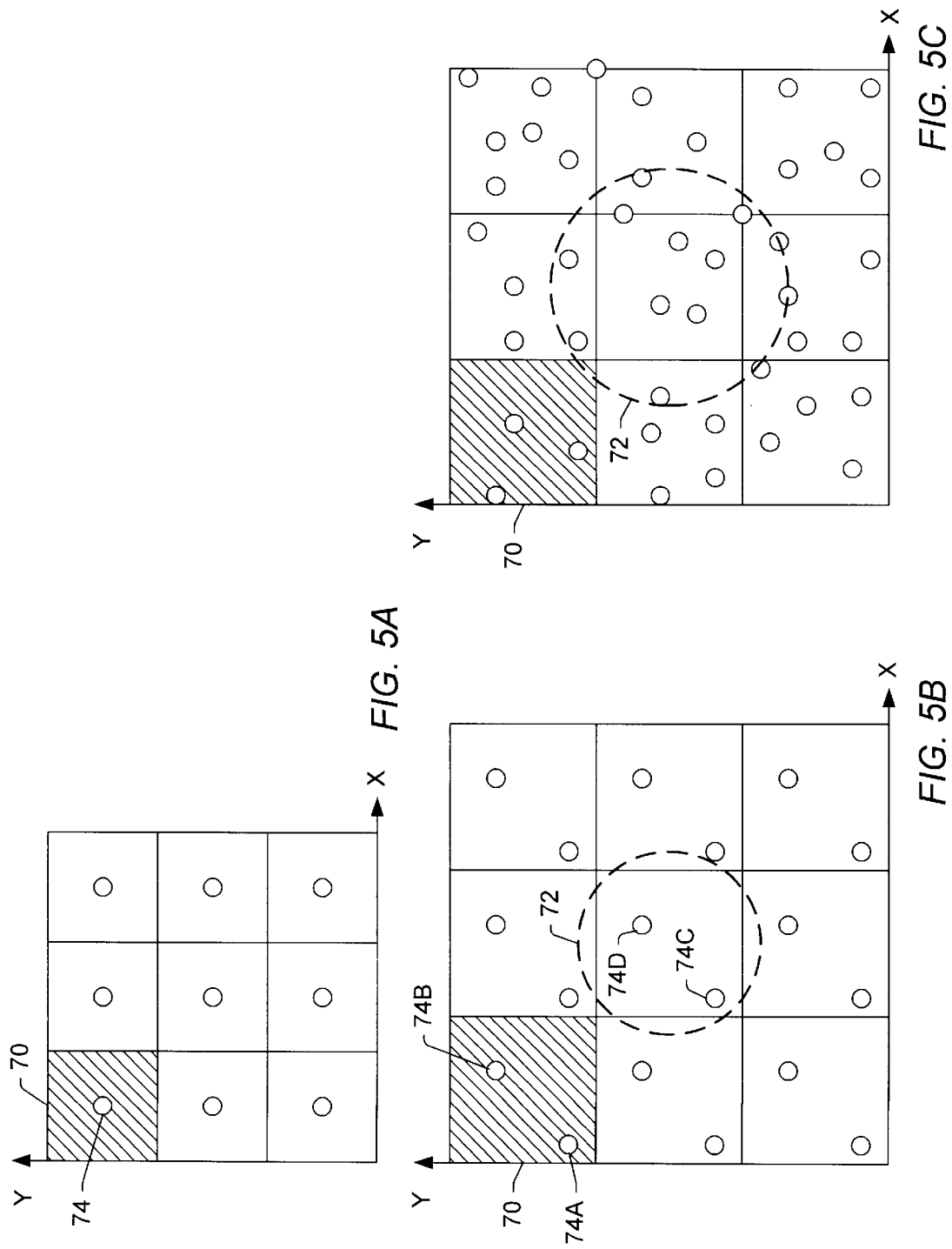
FIG. 5A illustrates an embodiment of critical sampling, i.e. where one sample is assigned to each pixel area in virtual screen space X-Y.
FIG. 5B illustrates an embodiment of regular supersampling, where two samples are assigned to each pixel area in virtual screen space X-Y.
FIG. 5C illustrates a random distribution of samples in virtual screen space X-Y.

FIGS. 5A–C: Super-sampling

FIG. 5A illustrates a portion of virtual screen space in a non-super-sampled example. The small circles denote sample locations, and the rectangular boxes superimposed on virtual screen space define pixels regions (i.e. regions of virtual screen space whose width and height correspond respectively to the horizontal distance and vertical distance between pixels.) One sample is located in each pixel region. For example, sample 74 is located in pixel region 70 which is denoted in cross hatch. Rendering units 150 compute values such as red, green, blue, and alpha for each sample. Although one sample location populates each pixel region, sample-to-pixel calculation units CU may still compute output pixel values (e.g. red, green, blue, and alpha) based on multiple samples, e.g. by using a convolution filter whose support spans several pixel regions.

Turning now to FIG. 5B, an example of one embodiment of super-sampling is illustrated. In this embodiment, two samples are computed per pixel region. For example, samples 74A and 74B are located in pixel region 70 which is denoted in cross hatch. The samples are distributed according to a regular grid. Even though there are more samples than pixels in FIG. 5B, output pixel values could be computed using one sample per pixel, e.g. by throwing out all but the sample nearest to the center of each pixel. However, a number of advantages arise from computing pixel values based on multiple samples.

A support region 72 is superimposed over the center pixel (corresponding to the center square) of FIG. 5B, and illustrates the support (i.e. the domain of definition) of a convolution filter. The support of a filter is the set of locations over which the filter is defined. In this example, the support region 72 is a circular disc. The output pixel values (e.g. red, green, blue and α values) for the center pixel are determined only by samples 74C and 74D, because these are the only samples which fall within support region 72. This filtering operation may advantageously improve the realism of a displayed image by smoothing abrupt edges in the displayed image (i.e., by performing anti-aliasing). The filtering operation may simply average the values of samples 74C and 74D to form the corresponding output values for the center pixel. More generally, the filtering operation may generate a weighted sum of the values of samples 74C and 74D, where the contribution of each sample is weighted according to some function of the sample's position (or distance) with respect to the center of support region 72. The filter, and thus support region 72, may be repositioned for each output pixel being calculated. For example, the filter center may visit the center of each pixel region for which pixel values are to be computed. Other filters and filter positioning schemes are also possible and contemplated.

In the example of FIG. 5B, there are two samples per pixel. In general, however, there is no requirement that the number of samples be related to the number of pixels. The number of samples may be completely independent of the number of pixels. For example, the number of samples may be smaller than the number of pixels.

Turning now to FIG. 5C, another embodiment of super-sampling is illustrated. In this embodiment, the samples are positioned randomly. Thus, the number of samples used to calculate output pixel values may vary from pixel to pixel.

Render units 150A–D calculate color information at each sample position.

FIGS. 6–12: Super-sampled Sample Buffer with Real-time Convolution

Figure 6:
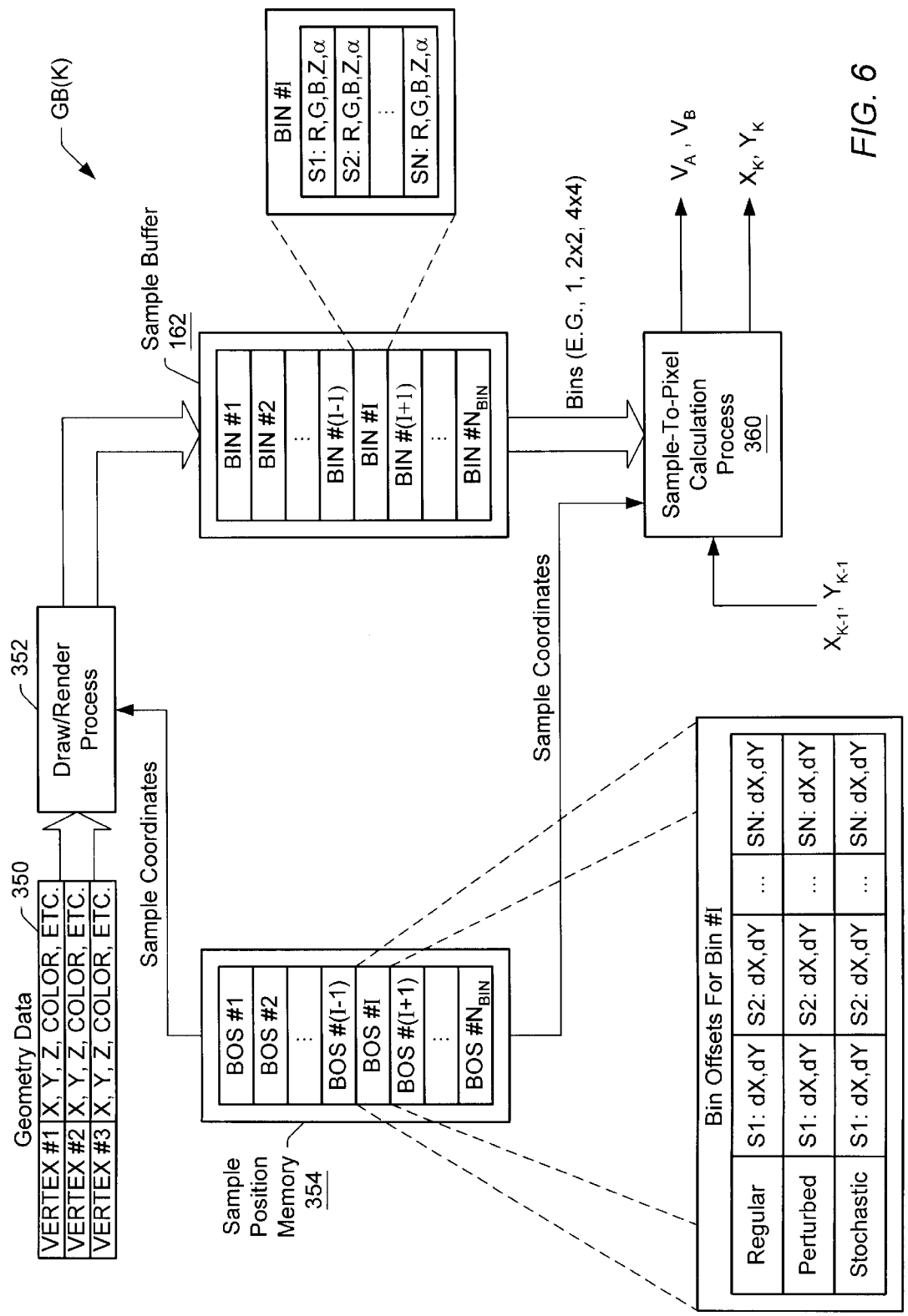
FIG. 6 illustrates one embodiment for the flow of data through generic graphics board GB(K)

FIG. 6 illustrates one possible configuration for the flow of data through one embodiment of generic graphics board GB(K). As the figure shows, geometry data 350 is received by graphics board GB(K) and used to perform draw process 352. The draw process 352 may be implemented by one or more of control unit 140, rendering units 150, data memories 152, and schedule unit 154. Geometry data 350 comprises data for one or more polygons. Each polygon comprises a plurality of vertices (e.g., three vertices in the case of a triangle), some of which may be shared among multiple polygons. Data such as spatial coordinates, color data and normal vector data may be included for each vertex.

In addition to the vertex data, draw process 352 (which may be performed by rendering units 150A–D) also receives sample position information from a sample position memory 354. The sample position information defines the location of samples in virtual screen space, i.e. in the 2-D viewport. Draw process 352 selects the samples that fall within the polygon currently being rendered, calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of data memories 152A–152D, or as a separate memory.

Sample position memory 354 may store sample positions in terms of their virtual screen coordinates (x,y). Alternatively, sample position memory 354 may be configured to store only offsets dx and dy for the samples with respect to positions on a regular grid. Storing only the offsets may use less storage space than storing the entire coordinates (x,y) for each sample. The sample position information stored in sample position memory 354 may be read by a dedicated sample position calculation unit (not shown) and processed to calculate sample positions for graphics processing unit 90. More detailed information on the computation of sample positions is included below.

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIG. 6, sample position memory 354 may be configured to store sample offsets generated according to a number of different schemes such as a regular grid (e.g. a rectangular grid, hexagonal grid, etc.), a perturbed regular grid, or a random (stochastic) distribution. Graphics board GB(K) may receive an indication from an application program or API routine running on the host CPU 102 that indicates which type of sample positioning scheme is to be used. Sample position memory 354 may be programmable to generate position information according to one or more different schemes.

In one embodiment, sample position memory 354 may comprise a RAM/ROM that contains stochastically determined sample points or sample offsets. Thus, the density of samples in virtual screen space may not be uniform when observed at small scale. Two regions with equal area centered at different locations in virtual screen space may contain different numbers of samples.

An array of bins may be superimposed over the 2-D viewport 420 of FIG. 4, and the storage of samples in sample buffer 162 may be organized in terms of bins. Sample buffer 162 may comprise an array of memory blocks which correspond to the bins. Each memory block may store the sample values (e.g. red, green, blue, z, alpha, etc.) for the samples that fall within the corresponding bin. (See the exploded view of Bin #I in FIG. 6.) The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

Suppose (for the sake of discussion) that the 2-D viewport 420 ranges from (0000,0000) to (FFFF,FFFF) in hexadecimal virtual screen coordinates. Also suppose that 2-D viewport 420 is overlaid with a rectangular array of bins whose lower-left corners reside at the locations (XX00,YY00) where XX and YY independently run from 0x00 to 0xFF. Thus, there are 256 bins in each of the vertical and horizontal directions with each bin spanning a square in virtual screen space with side length of 256. Suppose that each memory block is configured to store sample values for up to 16 samples, and that the set of sample values for each sample comprises 4 bytes. In this case, the address of the memory block corresponding to the bin located at (XX00,YY00) may be simply computed by the relation BinAddr=(XX+ YY*256)*16*4. For example, the sample S=(1C3B,23A7) resides in the bin located at (1C00,2300). The sample value set for sample S is then stored in the memory block residing at address 0x8C700=(0x231 C)(0x40) in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples is referred to herein as the bin sample capacity, or simply, the bin capacity. The bin capacity may take any of a variety of values. The bin capacity value may be programmable. Henceforth, the memory blocks in sample buffer 162 which correspond to the bins in virtual screen space will be referred to as memory bins.

The specific position of each sample within a bin may be determined by looking up the sample's offset in the RAM/ ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes.

In one embodiment, sample position memory 354 may store pairs of 8-bit numbers, each pair comprising an x-offset and a y-offset. (Other offsets are also possible, e.g., a time offset, a z-offset, etc.) When added to a bin position, each pair defines a particular position in virtual screen space, i.e. in 2-D viewport 420. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 may then calculate per-sample values such as color, z depth and alpha for each of these interior samples and stores the per-sample values into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of each sample may be double-buffered). In one embodiment, the samples are stored into sample buffer 162 in bins. In some embodiments, the bin capacity may vary from frame to frame. In addition, the bin capacity may vary spatially for bins within a single frame rendered into sample buffer 162. For example, bins on the edge of 2-D viewport 420 may have a smaller bin capacity than bins corresponding to the center of 2-D viewport 420. Since viewers are likely to focus their attention mostly on the center of a displayed image, more processing bandwidth may be dedicated to providing enhanced image quality in the center of 2-D viewport 420. Note that the size and shape of bins may also vary from region to region, or from frame to frame. The use of bins will be described in greater detail below in connection with FIG. 8.

Filter process 360 represents the action of sample-to-pixel calculation units CU in generating digital video streams $X_K$ and $Y_K$ which are transmitted to the next graphics board GB(K+1), or converted into video signals $V_A$ and $V_B$ for presentation to display devices 84A and 84B. Thus, any description of sample-to-pixel calculation units CU may be interpreted as a description of filter process 360. Filter process 360 operates in parallel with draw process 352.

Generic sample-to-pixel calculation unit CU(J) is configured to (a) read sample positions from sample position memory 354, (b) read corresponding sample values from sample buffer 162, (c) filter the sample values, and (d) mix (e.g. blend or multiplex) the resulting pixel values into video stream A or B. Sample-to-pixel calculation unit CU(J) generates the red, green, blue and alpha values for an output pixel based on a spatial filtering of the corresponding data for a selected plurality of samples, e.g. samples falling in a neighborhood of a pixel center. In one set of embodiments, sample-to-pixel calculation unit CU(J) is configured to: (i) determine the distance of each sample from the pixel center; (ii) multiply each sample's attribute values (e.g., red, green, blue, alpha) by a filter weight that is a specific (programmable) function of the sample's distance; (iii) generate sums of the weighted attribute values, one sum per attribute (e.g. a sum for red, a sum for green, . . . ), and (iv) normalize the sums to generate the corresponding pixel attribute values.

In the set of embodiments just described, the filter kernel is a function of distance from the pixel center. However, in alternative embodiments, the filter kernel may be a more general function of x and y displacements from the pixel center. Also, the support of the filter, i.e. the domain of definition of the filter kernel, may not be a circular disk.

Figure 7:
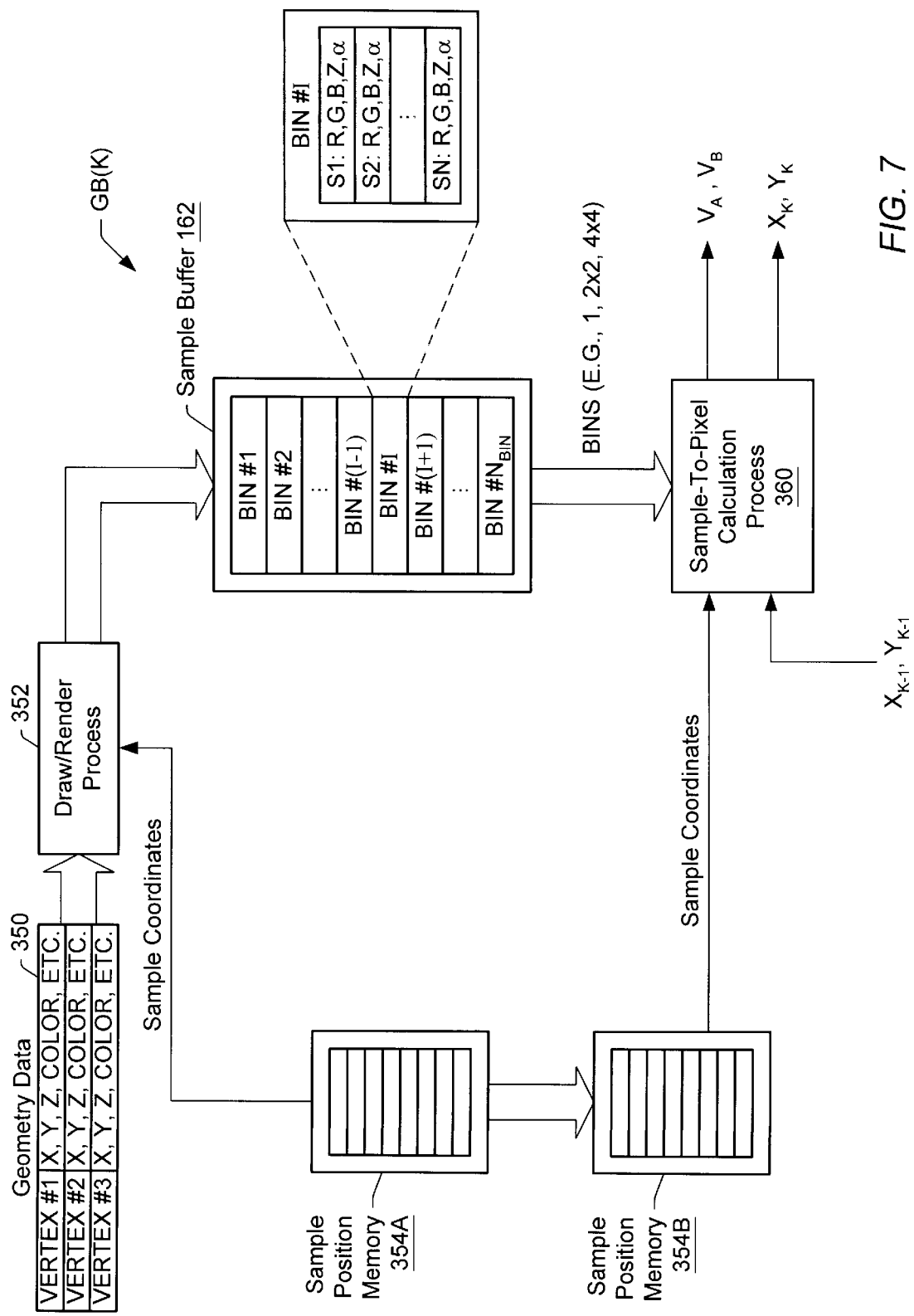
FIG. 7 illustrates a second embodiment for the flow of data through generic graphics board GB(K)

FIG. 7 illustrates an alternate embodiment of graphics board GB(K). In this embodiment, two or more sample position memories 354A and 354B are utilized. Sample position memories 354A–B may be used to implement double-buffering of sample position data. If the sample positions remain the same from frame to frame, the sample positions may be single-buffered. However, if the sample positions vary from frame to frame, then graphics board GB(K) may be advantageously configured to double-buffer the sample positions. The sample positions may be double-buffered on the rendering side (i.e., memory 354A may be double-buffered) and/or the filter side (i.e., memory 354B may be double-buffered). Other combinations are also possible. For example, memory 354A may be single-buffered, while memory 354B is doubled-buffered. This configuration may allow one side of memory 354B to be updated by sample position memory 354A while the other side of memory 354B is accessed by filter process 360. In this configuration, graphics board GB(K) may change sample positioning schemes on a per-frame basis by transferring the sample positions (or offsets) from memory 354A to double-buffered memory 354B as each frame is rendered. Thus, the sample positions which are stored in memory 354A and used by draw process 352 to render sample values may be copied to memory 354B for use by filter process 360. Once the sample position information has been copied to memory 354B, position memory 354A may then be loaded with new sample positions (or offsets) to be used for a second frame to be rendered. In this way the sample position information follows the sample values from the draw process 352 to the filter process 360.

Yet another alternative embodiment may store tags with the sample values in super-sampled sample buffer 162. These tags may be used to look-up the offsets (i.e. perturbations) dx and dy associated with each particular sample.

Figure 8:
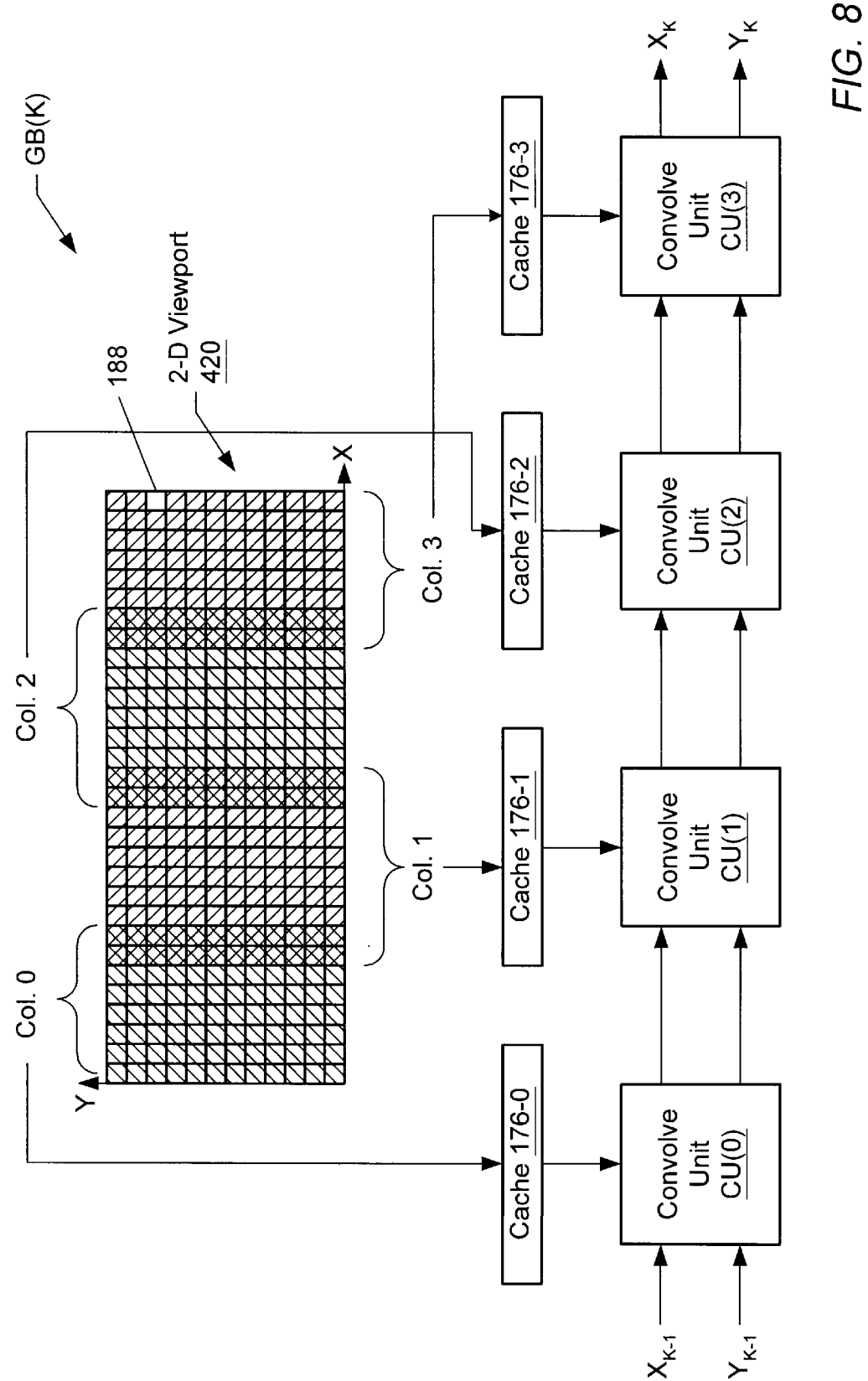
FIG. 8 illustrates one embodiment of a method for filtering samples values to generate pixel values using multiple sample-to-pixel calculation units (also referred to as convolve units)

FIG. 8—Converting Samples into Pixels

As discussed earlier, 2-D viewport 420 may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units CU (also referred to as convolve units CU) are configured to read memory bins from sample buffer 162 and to generate pixel values from the sample values contained within the memory bins.

FIG. 8 illustrates one embodiment of graphics board GB(K) which provides for rapid computation of pixel values from sample values. Elements on the rendering side of graphics graphic board GB(K) have been suppressed in FIG. 8 for simplicity of illustration. The spatial bins which cover 2-D viewport 420 may be organized into columns (e.g., Cols. 0, 1, 2, 3). Each column comprises a two-dimensional subarray of spatial bins. The columns may be configured to horizontally overlap (e.g., by one or more spatial bins). Each of sample-to-pixel calculation units CU(0) through CU(3) may be configured to access memory bins corresponding to one of the columns. For example, sample-to-pixel calculation unit CU(1) may be configured to access memory bins that correspond to the spatial bins of Column 1. The data pathways between sample buffer 162 and sample-to-pixel calculations unit CU may be optimized to support this column-wise correspondence.

FIG. 8 shows four sample-to-pixel calculation units for the sake of discussion. However, the inventive principles disclosed in the embodiment of FIG. 8 naturally generalize to any number of sample-to-pixel calculation units.

The amount of the overlap between columns may depend upon the horizontal diameter of the filter support for the filter kernel being used. The example shown in FIG. 8 illustrates an overlap of two bins. Each square (such as square 188) represents a single bin comprising one or more samples. Advantageously, this configuration may allow sample-to-pixel calculation units CU to work independently and in parallel, with each sample-to-pixel calculation units CU(J) receiving and convolving samples residing in the memory bins of the corresponding column. Overlapping the columns will prevent visual bands or other artifacts from appearing at the column boundaries for any operators larger than a pixel in extent.

Furthermore, the embodiment of FIG. 8 may include a plurality of bin caches 176 which couple to sample buffer 162. In addition, each of bin caches 176 couples to a corresponding one of sample-to-pixel calculation units CU. Bin cache 176-I (where I takes any value from zero to three) stores a collection of memory bins from Column I, and serves as a cache for sample-to-pixel calculation unit CU(I). Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 9A:
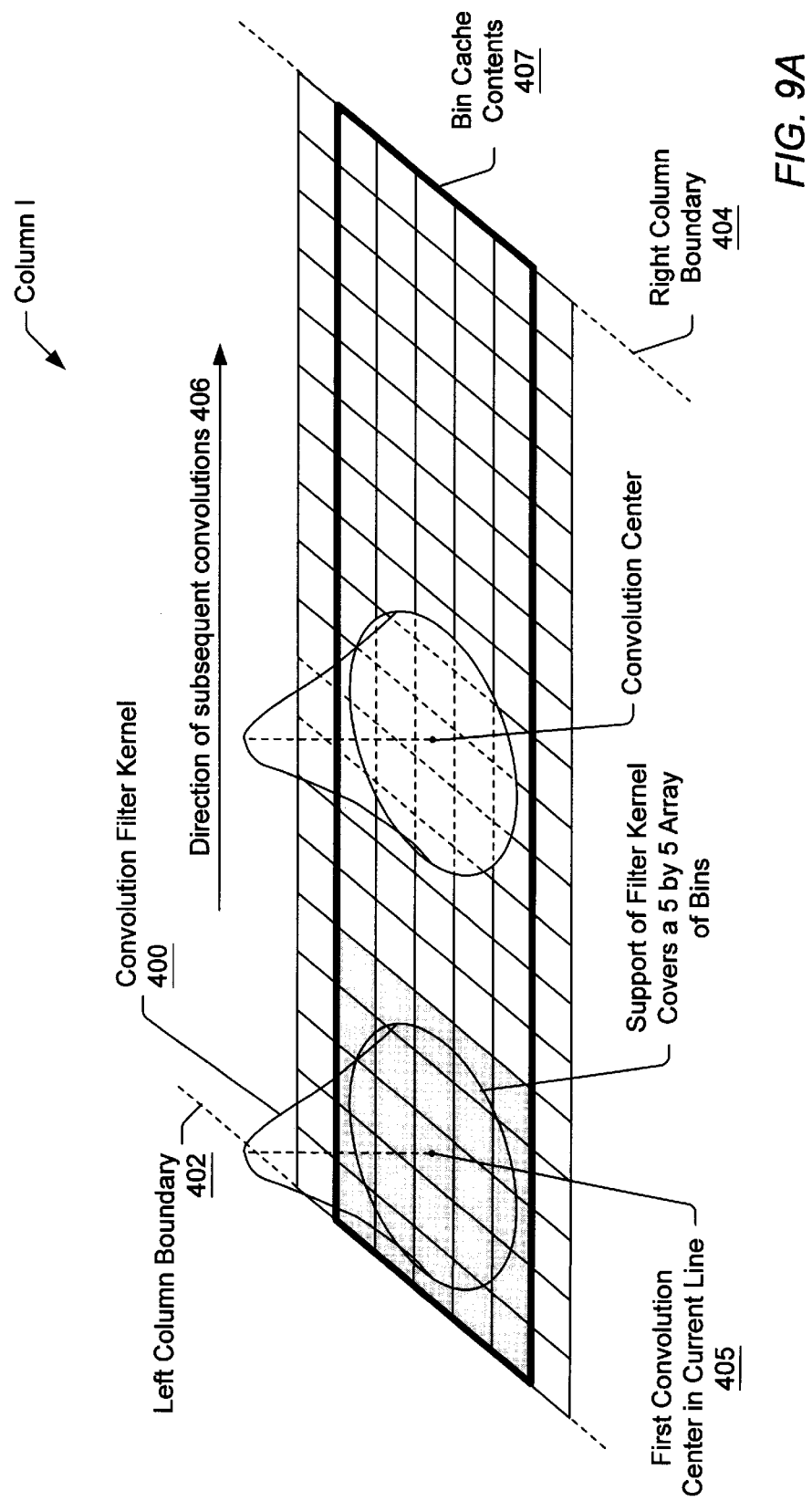
FIG. 9A illustrates one embodiment for the traversal of a filter kernel 400 across a generic Column I of FIG. 8.
Figure 9B:
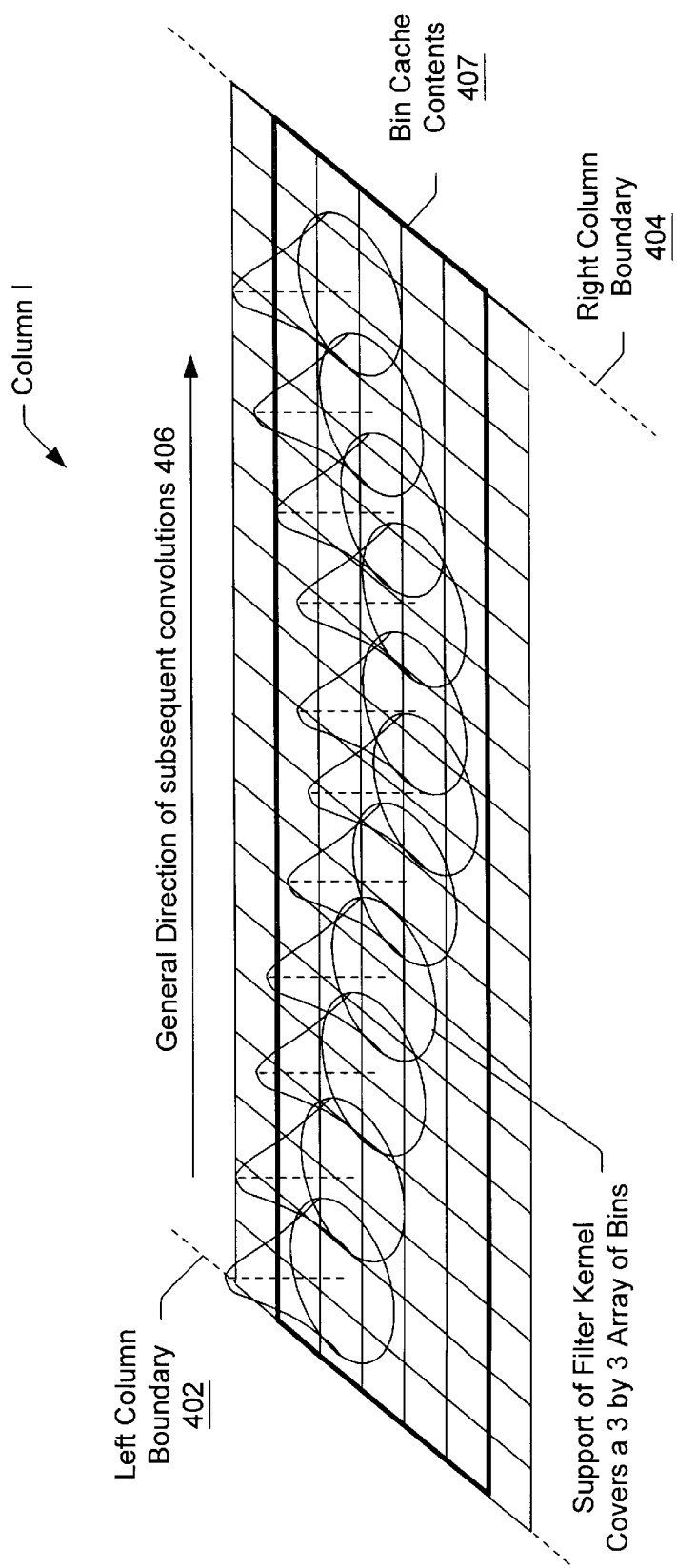
FIG. 9B illustrates one embodiment for a distorted traversal of filter kernel 400 across a generic Column I of FIG. 8.

FIG. 9A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit CU(I) may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $N_L$ bin rows of memory bins. The cache line-depth parameter $N_L$ may be chosen to accommodate the support of filter kernel 400. If the support of filter kernel 400 is expected to span no more than $N_y$ bins vertically (i.e. in the Y direction), the cache line-depth parameter $N_L$ may be set equal to $N_y$ or larger.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

In one embodiment, the cache line-depth parameter $N_L$ is set equal to $N_v+1$. In the example of FIG. 9A, the filter support covers $N_v=5$ bins vertically. Thus, the cache line-depth parameter $N_L=6=5+1$. The additional bin row in bin cache 176-I allows the processing of memory bins (accessed from bin cache 176-I) to be more substantially out of synchronization with the loading of memory bins (into bin cache 176-I) than if the cache line-depth parameter $N_L$ were set at the minimum value $N_v$.

In one embodiment, sample buffer 162 and bin cache 176-I may be configured for row-oriented burst transfers. If a request for a memory bin misses in bin cache 176-I, the entire bin row containing the requested memory bin may be fetched from sample buffer 162 in a burst transfer. Thus, the first convolution of a scan line may fill the bin cache 176-I with all the memory bins necessary for all subsequent convolutions in the scan line. For example, in performing the first convolution in the current scan line at the first convolution center 405, sample-to-pixel calculation unit CU(I) may assert a series of requests for memory bins, i.e. for the memory bins corresponding to those spatial bins (rendered in shade) which intersect the support of filter kernel 400. Because the filter support 400 intersects five bin rows, in a worst case scenario, five of these memory bin requests will miss bin cache 176-I and induce loading of all five bin rows from sample buffer 162. Thus, after the first convolution of the current scan line is complete, bin cache 176-I may contain the memory bins indicated by the heavily outlined rectangle 407. Memory bin requests asserted by all subsequent convolutions in the current scan line may hit in bin cache 176-I, and thus, may experience significantly decreased bin access time.

In general, the first convolution in a given scan line may experience fewer than the worst case number of misses to bin cache 176-I because bin cache 176-I may already contain some or all of the bin rows necessary for the current scan line. For example, if convolution centers are located at the center of each spatial bin, the vertical distance between successive scan lines (of convolution centers) corresponds to the distance between successive bin rows, and thus, the first convolution of a scan line may induce loading of a single bin row, the remaining four bin rows having already been loaded in bin cache 176-I in response to convolutions in previous scan lines.

If the successive convolution centers in a scan line are expected to depart from a purely horizontal trajectory across Column I, the cache line-depth parameter $N_L$ may be set to accommodate the maximum expected vertical deviation of the convolution centers. For example, in FIG. 9B, the convolution centers follow a curved path across Column I. The curved path deviates from a horizontal path by approximately two bins vertically. Since the support of the filter kernel covers a 3 by 3 array of spatial bins, bin cache 176-I may advantageously have a cache line-depth $N_L$ of at least five (i.e. two plus three).

As mentioned above, Columns 0 through 3 of 2-D viewport 420 may be configured to overlap horizontally. The size of the overlap between adjacent Columns may be configured to accommodate the maximum expected horizontal deviation of convolution centers from nominal convolution centers on a rectangular grid.

Figure 10:
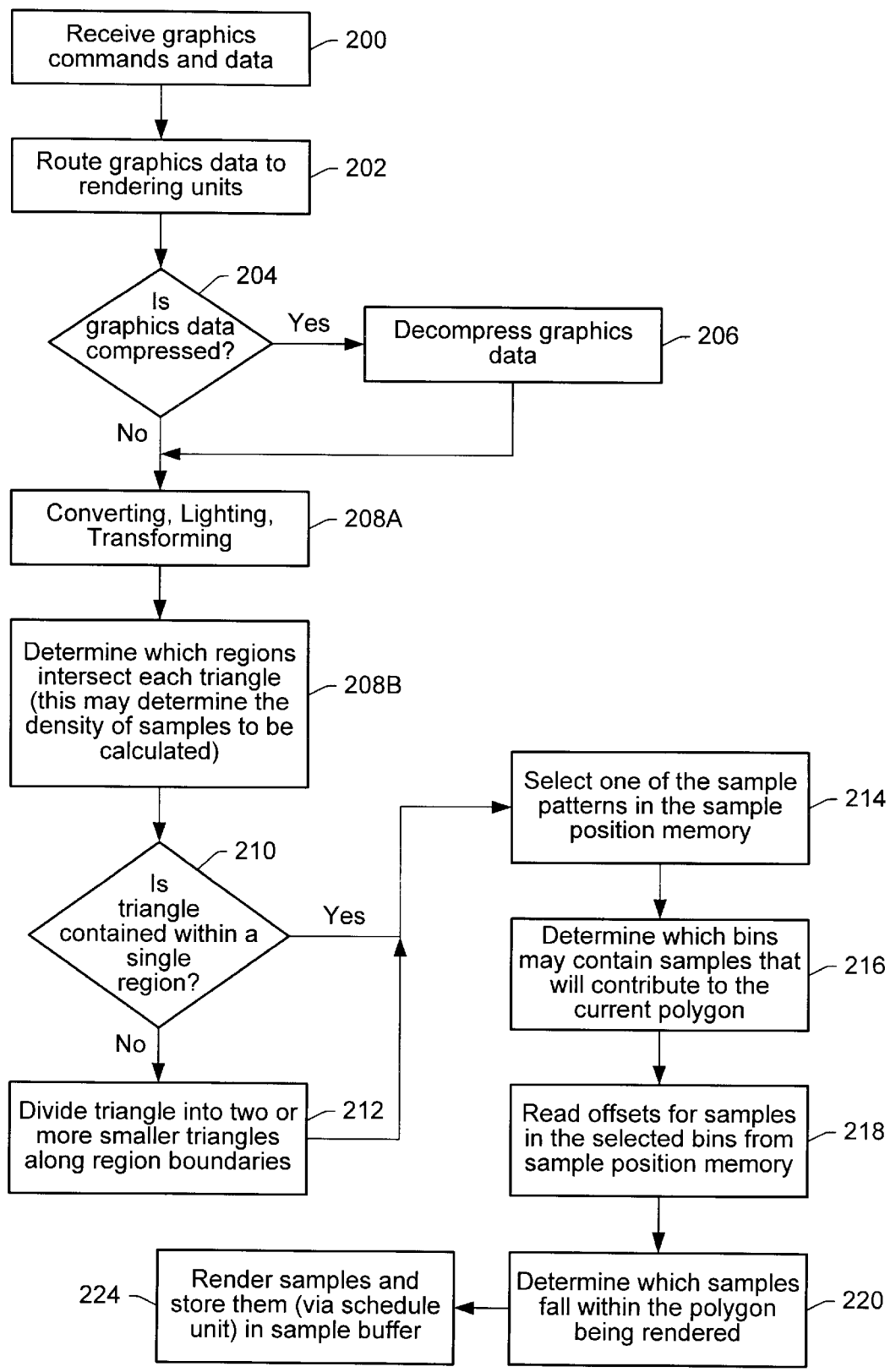
FIG. 10 illustrates one embodiment of a method for rendering samples into a super-sampled sample buffer.

FIG. 10—Rendering Samples into a Super-sampled Sample Buffer

FIG. 10 is a flowchart of one embodiment of a method for drawing or rendering samples into a sample buffer. Certain of the steps of FIG. 10 may occur concurrently or in different orders. In step 200, graphics board GB(K) receives graphics commands and graphics data from the host CPU 102 or directly from system memory 106. In step 202, the graphics instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed and converted to an appropriate space for lighting and clipping prior to the perspective divide and transform to screen space (as indicated in step 208A).

If graphics board GB(K) implements variable resolution super-sampling, then the triangles may be compared with a set of sample-density region boundaries (step 208B). In variable-resolution super-sampling, different regions of 2-D viewport 420 may be allocated different sample densities based upon a number of factors (e.g., the center of the attention of an observer as determined by eye or head tracking). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics board GB(K) may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly". In step 216, rendering units 150A–D may determine which spatial bins contain samples located within the triangle's boundaries, based upon the selected sample positioning scheme and the size and shape of the spatial bins. In step 218, the offsets dx and dy for the samples within these spatial bins are then read from sample position memory 354. In step 220, each sample's position is then calculated using the offsets dx and dy and the coordinates of the corresponding bin origin, and is compared with the triangle's edges to determine if the sample is within the triangle.

For each sample that is determined to be within the triangle, one of rendering units 150A–D draws the sample by calculating the sample's color, alpha and other attributes. This may involve a lighting calculation and an interpolation based upon the color and texture map information associated with the vertices of the triangle. Once the sample is rendered, it may be forwarded to schedule unit 154, which then stores the sample in sample buffer 162 (as indicated in step 224).

The embodiment of the rendering method described above is not meant to be limiting, and various modifications and alternative embodiments of the rendering method are contemplated. For example, some of the steps shown in FIG. 10 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Figure 11:
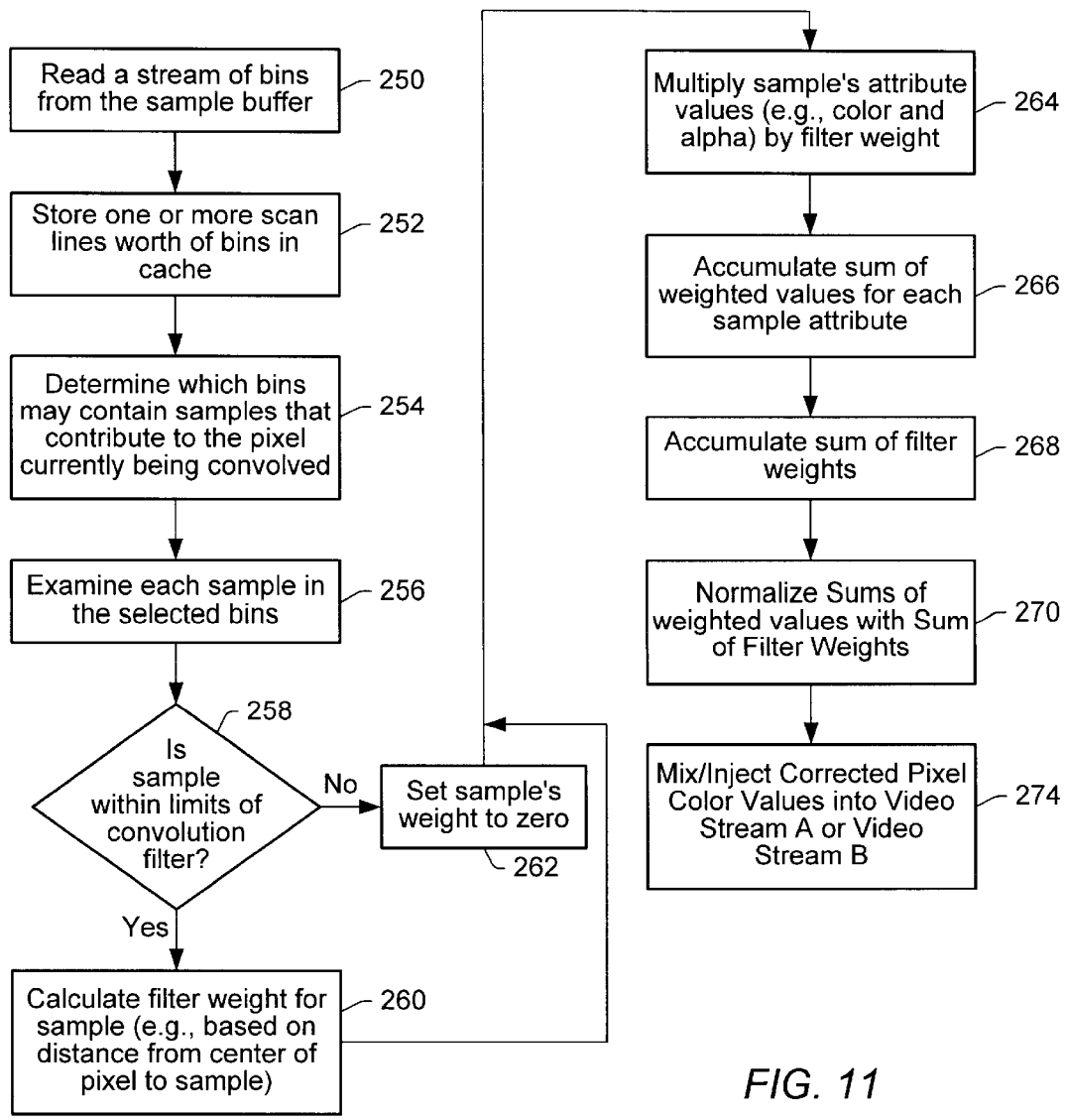
FIG. 11 illustrates one embodiment of a method for calculating pixel values from sample values.

FIG. 11—Generating Output Pixel Values from Sample Values

FIG. 11 is a flowchart of one embodiment of a method for selecting and filtering samples stored in sample buffer 162 to generate output pixel values. In step 250, a stream of memory bins are read from sample buffer 162. In step 252, these memory bins may be stored in one or more of bin caches 176 to allow sample-to-pixel calculation units CU easy access to sample values during the convolution operation. In step 254, the memory bins are examined to determine which of the memory bins may contain samples that contribute to the output pixel value currently being generated. The support (i.e. foot-print) of the filter kernel 400 (see FIG. 9A) intersects a collection of spatial bins. The memory bins corresponding to these spatial bins may contain sample values that contribute to the current output pixel.

Each sample in the selected bins (i.e. bins that have been identified in step 254) is then individually examined to determine if the sample does indeed contribute (as indicated in steps 256–258) to the current output pixel. This determination may be based upon the distance (or position) of the sample from (with respect to) the filter center.

In one embodiment, sample-to-pixel calculation units CU may be configured to calculate this sample distance (i.e., the distance of the sample from the filter center) and then use it to index into a table storing filter weight values (as indicated in step 260). In another embodiment, however, the potentially expensive calculation for determining the distance from the center of the pixel to the sample (which typically involves a square root function) may be avoided by using distance squared to index into the table of filter weights. In one embodiment, this squared-distance indexing scheme may be facilitated by using a floating point format for the squared distance (e.g., four or five bits of mantissa and three bits of exponent), thereby allowing much of the accuracy to be maintained while compensating for the increased range in values. In one embodiment, the table of filter weights may be implemented in ROM. However, RAM tables may also be used. Advantageously, RAM tables may, in some embodiments, allow sample-to-pixel calculation unit CU(J) to vary the filter coefficients on a per-frame or per-session basis. For example, the filter coefficients may be varied to compensate for known shortcomings of display devices 84A/84B or to accommodate the user's personal preferences.

The filter coefficients may also vary as a function of filter center position within the 2-D viewport 420, or on a per-output pixel basis. In one embodiment, specialized hardware (e.g., multipliers and adders) may be used to compute filter weights for each sample. Samples which fall outside the support of filter kernel 400 may be assigned a filter weight of zero (step 262), or they may be excluded from the calculation entirely.

In one alternative embodiment, the filter kernel may not be expressible as a function of distance with respect to the filter center. For example, a pyramidal tent filter is not expressible as a function of Euclidean distance from the filter center. Thus, filter weights may be tabulated (or computed) in terms of x and y sample-displacements with respect to the filter center, or with respect to a non-Euclidean distance from the filter center.

Once the filter weight for a sample has been determined, the attribute values (e.g. red, green, blue, alpha, etc.) for the sample may then be multiplied by the filter weight (as indicated in step 264). Each of the weighted attribute values may then be added to a corresponding cumulative sum—one cumulative sum for each attribute—as indicated in step 266. The filter weight itself may be added to a cumulative sum of filter weights (as indicated in step 268). Step 268 may be performed in parallel with step 264 and/or 266.

After all samples residing in the support of the filter have been processed, the cumulative sums of the weighted attribute values may be divided by the cumulative sum of filter weights (as indicated in step 270). It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, the normalized output pixels may be gamma corrected, and mixed (e.g. blended or multiplexed) into video stream A or video stream B as indicated by step 274.

Figure 12:
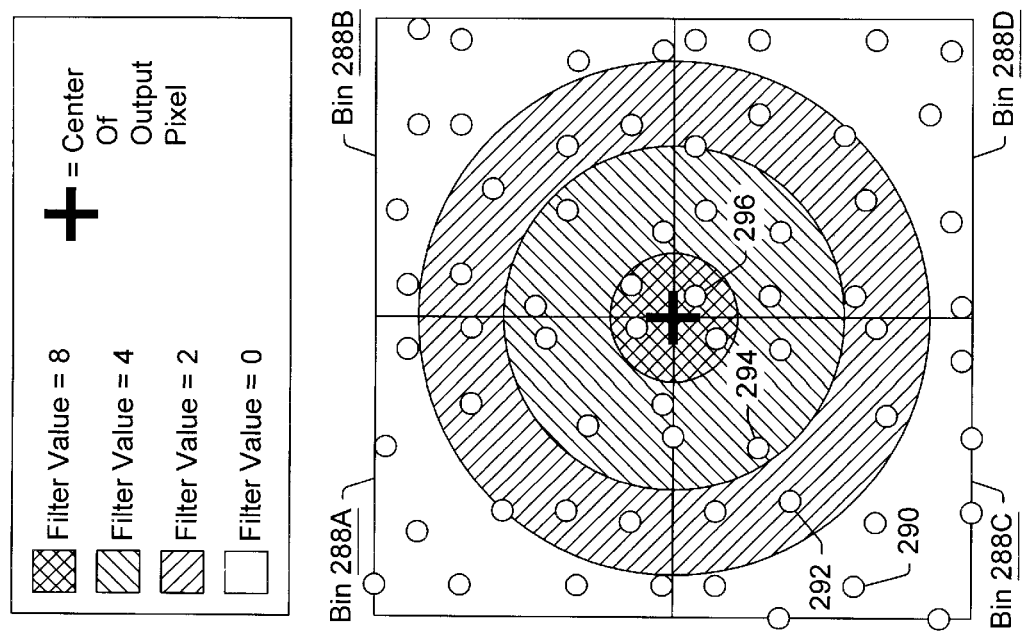
FIG. 12 illustrates one embodiment of a convolution computation for an example set of samples at a virtual pixel center in the 2-D viewport 420.

FIG. 12—Example Output Pixel Convolution

FIG. 12 illustrates a simplified example of an output pixel convolution with a filter kernel which is radially symmetric and piecewise constant. As the figure shows, four bins 288A–D contain samples that contribute to the output pixel convolution. In this example, the center of the output pixel is located at the shared corner of bins 288A–288D. Each bin comprises sixteen samples, and an array of four bins (2×2) is filtered to generate the attribute values (red, green, blue, alpha) for the output pixel. Since the filter kernel is radially symmetric, the distance of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed attribute values for the output pixel. Because the filter kernel is a decreasing function of distance from the pixel center, samples close to the pixel center contribute more to the computed attribute values than samples farther from the pixel center. This type of filtering may be used to perform image smoothing or anti-aliasing.

Example attribute values for samples 290–296 are illustrated in boxes 300–306. In this example, each sample comprises red, green, blue and alpha values, in addition to the sample's positional data. Block 310 illustrates the calculation of each pixel attribute value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel attribute values.

The filter presented in FIG. 12 has been chosen for descriptive purposes only and is not meant to be limiting. A wide variety of filters may be used for pixel value computations depending upon the desired filtering effect(s), e.g., filters such as a box filter, a tent filter, a cylinder filter, a cone filter, a Gaussian filter, a Catmull-Rom filter, a Mitchell-Netravali filter, or any windowed approximation of a sinc filter. It is a well known fact that the sinc filter realizes an ideal band-pass filter. However, the sinc filter takes non-zero values over the whole of the x-y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell-Netravali filter (including the Catmull-Rom filter as a special case) are obtained by modeling the negative lobes which surround the central positive lobe of the sinc filter. The negative lobes allows a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights). In addition, the support of the filters used for the pixel value convolutions may be circular, elliptical, rectangular (e.g. square), triangular, hexagonal, etc.

The piecewise constant filter function shown in FIG. 12 with four constant regions is not meant to be limiting. For example, in one embodiment the convolution filter may have a large number of regions each with an assigned filter value (which may be positive, negative or zero). In another embodiment, the convolution filter may be a continuous function that is evaluated for each sample based on the sample's distance (or x and y displacements) from the pixel center. Also note that floating point values may be used for increased precision.

As mentioned above (see FIG. 2B and attending description) graphics system 112 may comprise one or more graphics boards (also referred to herein as graphics pipelines) coupled together in a linear chain. Each graphics board GB(K) includes a number $V_K$ of sample-to-pixel calculation units CU which form a linear succession. The union of all sample-to-pixel calculation units CU comprised within all graphics boards form a linear array. For example, in FIG. 13, the eight sample-to-pixel calculation units comprised within graphics board GB(0) and GB(1) form a linear array. The $J^{th}$ sample-to-pixel calculation unit on graphics board GB(I) is denoted CU(I,J). As described above, the graphics boards contain components other than the sample-to-pixel calculation units. However, in FIG. 13, these other components have been suppressed for the sake of diagrammatical simplicity.

The linear array of sample-to-pixel calculation units generates one or more video signals for presentation to a collection of one or more display devices. For example, the linear array of sample-to-pixel calculation units may generate two video signals $V_A$ and $V_B$ for presentation to display devices 84A and 84B respectively. Each sample-to-pixel calculation unit CU(I,J) in the linear array may be assigned to either video stream A or video stream B. The sample-to-pixel calculation units assigned to a video stream are referred to as a video group. For example, in the example of FIG. 13, sample-to-pixel calculation units CU(0,0) and CU(0,1) belong to video group A, and sample-to-pixel calculation units CU(0,2), CU(0,3), CU(1,0), CU(1,1), CU(1,2), CU(1,3) belong to video group B. Such an assignment of resources may be appropriate when video signal $V_B$ has a pixel bandwidth that is approximately three times larger than video signal $V_A$.

Sample-to-pixel calculation units CU(I,J) in video group A generate pixel values for video signal $V_A$. Similarly, sample-to-pixel calculation units CU(I,J) in video group B generate pixel values for video signal $V_B$. The two video streams are independent in their resolution and timing because they are driven by independent pixel clocks. Each sample-to-pixel calculation unit CU(I,J) in the linear array is configured to receive both pixel clocks, and may be programmed to respond to either of the pixel clocks.

Sample-to-pixel calculation unit CU(I,J) generates video stream $A_{I,J}$ and $B_{I,J}$, and passes these video streams on to the next sample-to-pixel calculation unit on the same graphics board or the next graphics board. Video streams $A_{I,J}$ may be interpreted as video stream A in varying stages of completion. Similarly, video streams $B_{I,J}$ may be interpreted as video stream B in varying stages of completion.

The first sample-to-pixel calculation unit in a video group is referred to as the lead sample-to-pixel calculation unit. Second and subsequent sample-to-pixel calculation units in a video group are referred to herein as slave units. The sample-to-pixel calculation units in the video group cooperatively generate a video stream S (where S equals A or B). The video stream may originate inside the lead sample-to-pixel calculation unit as a stream of dummy pixels. The dummy pixels serve as timing place-holders, and may have a default color. Each sample-to-pixel calculation unit in the video group (including the lead unit) modifies the video stream, i.e. contributes locally generated image pixels to the video stream at appropriate times, and synchronously forwards the modified video stream to the next sample-to-pixel calculation unit in the video group. Each sample-to-pixel calculation unit in the video group receives a common pixel clock signal, and transmits a synchronous version of the pixel clock, embedded in the modified video stream, to the next sample-to-pixel calculation unit. Thus, the video signal S matures, in successive stages, from a signal comprising all dummy pixels to a signal comprising all (or mostly) image pixels as it passes through the sample-to-pixel calculation units of the video group.

Each sample-to-pixel calculation unit in the video group contributes its locally generated pixels to the video signal at times determined by a set of counters, boundary registers and boundary comparators internal to the sample-to-pixel calculation unit. The internal counters include a horizontal pixel counter and a vertical line counter. Each sample-to-pixel calculation unit (a) counts successive pixels and lines in the video stream in response to the synchronous pixel clock received in the video stream from the previous sample-to-pixel calculation unit, and (b) contributes locally generated pixels to the video stream when the local pixel count and line count reside within a predefined region as determined by the local boundary registers and boundary comparators. The regions assigned to the sample-to-pixel calculation units in the video group may be configured to tile a two-dimensional managed area.

In addition, the lead sample-to-pixel calculation unit (a) embeds a vertical reset pulse into the video stream when its local counters indicate the beginning of a frame, and (b) embeds a horizontal reset pulse into the video stream when its local counters indicate the beginning of a line. The reset pulses are treated like pixel data and passed from one sample-to-pixel calculation unit to the next with the video stream. Each slave unit may reset its horizontal pixel counter when it receives the horizontal reset pulse, and may reset both its horizontal pixel counter and its vertical line counter when it receives the vertical reset pulse. Thus, the lead unit controls video timing for the whole group.

Figure 14A:
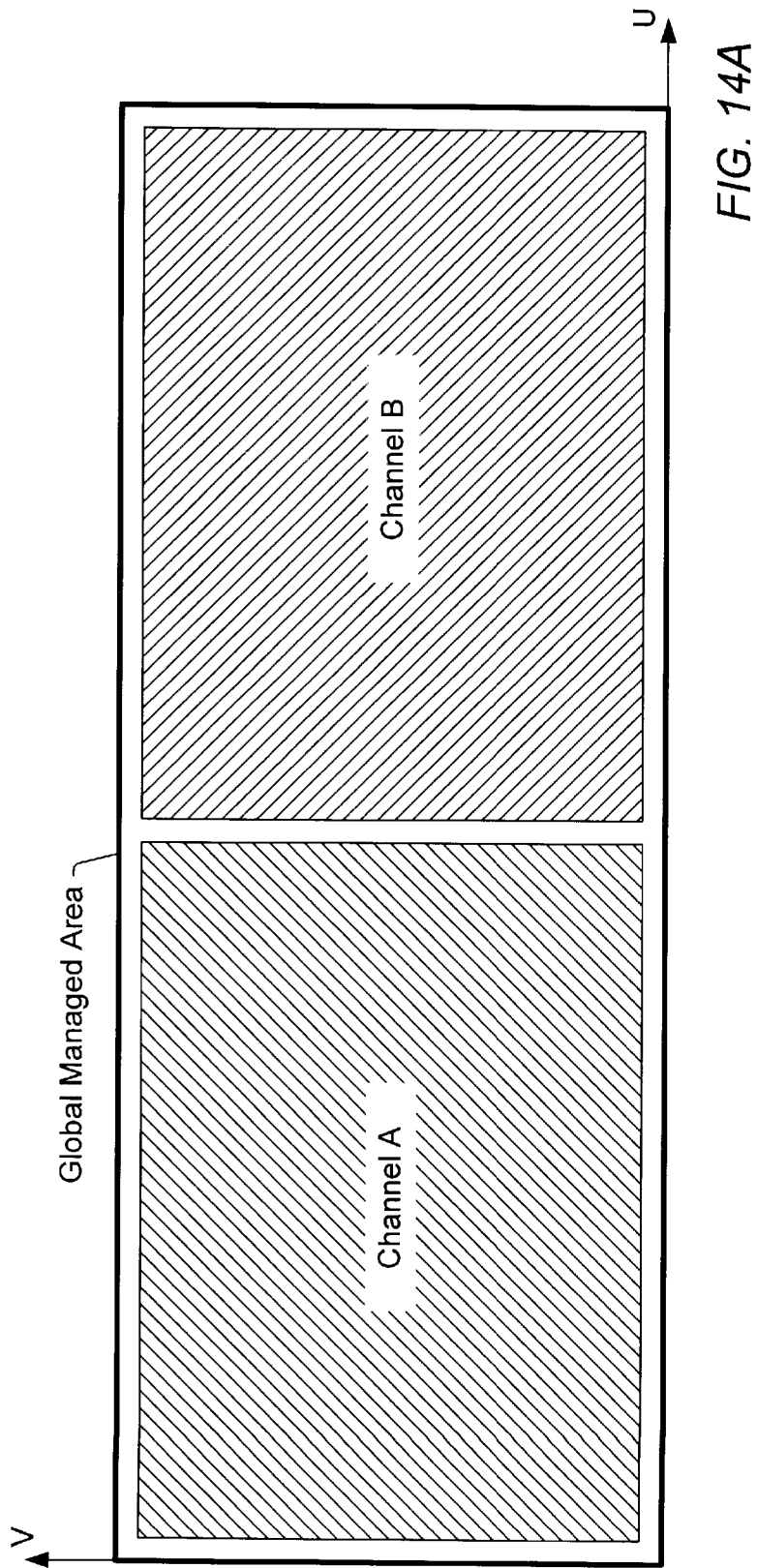
FIG. 14A illustrates one embodiment for a global managed area partitioned by channel A and channel B subregions.

A software program (e.g. a graphics application program) running on host CPU 102 may control a global managed area as shown in FIG. 14A. Each video group is assigned a corresponding subregion of the global managed area. The subregion assigned to video group A is referred to as channel A, and the subregion assigned to video group B is referred to as channel B. The situation of channel A in the global managed area determines the video contents of video signal $V_A$. Similarly, the situation of channel B in the global managed area determines the video contents of video signal $V_B$. Often, channel A and channel B are chosen so that their union covers the global managed area.

Figure 14B:
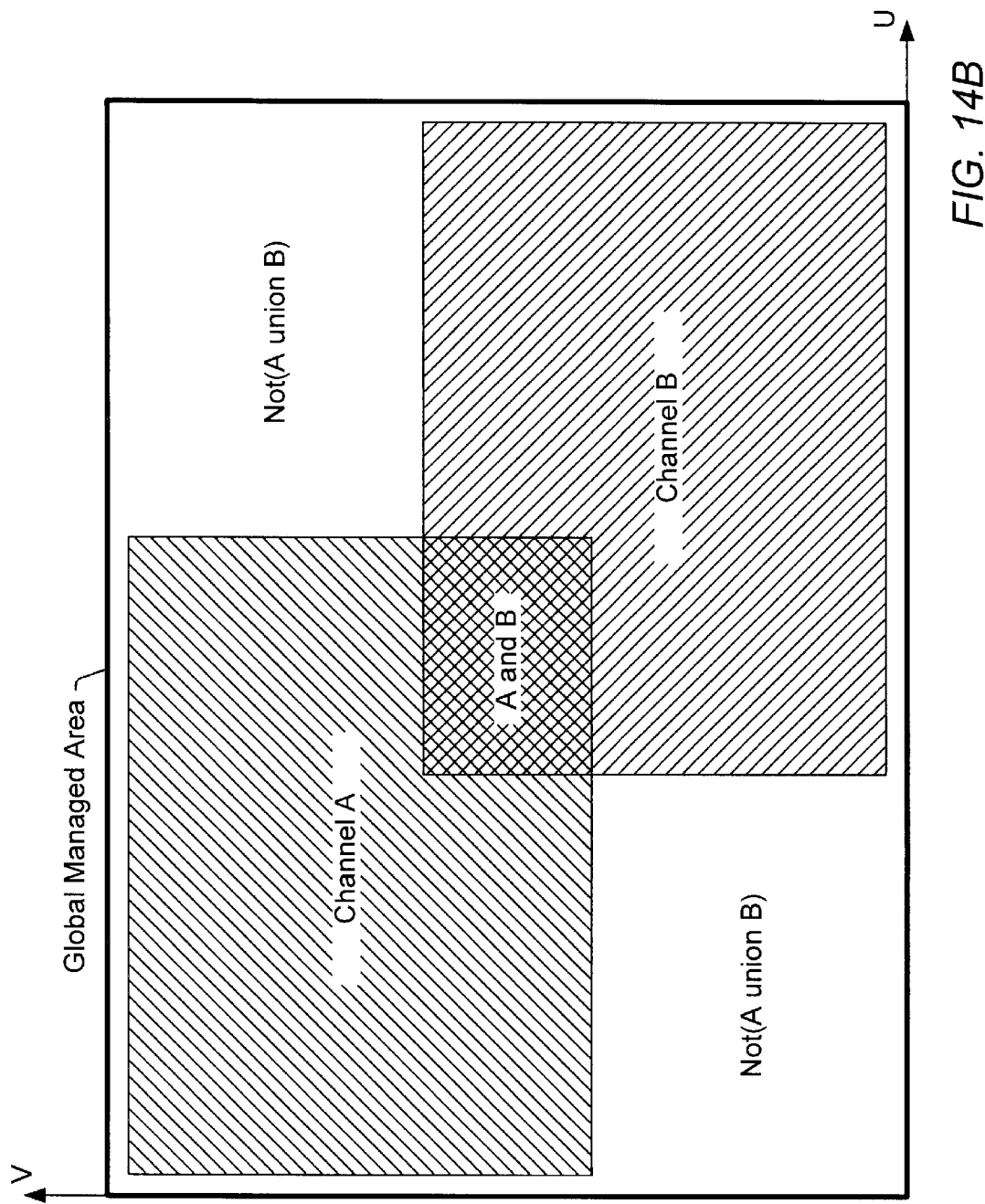
FIG. 14B illustrates a situation where the channel A and channel B subregions overlap.

FIG. 14B illustrates an example where channel A and channel B intersect in the region denoted "A and B". Thus, the region "A and B" appears on both display devices 84A and 84B. Regions of the global managed area outside the union of channel A and channel B are denoted "Not(A union B)". These regions do not appear on either display device 84A or 84B. Generally, such regions represent wasted computational effort, and thus, are undesirable.

FIG. 14C illustrates an example where channel B is entirely contained in channel A. Thus, display device 84B displays a portion of the video image displayed by display device 84A.

Figure 14E:
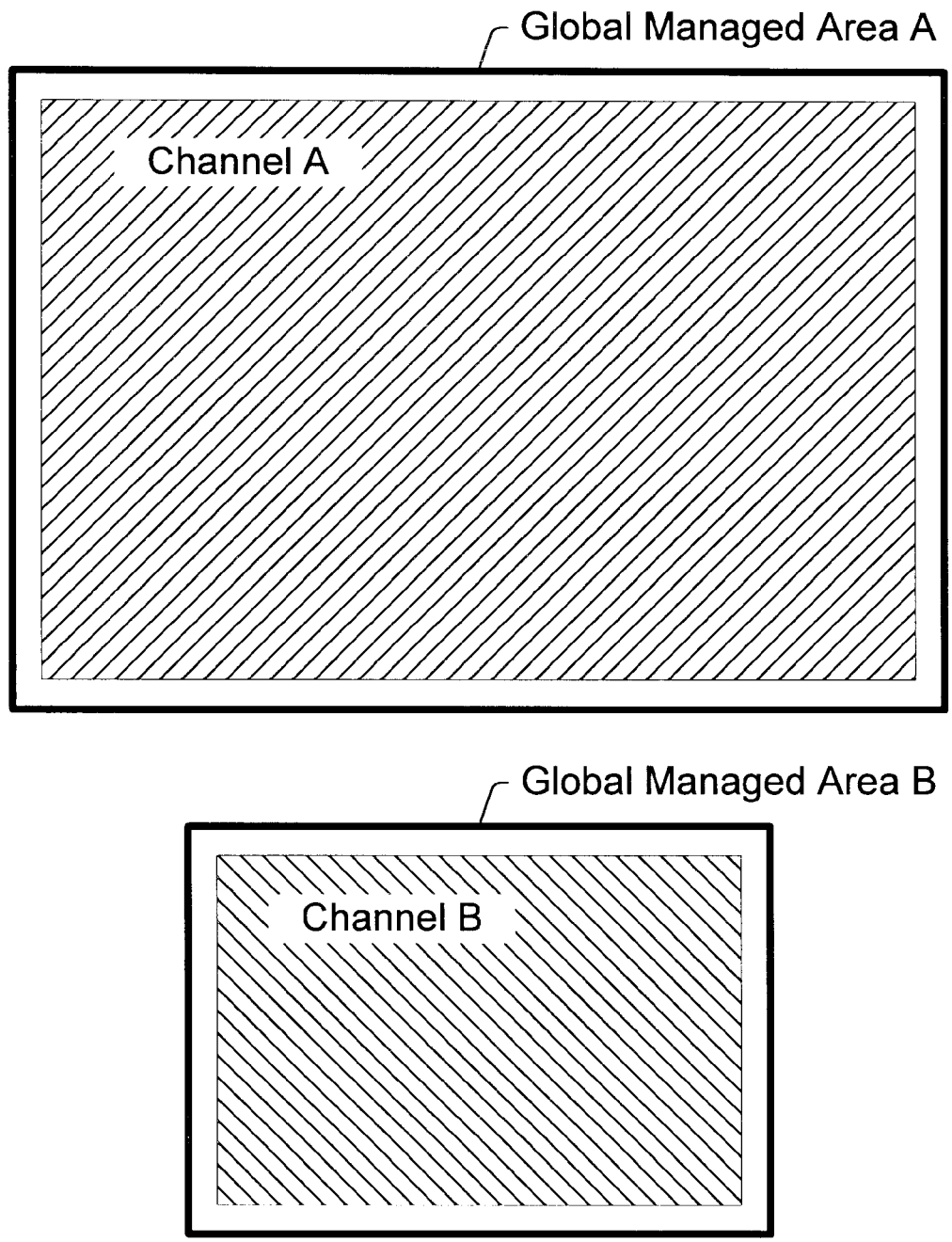
FIG. 14E illustrates a situation where the channel A subregion and channel B subregion are assigned to separate managed areas.

It is not required that a video channel be contained within the global managed area as suggested by FIG. 14D. In this example, channel A extends outside the global managed area. The portion of channel A which lies inside the global managed area may be assigned image content. Portions of channel A which lie outside the global managed area (i.e. the left and right margins) are assigned dummy pixel values, e.g., pixel values having a predefined background color. This arrangement of channel A with respect to the global managed area illustrates one mechanism for performing "letter boxing". One or more software programs running on host computer 102 may set up two global managed areas as shown in FIG. 14E. Typically, channel A is assigned so as to cover global managed area A, and channel B is assigned so as to cover global managed area B. The two global managed areas may contain independent video information.

To maximize the flexibility of the graphics system 112, it is desirable to assign sample-to-pixel calculation units CU(I, J) to video group A or video group B on a persession basis, rather than fixing the allocation in hard wiring. To facilitate such dynamic allocation, both video stream A and video stream B flow through all the sample-to-pixel calculation units comprising the linear array. In this fashion, it is easy to derive the local video timing, i.e. the video timing for each sample-to-pixel calculation unit CU(I,J), from either video stream, and to assign a particular sample-to-pixel calculation unit CU(I,J) to either video stream. Each calculation unit may include a configuration register. The state of the configuration register may determine whether a calculation unit belongs to video group A or video group B. An external processor may write to the configuration registers to initialize or modify the allocation of calculation units to video groups. For example, a configuration routine executing on host CPU 102 may write to the configuration registers at system initialization time. In one embodiment, the configuration registers may be modified dynamically, i.e. during operational mode of the graphics system. For example, the configuration routine may write the configuration registers to update the allocation of calculation units to video groups in response to a user turning on a new video stream or turning off an existing video stream.

Video Router Architecture

Figure 15:
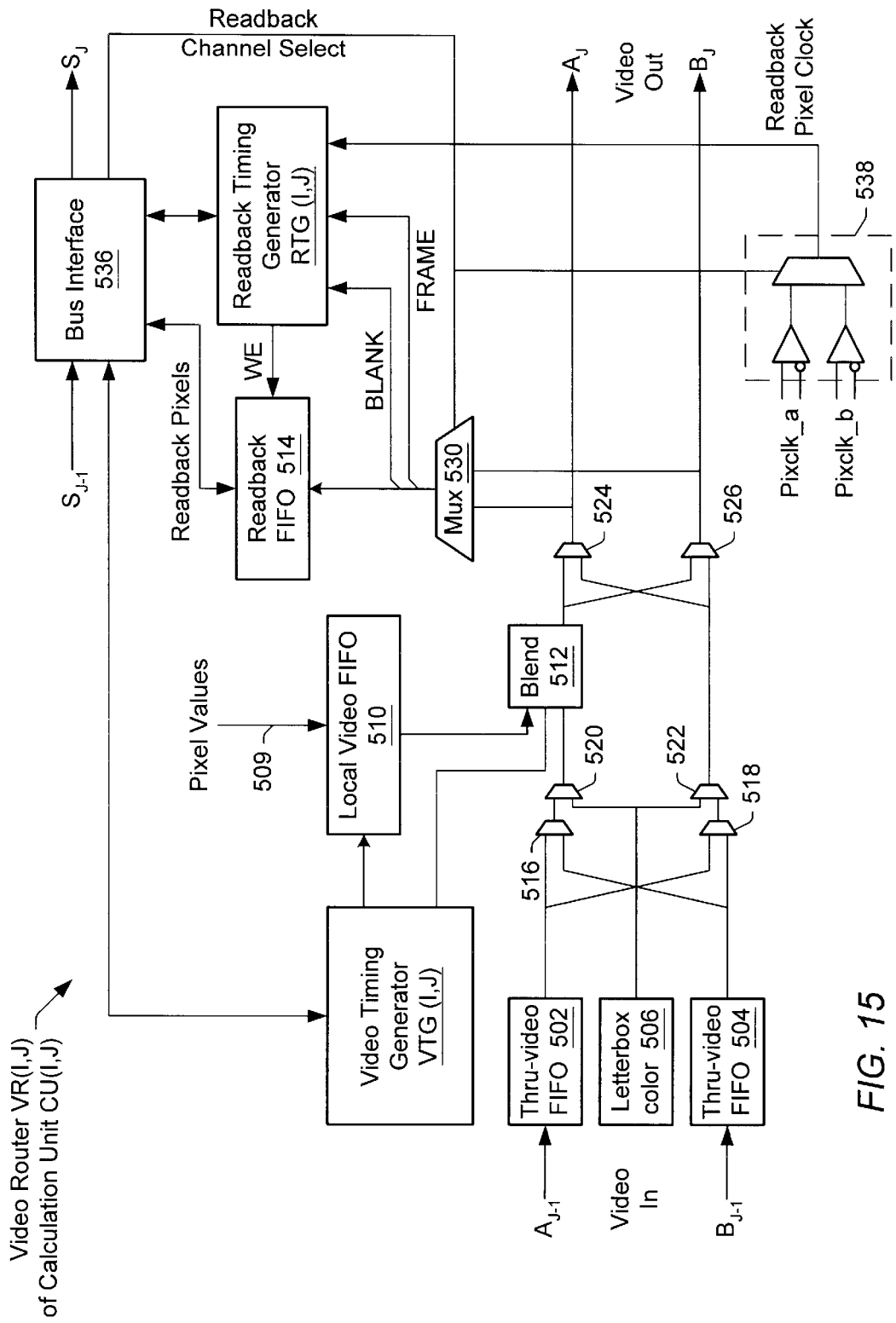
FIG. 15 illustrates one embodiment of a video router VR(I,J) in generic sample-to-pixel calculation unit CU(I,J)

FIG. 15 illustrates one embodiment of a video router unit VR(I,J) in generic sample-to-pixel calculation unit CU(I,J). Video router unit VR(I,J) comprises a thru-video FIFO 502, a thru-video FIFO 504, a letterbox color unit 506 (also referred to herein as a pixel source unit), a video timing generator VTG(I,J), a local video FIFO 510, a pixel integration unit 512 (also referred to herein as a blend unit), a readback timing generator RTG(I,J), a readback FIFO 514, multiplexors 516, 518, 520, 522, 524, 526 and 530, bus interface 536, and clock selection circuit 538.

Input video streams $A_{J-1}$ and $B_{J-1}$ may be provided by a previous sample-to-pixel calculation unit (situated in the same graphics board or a previous graphics boards). Each of thru-video FIFOs 502 and 504 receives one of the video streams $A_{J-1}$ and $B_{J-1}$. For simplicity of discussion, it is assumed that video stream $A_{J-1}$ is presented to thru-video FIFO 502 and video stream $B_{J-1}$ is presented to thru-video FIFO 504.

Thru-video FIFO 502 stores the digital data presented in video stream $A_{J-1}$. Similarly, thru-video FIFO 504 stores the digital data presented in the video stream $B_{J-1}$. Local video FIFO 510 temporarily stores the pixel values computed by earlier computational stages of sample-to-pixel calculation unit CU(I,J), e.g., the stages associated with steps 250–270 of FIG. 11.

Video router VR(I,J) generates video output streams $A_J$ and $B_J$ which correspond to video input streams $A_{J-1}$ and $B_{J-1}$ respectively. For simplicity of discussion, it is assumed that video output streams $A_J$ and $B_J$ are presented at the outputs of multiplexors 524 and 526 respectively. However, multiplexors 524 and 526 could just as well exchange the two video signals. The video streams $A_J$ and $B_J$ are transmitted to the next sample-to-pixel calculation unit (situated on the same graphics board or the next graphics board).

The output of multiplexor 524 equals the output of blend unit 512 or the output of multiplexor 522. The output of multiplexor 526 equals the output of blend unit 512 or the output of multiplexor 522.

Blend unit 512 is configured to mix (i.e. to blend or multiplex) the video output of multiplexor 520 and the locally generated pixels provided by local video FIFO 510. The term mixing as used herein includes alpha blending and/or multiplexing. In the later case, blend unit 512 may be realized by a multiplexor which selects between the output of local video FIFO 510 and the output of multiplexor 520.

Blend unit 512 is controlled by video timing generator VTG(I,J). The output of multiplexor 520 may equal the output of multiplexor 516 if the multiplexor 520 resides in a slave sample-to-pixel calculation unit, or, the output of letterbox color unit 506 if multiplexor 520 resides in a lead sample-to-pixel calculation unit of a video group. The output of multiplexor 516 may equal the output of thru-Video FIFO 502 or the output of thru-Video FIFO 504. Thus, blend unit 512 may mix (or inject) locally computed pixel values into video stream A or video stream B in response to control signals asserted by VTG(I,J). For the lead sample-to-pixel calculation unit in a video group, the blend unit 512 mixes (or injects) locally computed pixel values into the stream of dummy pixels originating from the letterbox unit 506. The term "inject" as used herein refers to the selective multiplexing of locally computed pixels into a video stream, i.e. the replacement of selected dummy pixels in the video stream with the locally computed pixels. The dummy pixels serve as timing place holders in the video stream. Each sample-to-pixel calculation unit in a video group mixes or replaces a subset of the dummy pixels with corresponding locally computed image pixels.

The output of multiplexor 522 may equal the output of letterbox color unit 506 or the output of multiplexor 518. The output of multiplexor 518 may equal the output of thru-Video FIFO 502 or the output of thru-Video FIFO 504. Thus, either of video streams A or B may get sent to the output stage through multiplexor 522, and thus, may bypass blend unit 512.

Local video FIFO 510 stores pixel values (e.g. red, green, blue and alpha values) provided on input bus 509 by previous computational stages of sample-to-pixel calculation unit CU(I,J).

Video router VR(I,J) includes a vertical counter and a horizontal counter. In the preferred embodiment, these counters may be conveniently located inside video timing generator VTG(I,J). However, in an alternative embodiment, these counters may be located outside the video timing generator.

Video timing generator VTG(I,J) provides all timing and control signals necessary to support video routing in sample-to-pixel calculation unit CU(I,J). It may be programmed via the segmented communication bus SCB. Furthermore, video timing generator VTG(I,J) generates horizontal sync, vertical sync, FRAME and BLANK signals consistent with the video steam to which it has been assigned. Blend unit 512 incorporates these signals into its output video stream.

All the video timing generators VTG(I,J) for the sample-to-pixel calculation units CU(I,J) in a video group run in synchrony with one another. This is accomplished by programming them to respond to the same pixel clock, and resetting their horizontal counters and vertical counters upon receipt of a horizontal reset pulse and vertical reset pulse respectively. For maximum flexibility in meeting video sync specifications, the horizontal sync (Hsync), vertical sync (Vsync) and BLANK signals presented to DACs 178A and 178B (see FIG. 3) are not the same as the horizontal reset (Hreset) signal and vertical reset (Vreset) signal which flow from one sample-to-pixel calculation unit to the next to accomplish the synchronization of the video timing generators. This allows the zero point of horizontal and vertical timing to be chosen independently of the placement of sync and blank edges in the video signal presented to external devices.

The blend units within the video routers of a video group do not alter the timing of the video stream which is established by the video timing generator in the lead calculation unit. Each blend unit waits until the current pixel position falls within a given column of the managed area, and initiates multiplexing or blending of locally computed image pixels into the received video stream. Thus, pixels in the received stream may be modified or replaced by the locally-computed image pixels.

Sample-to-pixel calculation units CU transfer data to/from control unit 140 through segmented communication bus SCB which comprises segments $S_{-1}, S_0, S_1, S_2, \ldots S_{V-1}$. Control unit 140 transmits data, destined for a particular sample-to-pixel calculation unit, onto the first bus segment $S_{-1}$, and each sample-to-pixel calculation unit forwards the data from its input segment to its output segment until the data reaches the particular sample-to-pixel calculation unit.

Video router VR(I,J) includes bus interface 536 for handling transfers on the segmented communication bus. Bus interface 536 receives data, from a previous sample-to-pixel calculation unit CU(I,J−1) where J is between 1 and V−1 inclusive and from control unit 140 in the case where J equals zero, through bus segment $S_{J-1}$. The received data may be targeted for sample-to-pixel calculation unit CU(I,J) or a downstream sample-to-pixel calculation unit CU(I,J+r), where r is a positive integer. The received data may include an identification header that specifies the targeted sample-to-pixel calculation unit.

If the data is targeted for sample-to-pixel calculation unit CU(I,J), bus interface 536 writes the received data words to one or more memory locations internal to (or associated with) sample-to-pixel calculation unit CU(I,J). If the data is targeted for a down-stream sample-to-pixel calculation unit, bus interface 536 transmits the data to the next sample-to-pixel calculation unit CU(I,J+1) through bus segment $S_J$.

Control unit 140 may also read data from an arbitrary sample-to-pixel calculation unit through the segmented communication bus. To do so, control unit 140 may send a memory read request to a particular sample-to-pixel calculation unit CU(I,J). In response to the memory read request, the bus interface 536 in video router VR(I,J) may read one or more memory locations internal to (or associated with) sample-to-pixel calculation unit CU(I,J), and transmit the resulting data words onto bus segment $S_J$. (The addresses of the one or more memory locations may be specified in the memory read request.) Each succeeding video router forwards the data words from its input segment to its output segment, until the data words arrive at control unit 140 through bus segment $S_{V-1}$.

In addition, as mentioned above, any of the sample-to-pixel calculation units may be configured to readback pixels to system memory 106 through the segmented communication bus and control unit 140. In response to a GET FRAME request received from host software, control unit 140 may send a FRAME READBACK request to a selected sample-to-pixel calculation unit CU(I,K) through the segmented communication bus. In response to the FRAME READBACK request, sample-to-pixel calculation unit CU(I,K) waits until the beginning of the next video frame, and transmits video pixels corresponding to the next frame or a portion thereof to control unit 140 through the segmented communication bus. Sample-to-pixel calculation unit CU(I, K) transmits the video pixels onto bus segment $S_K$, and each downstream sample-to-pixel calculation unit CU(I,K+r) forwards the video pixels from its input segment $S_{K+r-1}$ to its output segment $S_{K+r}$. Thus, the video pixels arrive at control unit 140 through bus segment $S_{V-1}$. Control unit 140 includes a staging FIFO for storing the video pixels prior to forwarding the video pixels to host memory 106. The storage capacity of the staging FIFO may be determined by factors such as the minimum expected bandwidth to host memory 106 through system bus 104 and the data rate of video pixel transfer through the segmented communication bus. In some embodiments, the storage capacity of the staging FIFO may be significantly less than a frame, e.g., 2 K bytes.

Control unit 140 also includes a DMA engine which is responsible for forwarding the video pixels from the staging FIFO to a buffer in host memory 106. The address of the host memory buffer may be specified in the GET FRAME request. Alternatively, the host software may reserve a ring of buffers in host memory 106, and send a RING INITIALIZE message to control unit 140. The RING INITIALIZE message may contain address information which defines the addresses of the buffers in the RING. The DMA engine may automatically jump to the address of the next buffer in the buffer ring in response to the GET FRAME request.

Control unit 140 may further include a bus output interface for writing data to the sample-to-pixel calculation units through bus segment $S_{-1}$, and a bus input interface for reading data from the sample-to-pixel calculation units through bus segment $S_{V-1}$. After sending the FRAME READBACK request to the selected sample-to-pixel calculation unit, the bus input interface enters a passive mode and waits to receive the video pixels from the selected sample-to-pixel calculation unit through bus segment $S_{V-1}$. The bus input interface receives the video pixels from bus segment $S_{V-1}$ and stores the video pixels into the staging FIFO. The DMA engine reads the video pixels from the staging FIFO and transmits the video pixels to host memory 106 through system bus 104. Control unit 140 also includes a host interface which arbitrates for access to system bus 104.

As described above, the segmented communication bus may serve as the medium for (a) video pixel readback to system memory and (b) normal read/writes from/to the sample-to-pixel calculation units. To expedite the transfer of video pixels to control unit 140 during readback mode, normal read/writes from/to the sample-to-pixel calculation units may be limited as follows. Suppose that control unit 140 commands sample-to-pixel calculation unit CU(I,K) to perform video pixel readback on a given video stream by sending a FRAME READBACK request to sample-to-pixel calculation unit CU(I,K). After receiving a FRAME READBACK request from control unit 140, bus interface 536 in sample-to-pixel calculation unit CU(I,K) may continue to receive normal traffic from the control unit 140 through its input segment $S_{K-1}$, but may disable the normal operations of forwarding data (from its input segment $S_{K-1}$ to its output segment $S_K$) or servicing memory read requests so that the series of bus segments from sample-to-pixel calculation unit CU(I,K) back to control unit 140 will be reserved for the pixel readback traffic. Thus, during readback mode, the bus output interface of control unit 140 may write data to any of sample-to-pixel calculation units CU(I,J) through the segmented communication bus, where J takes any value in the range 0, 1, 2, . . . , K. However, writes to sample-to-pixel calculation unit CU(I,J) for J=K+1, K+2, . . . , V−1 may be disabled. Furthermore, normal reads from all the sample-to-pixel calculation units may be disabled during pixel readback mode.

In one set of embodiments, control unit 140 and the sample-to-pixel calculation units may be interconnected by a separate bus (referred to herein as the pixel readback bus) dedicated for transferring video pixels to control unit 140, i.e. for the video readback process. Thus, normal reads/writes from/to sample-to-pixel calculation unit through the segmented communication bus and video pixel transfers through the pixel readback bus may be performed concurrently and independently. Similar to the segmented communication bus, the pixel readback bus may have a segmented structure and may be organized according to the principles of source-synchronous signaling.

In a second set of embodiments, control unit 140 and the sample-to-pixel calculation units may be interconnected by two or more pixel readback buses in addition to the segmented communication bus. Each of the pixel readback buses may have a segmented structure and may transfer data based on source-synchronous signaling. Thus, video pixels from two or more video streams may be simultaneously transferred to control unit 140 through the two or more pixel readback buses respectively. Control unit 140 may be configured with two more DMA engines to handle the transfer of the two more streams to corresponding buffers in system memory 106. For example, a first sample-to-pixel calculation unit $CU(I_1,J_1)$ may be programmed to transfer video pixels corresponding to a first readback region from a first video stream through a first of the pixel readback buses, and a second sample-to-pixel calculation unit $CU(I_2,J_2)$ may be programmed to transfer video pixels corresponding to a second readback region from a second video stream through a second of the pixel readback buses. Preferably, the first sample-to-pixel calculation unit $CU(I_1,J_1)$ is the last sample-to-pixel calculation unit of the video group which contributes to the first video stream or any sample-to-pixel calculation unit thereafter in the linear array. Similarly, the second sample-to-pixel calculation unit $CU(I_2,J_2)$ is preferably the last sample-to-pixel calculation unit of the video group which contributes to the second video stream or any sample-to-pixel calculation unit thereafter in the linear array.

Observe that readback FIFO 514 couples to bus interface 536, multiplexor 530 and readback timing generator RTG (I,J). Multiplexor 530 is configured to select either one of video output streams $A_J$ and $B_J$ generated by video router VR(I,J) in response to a readback channel selection signal provided by bus interface 536. (The selected video stream is referred to herein as the readback video stream.) The FRAME READBACK request may include channel selection information which determines the state of the readback channel selection signal. Readback FIFO 514 receives and stores pixels of the readback video stream in response to a write enable signal WE which is controlled by readback timing generator RTG(I,J). Thus, readback timing generator RTG(I,J) determines the set of pixels in a given frame which are captured in the readback process.

Clock selection circuit 538 selects between pixel clock A and pixel clock B in a manner consistent with the video stream selection performed by multiplexor 530 based on the readback channel selection signal. (Clock selection circuit 538 may include a pair of input buffers and a multiplexor.) The selected pixel clock is referred to herein as the readback pixel clock. Pixels are clocked into readback FIFO 514 based on the readback pixel clock (or a delayed version thereof). Thus, when readback FIFO 514 is enabled via the WE signal, pixels are written into readback FIFO 514 at the rate of the readback pixel clock. Bus interface 536 reads the pixels from readback FIFO 514 and sends the pixels to the bus input interface in control unit 140 through the segmented communication bus. As described above, the bus input interface stores the pixels in the staging FIFO, and the DMA engine forwards the pixels from the staging FIFO to a buffer in host memory 104. Alternatively, the DMA engine may forward the pixels to a memory resident within local graphics board GB(I) or another graphics board. For example, one or more of rendering memories 152A–D may be the target for the forwarding operation. Thus, video pixels generated in one frame for a selected video channel may be used to compute samples for successive frames in the same video channel or other video channels.

Readback timing generator RTG(I,J) receives the readback pixel clock from clock selection circuit 538. Readback timing generator RTG(I,J) includes an X counter and a Y counter which are responsive to the readback pixel clock. These counters are referred to herein as the readback counters to distinguish them from the counters associated with video timing generator VTG(I,J). The X counter increments in response to transitions of the readback pixel clock. The Y counter may increment in response to the X counter attaining an upper limit value corresponding to the end of a horizontal line.

Readback timing generator RTG(I,J) includes a set of registers which define the extent of a readback region within the video channel selected for readback (referred to herein as the readback video channel). For example, the registers may define the pixel-coordinate boundaries of a rectangle in the readback video channel. Readback timing generator RTG(I, J) includes a set of comparators which compare (a) the X count of the X counter to the left and right boundary values of the readback region, and (b) the Y count of the Y counter to the top and bottom boundary values of the readback region. When the X count falls between the left and right boundaries of the readback region, and Y count falls between the top and bottom boundaries of the readback region, readback timing generator RTG(I,J) drives the write enable signal WE into a first state which allows readback FIFO 514 to capture pixels of the readback video stream. In some embodiments, a formatting unit may intervene between the output of mux 530 and readback FIFO 514 to package the video pixels into a format appropriate for transmission on the segmented communication bus and/or for storage in readback FIFO 514.

Each of video streams $A_J$ and $B_J$ includes a FRAME signal and a BLANK signal. One of these streams, referred to herein as the modified stream, will have been generated by local blend unit 512. The other stream, referred to herein as the unmodified stream, will have bypassed local blend unit 512. The FRAME and BLANK signals of the modified stream will have been generated by the local video timing generator, i.e. video timing generator VTG(I,J). In contrast, the FRAME and BLANK signals of the unmodified stream will have been generated by the video timing generator in an upstream video router, e.g., the last video router of the video group corresponding to the unmodified stream, and have been passed downstream through the intervening thru-video FIFO's.

Multiplexor 530 selects one of video streams $A_J$ and $B_J$ to be the readback video stream. The FRAME signal and BLANK signal of the readback video stream are presented to readback timing generator RTG(I,J). The X counter resets based on the BLANK signal (e.g. in response to one of the edge transitions of the BLANK signal), and the Y counter resets based on the FRAME signal (e.g. in response to one of the edge transitions of the FRAME signal).

The last sample-to-pixel calculation unit in the last graphics board may be the most natural choice for sourcing the pixel readback because all video streams are available in a completed state in this sample-to-pixel calculation unit. In one set of embodiments, each video router VR(I,J) includes the same circuitry, and thus, it is possible to perform pixel readback from any of the sample-to-pixel calculation units. For example, in FIG. 13, video stream A will have attained a completed state in sample-to-pixel calculation unit CU(0, 1). Thus, pixel readback on video stream A may be sourced from sample-to-pixel calculation unit CU(0,1) or any following sample-to-pixel calculation unit in the linear sequence.

Figure 16:
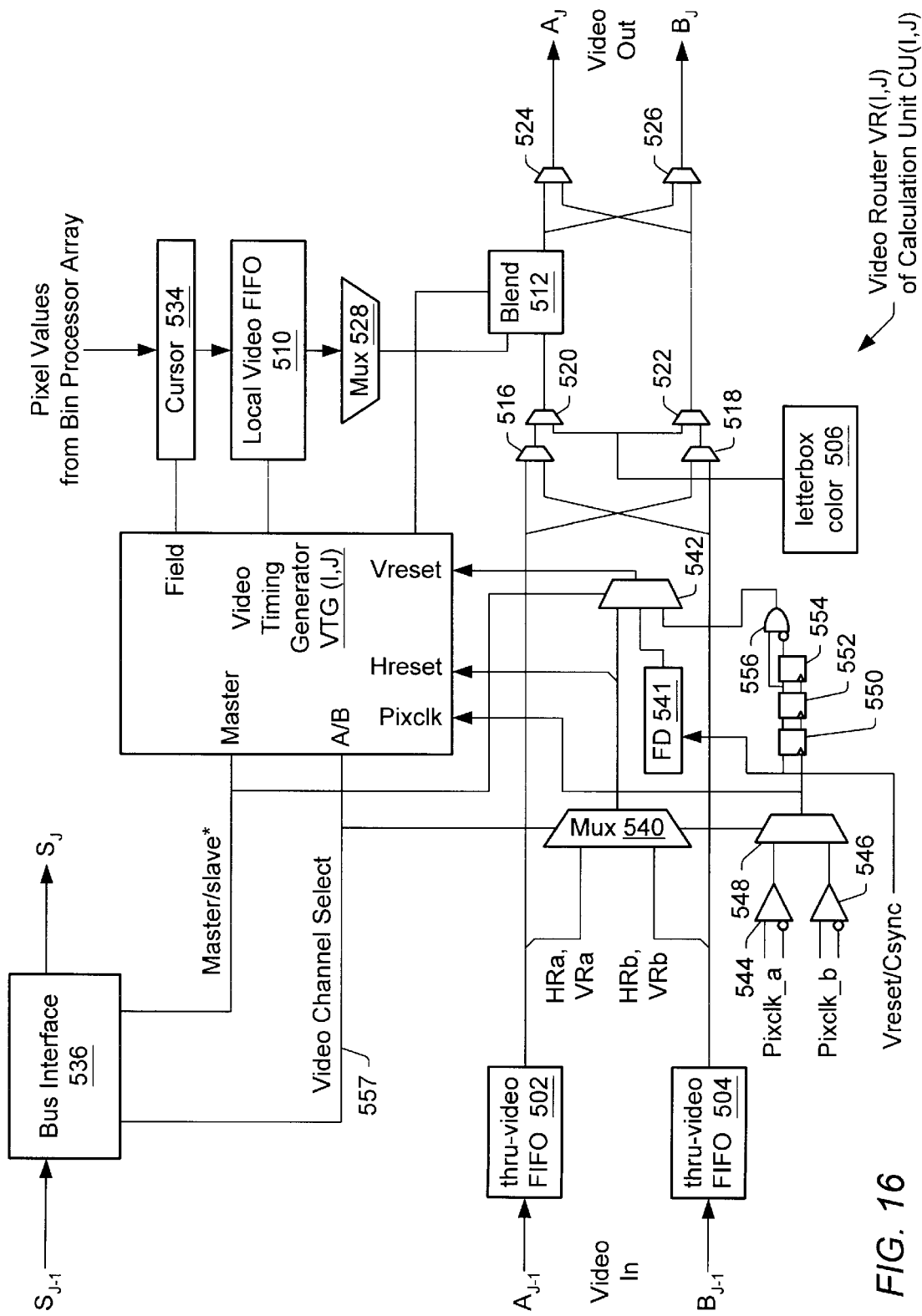
FIG. 16 illustrates a second embodiment of video router VR(I,J) in generic sample-to-pixel calculation unit CU(I,J)

FIG. 16 presents additional details concerning the generation of video timing for the video router VR(I,J) of FIG. 15. For simplicity, some of the elements of FIG. 15 not pertaining to video timing generation have been suppressed in FIG. 16. FIG. 16 shows that video router VR(I,J) may further comprise:

- color field-sequential multiplexor 528 (at the output of local video FIFO 510);
- cursor generator 534 (which feeds local video FIFO 510);
- multiplexor 540 (which receives Hreset_A and Vreset_A inputs from thru-video FIFO 502, and Hreset_B and Vreset_B inputs from thru-video FIFO 504);
- frame detector 541;
- multiplexor 542 (which couples to the outputs of multiplexor 540, frame detector 541 and gate 556);
- buffers 544 and 546;
- multiplexor 548 at the output of the buffers;
- flip-flops 550, 552, 554; and gate 556.

Assigning sample-to-pixel calculation unit CU(I,J) to a video group implies that its video timing generator VTG(I,J) uses the pixel clock, horizontal reset and vertical reset signals of the corresponding video stream. For example, if sample-to-pixel calculation unit CU(I,J) has been assigned to video group A, then video timing generator VTG(I,J) drives video channel selection signal 557 to a first state which indicates that video stream A is chosen. Thus, multiplexor 540 selects the horizontal reset (Hreset) and vertical reset (Vreset) from video stream A instead of video stream B. Also, multiplexor 548 selects pixel clock A instead of pixel clock B.

Figure 17:
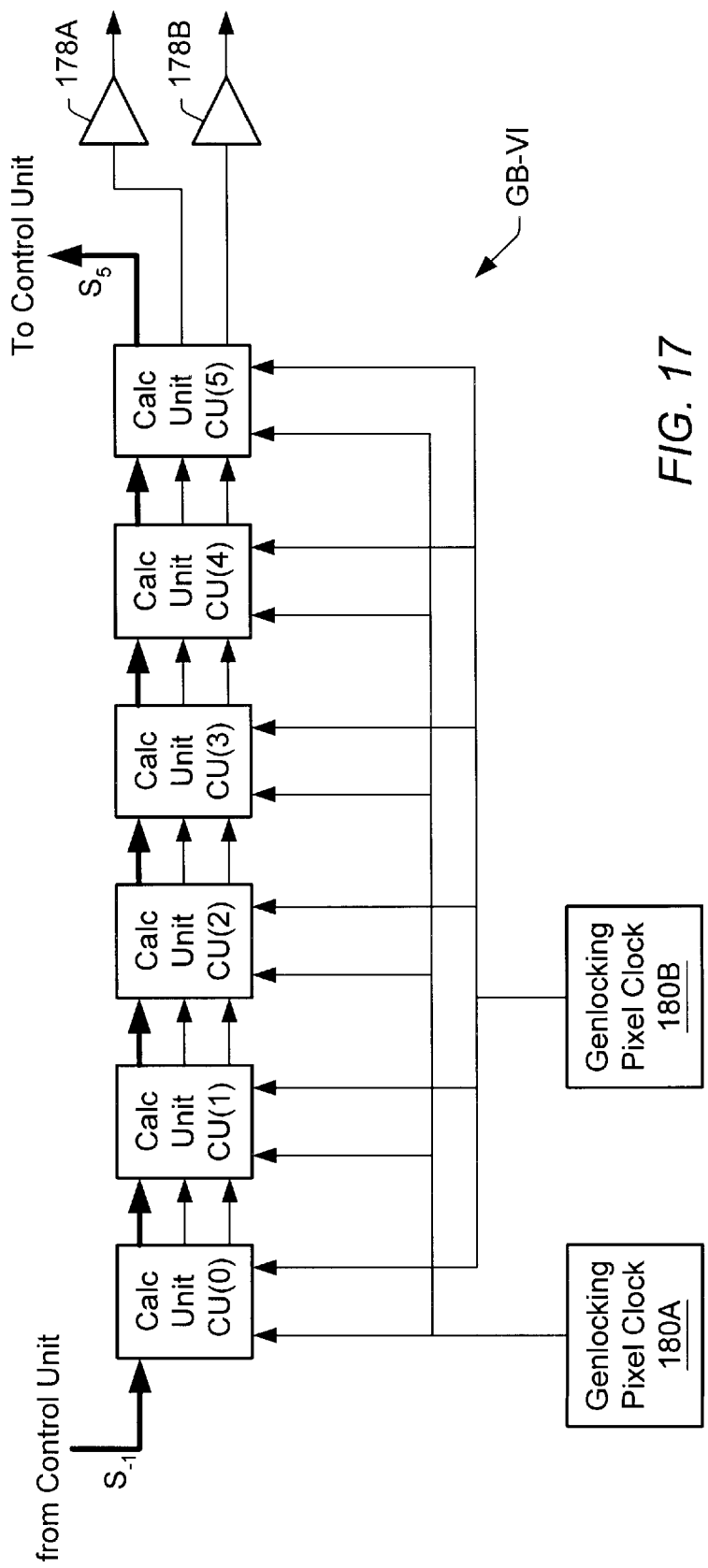
FIG. 17 illustrates one embodiment of a graphics board having six sample-to-pixel calculation units.

FIG. 17 shows an embodiment of a graphics board denoted GB-VI having six sample-to-pixel calculation units CU(0) through CU(5), genlocking pixel clocks 180A and 180B, and DACs 178A and 178B. Genlocking pixel clock 180A provides pixel clock signal A to each of sample-to-pixel calculation units CU(0) through CU(5). Similarly, genlocking pixel clock 180B provides pixel clock signal B to each of sample-to-pixel calculation units CU(0) through CU(5).

Figure 18:
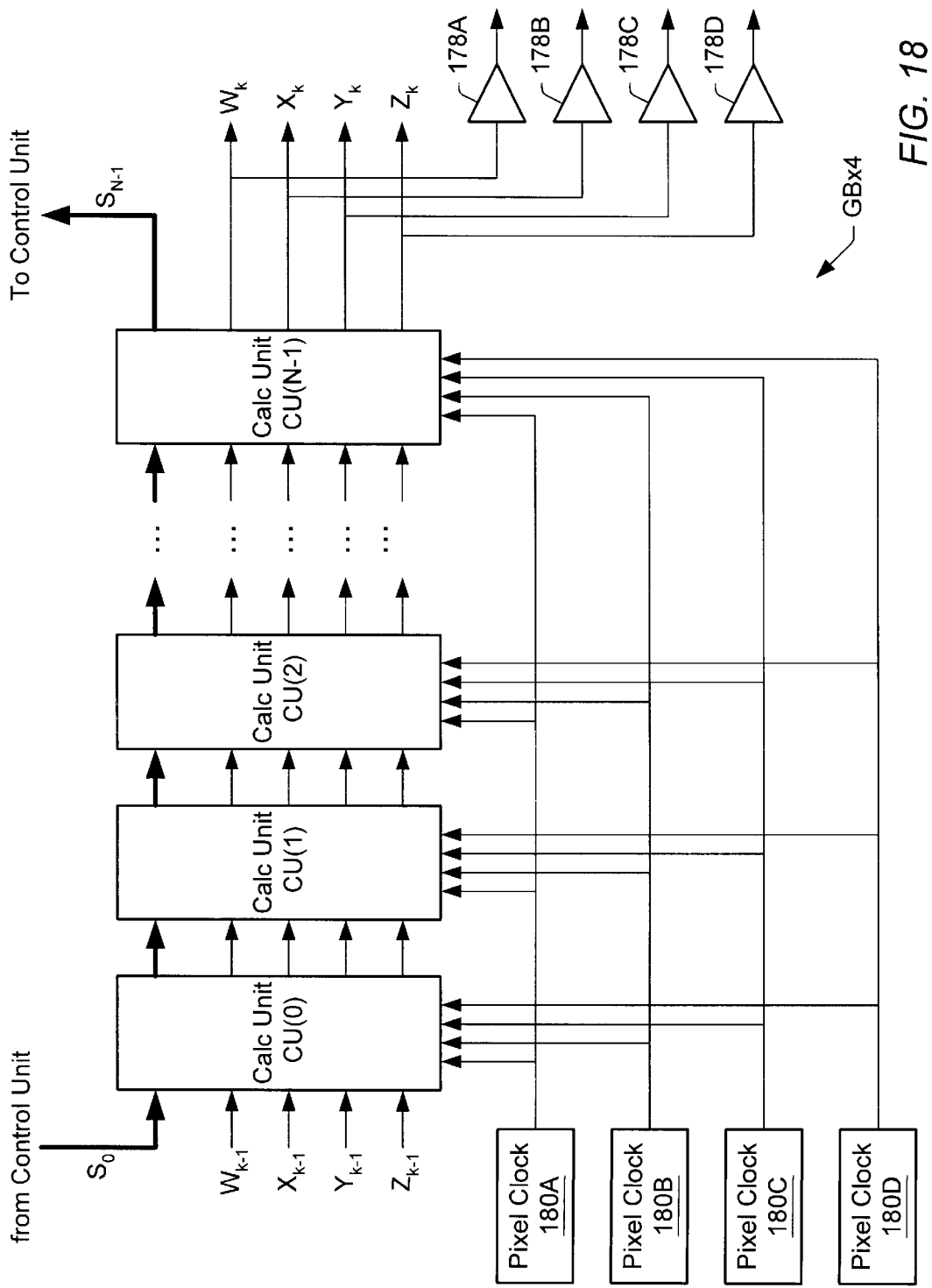
FIG. 18 illustrates one embodiment of a graphics board denoted GBx4 having N sample-to-pixel calculation units and configured to generate and/or operate on four simultaneous video streams.

FIG. 18 illustrates one embodiment of a graphics board denoted GBx4 which may be configured to generate up to four simultaneous video streams. Graphics board GBx4 may comprise N sample-to-pixel calculation units denoted CU(0) through CU(N−1), digital-to-analog converters 178A–D, and genlocking pixel clocks 180A–D. Each of the pixel clocks generates a clock for a corresponding one of the video streams.

Sample-to-pixel calculation unit CU(0) may be configured to receive video streams $W_{K-1}$, $X_{K-1}$, $Y_{K-1}$ and $Z_{K-1}$ from a previous graphics board GB(K−1). Each of sample-to-pixel calculation units CU(0) through CU(N−1) may be programmed to contribute its locally generated image pixels to one of the four video streams. Last sample-to-pixel calculation unit CU(N−1) passes the modified video streams $W_K$, $X_K$, $Y_K$ and $Z_K$ to the next graphics board and/or to DACs 178.

As described in the various embodiments above, the video routers comprised within the graphics boards of graphics system 112 form a linear array. In addition, the video routers in a video group comprise a chain. The video router at the head of the chain is the leader of the video timing for the chain. All other video routers in the chain (i.e. in the video group) synchronize themselves to the timing of the lead video router (using synchronous horizontal and vertical resets), and thus, are referred to as slave units. For example, in FIG. 13, video router VR(0,0) in sample-to-pixel calculation unit CU(0,0) is the head of the A chain, and video router VR(0,2) in sample-to-pixel calculation unit CU(0,2) is the head of the B chain.

Video router VR(I,J) may be programmed to operate in leader mode or in slave mode. A software configuration routine may program each of the video routers in the linear array with their corresponding group assignment and lead/slave mode assignment.

In one alternative embodiment, specialized lead routers and slave routers are contemplated. Lead routers may be implemented without the thru-video FIFOs, and slave routers may be implemented without the letterbox color unit.

Video router VR(I,J) in sample-to-pixel calculation unit CU(I,J) is the basic building block of a scalable video architecture. The horizontal counters and vertical counters in the video timing generators VTG(I,J) of video group A may cover the extent of channel A as shown in any of FIGS. 14A–E. The horizontal counters and vertical counters in the video timing generators VTG(I,J) of video group B may cover the extent of channel B as shown in any of FIGS. 14A–D. The horizontal and vertical size in pixel dimensions of channel X may be programmed into each sample-to-pixel calculation unit of video group X at system initialization time, where X equals A or B.

Each sample-to-pixel calculation unit CU(I,J) of video group A is assigned a corresponding column of channel A, and each sample-to-pixel calculation unit CU(I,J) of video group B is assigned a corresponding column of channel B. Sample-to-pixel calculation unit CU(I,J) generates pixel values for its assigned column. Thus, the video timing generator VTG(I,J) in sample-to-pixel calculation unit CU(I,J) contains boundary registers which define the left, right, top and bottom boundary values for the assigned column. The horizontal pixel count generated by the horizontal counter is compared to the left and right boundary values of the assigned column, and the vertical line count generated by the vertical counter is compared to the top and bottom boundary values of the assigned column.

When (a) the horizontal pixel count is between the left and right column boundaries, and (b) the vertical line count is between the top and bottom column boundaries, video router VR(I,J) of sample-to-pixel calculation unit CU(I,J) will route pixels from the local video FIFO 510 to blend unit 512, and blend unit 512 will mix the locally computed pixels with corresponding pixels (typically dummy pixels) presented in video stream S, where S equals A or B depending on the video group assignment of the video router. As used herein the term "mix" is intended to include alpha blending or pixel replacement. Thus, blend unit 512 may replace dummy pixels in video stream S with locally generated pixels when (a) and (b) are true. Additionally, video router VR(I,J) may sense whether or not the current field is the correct field of a video frame.

In the preferred embodiment, each video timing generator VTG(I,J) includes boundary checking circuitry comprising one or more comparators. The boundary checking circuitry compares the horizontal pixel count $C_H$ to the left column boundary $N_{left}$ and right column boundary $N_{right}$, and the vertical line count $C_V$ to the top column boundary $N_{top}$ and bottom column boundary $N_{bottom}$. Video timing generator VTG(I,J) may be configured to declare the current pixel as interior to the assigned column when its horizontal pixel count $C_H$ and vertical line count $C_V$ obey the constraints:

$$N_{left} \leq C_H < N_{right}, \text{ and}$$

$$N_{top} \leq C_V < N_{bottom},$$

Because each video timing generator VTG(I,J) applies boundary checking in this fashion, with strict and permissive inequalities at opposing boundaries of the corresponding column, it is easy to configure the video timing generators VTG(I,J) of a video group to tile (i.e. to completely cover without overlapping) a desired region of the managed area. For example, two columns which meet side by side without an intervening gap may be configured by writing the left and right boundary registers of a first video timing generator with the values A and B respectively, and the writing the left and right boundary registers of the next video timing generator with the values B and C respectively. If strict (or permissive inequalities) were used for both horizontal boundaries (or both vertical boundaries) the process of initializing the boundary registers would be more complicated.

Of course, it is not necessary that the strict inequality be used for the right and bottom boundaries as long as all the video timing generators apply a consistent system of inequalities with the strict and permissive inequalities at opposing boundaries. Thus, any of the three following systems would equally suffice:

$$N_{left} \leq C_H < I_{right}, N_{top} < C_V \leq N_{bottom}; \quad (1)$$

$$N_{left} < C_H \leq I_{right}, N_{top} \leq C_V < N_{bottom}; \quad (2)$$

$$N_{left} < C_H \leq I_{right}, N_{top} < C_V \leq N_{bottom}. \quad (3)$$

The horizontal and vertical counts are said to "reside within" or "fall within" the assigned column for a given sample-to-pixel calculation unit (and its associated video timing generator) when the horizontal and vertical counts obey the corresponding local set of inequalities. The horizontal and vertical counts are said to "reside outside" or "fall outside" the assigned column when any of the inequalities (left, right, top or bottom) of the local set fails to be satisfied. Furthermore, the horizontal count is said to "fall between", "fall within", or "reside within" the left and right column boundaries when the left and right inequalities of the local set are satisfied. Likewise, the vertical count is said to "fall between", "fall within", or "reside within" the top and bottom column boundaries when the top and bottom inequalities of the local set are satisfied. The term "vertical count" may be equivalently referred to as the vertical pixel count or the vertical line count. Similar terms are used to describe the relationships of the X count and Y count of the X and Y readback counters respectively to the readback region defined by the readback extent registers.

The columns assigned to the sample-to-pixel calculation units CU(I,J) of video group A may tile channel A vertically and/or horizontally. Similarly, the columns assigned to the sample-to-pixel calculation units CU(I,J) of video group B may tile channel B vertically and/or horizontally. In one alternative embodiment, two or more of the columns assigned to the sample-to-pixel calculation units of a video group may overlap partially or completely. Thus, it is possible for a downstream calculation unit to mix its locally computed image pixels with pixel images contributed by one or more upstream calculations units.

Graphics board GB(K) may be able to synchronize its video timing to a wide variety of external video timing formats. To attain such flexibility has been expensive in the past, and most computer graphics systems have not attempted it at all, or have simply provided an asynchronous frame-reset feature. The asynchronous frame reset may be sufficient for some applications, but it fails to adequately address the requirements of many emerging application areas such as virtual reality, multimedia authoring, many simulation applications, and video post-production. True line-rate genlock may be a requirement for these markets. Thus, graphics system 112 may, in some embodiments, provide improved performance relative to prior art graphics systems in these application areas. Furthermore, there are many applications which are not seen as traditional genlock applications, where, nevertheless, genlock capability is quite beneficial.

In video post-production, graphics system 112 synchronizes to one or more video sources in a production facility. A user-specified horizontal phase offset during genlock may be required for this application.

As described above in connection with FIG. 13, the sample-to-pixel calculation units CU(I,J) of video group A contribute pixel values to video stream A. The sample-to-pixel calculation units of video group B pass video stream A without modification, i.e. without modification of pixel values contained in video stream A. Thus, video stream A is routed digitally through the linear array, i.e. from first sample-to-pixel calculation unit CU(0,0) in the first graphics board GB(0) through the last sample-to-pixel calculation unit CU(R−1,V−1) in the last graphics board GB(R−1). Video stream B is routed digitally through the sample-to-pixel calculation units CU(I,J) comprising video group B.

Figure 13:
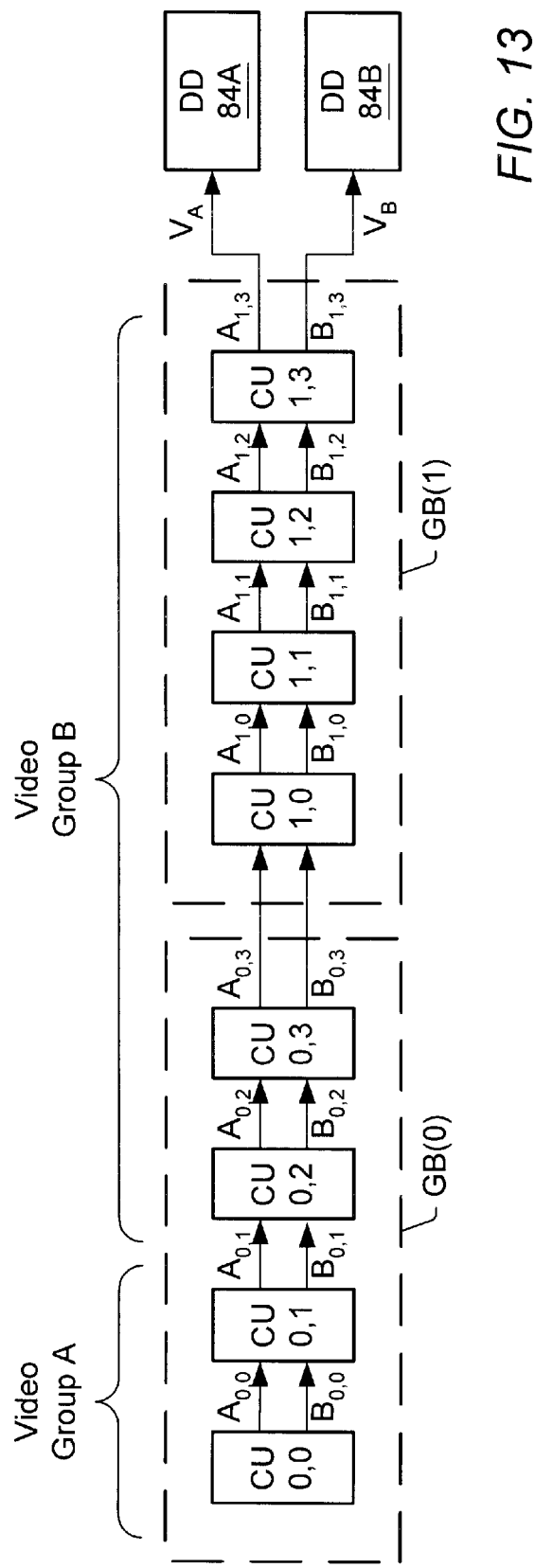
FIG. 13 illustrates one embodiment of a linear array of sample-to-pixel calculation unit CU(I,J) comprised within two graphics boards GB(0) and GB(1)

For example, in FIG. 13, video stream A is routed from sample-to-pixel calculation unit CU(0,0) through sample-to-pixel calculation unit CU(1,3), and video stream B is routed from sample-to-pixel calculation unit CU(0,2) through sample-to-pixel calculation unit CU(1,3). The video timing generator VTG(0,0) in sample-to-pixel calculation unit CU(0,0) is the lead video timing generator for video stream A. The video timing generator VTG(0,2) in sample-to-pixel calculation unit CU(0,2) is the lead VTG for video stream B.

Figure 19:
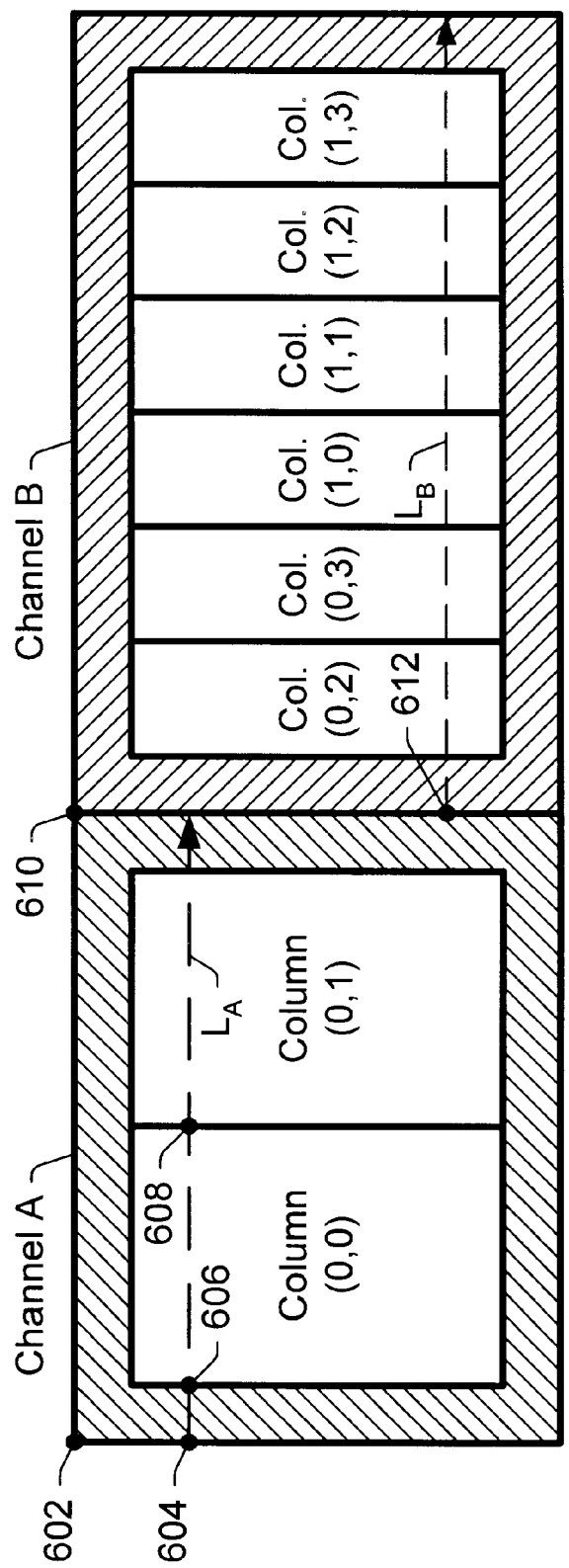
FIG. 19 illustrates one embodiment for the assignment of columns (I,J) to each sample-to-pixel calculation unit CU(I,J) for collaborative generation of two video streams corresponding to channel A and channel B respectively.

Typical scanlines $L_A$ and $L_B$ for channel A and channel B respectively are shown in FIG. 19. Sample-to-pixel calculation unit CU(0,0) generates video stream $A_{0,0}$ as shown in FIG. 13. Pixels computed by sample-to-pixel calculation unit CU(0,0) are mixed (or injected) into video stream $A_{0,0}$ when the horizontal count and vertical count of video router VR(0,0) reside within the boundaries of column (0,0) which may comprise a rectangular area of pixels. When the horizontal or vertical counts of video router VR(0,0) reside outside of column (0,0), video router VR(0,0) transmits dummy pixel values from its letterbox color unit 506 into video stream $A_{0,0}$. Video router VR(0,0), because it is the lead video router for video group A, embeds:

(1) a horizontal reset pulse into video stream $A_{0,0}$ when its horizontal pixel counter corresponds to the left boundary of Channel A as exemplified by point 604; and (2) a vertical reset pulse into video stream $A_{0,0}$ when its vertical line counter and horizontal pixel counter correspond to the top left corner 602 of video channel A.

Furthermore, video router VR(0,0) transmits words out of local video FIFO 510 and letterbox color unit 506 using pixel clock signal A generated by genlocking pixel clock 180A. Video router VR(0,0) may embed a synchronous copy of pixel clock signal A along with the data words into video stream $A_{0,0}$ (See FIG. 25).

Video router VR(0,1) in the next sample-to-pixel calculation unit CU(0,1) uses the embedded clock signal to clock video stream $A_{0,0}$ into its thru-video FIFO 502. Because the embedded clock signal travels along with the data in video stream $A_{0,0}$ the setup and hold relationships between clock and data signals are preserved unlike systems which clock all FIFOs with a clock distributed from a central source.

Video router VR(0,1) uses pixel clock signal A distributed from pixel clock 180A to clock data out of its thru-video FIFO 502. Because the embedded clock signal (in the received video stream) and the centrally distributed clock signal A have the same frequency, and because thru-video FIFO 502 is written on every clock and read on every clock, thru-video FIFO 502 never overflows or underflows. Thus, the flow of video data through the video routers is insensitive to the delays induced by the buffers in the chain.

Video router VR(0,1) may use the centrally distributed pixel clock signal A to drive its horizontal counter. Video router VR(0,1) may use the vertical reset pulse and horizontal reset pulse from video stream $A_{0,0}$ (as they emerge from thru-video FIFO 502) to reset its vertical counter and horizontal counter respectively. The vertical counter in video router VR(0,1) may increment once per horizontal scan line of channel A. In one embodiment, the vertical counter may increment in response to the horizontal reset. In another embodiment, the vertical counter may increment in response to the horizontal count value attaining a maximum value which corresponds to the right boundary of channel A.

When the horizontal and vertical counts of video router VR(0,1) reside within Column (0,1) of channel A as shown in FIG. 19, video router VR(0,1) clocks locally computed pixel values out of its local video FIFO 510, and mixes the locally computed pixel values into the stream of dummy pixel values emerging from thru-video FIFO 502. The mixing is performed in blend unit 512. Blend unit 512 may use alpha values provided by the local pixel stream or alpha values provided in the thru-video pixel stream depending on a local/thru selection signal provided by video timing generator VTG(0,1). The mixed output of blend unit 512 comprises the output video stream $A_{0,1}$.

When the horizontal or vertical counts of video router VR(0,1) reside outside of Column (0,1) of channel A, video timing generator VTG(0,1) commands the local blend unit 512 to pass the video stream emerging from thru-video FIFO 502 to the channel A output unmodified. In other words, the output of thru-video FIFO 502 is transmitted as output video stream $A_{0,1}$.

Because sample-to-pixel calculation unit CU(0,1) is the last sample-to-pixel calculation unit in video group A, the pixel values comprised in video stream $A_{0,1}$ pass unmodified through sample-to-pixel calculation units CU(0,2) through CU(1,3). Sample-to-pixel calculation unit CU(1,3) in graphics board GB(1) may provide the completed video stream A to display device 84A (perhaps through a D/A converter). Since video stream A is complete at the output of sample-to-pixel calculation unit CU(0,1), sample-to-pixel calculation unit CU(0,3), which is the last sample-to-pixel calculation unit in graphics board GB(0), may present the completed video stream A to display device 84A. In other words, a video stream may be transmitted to a display device from the first graphics board in which it has reached a completed state.

Sample-to-pixel calculation unit CU(0,2) generates video stream $B_{0,2}$ as shown in FIG. 13. Pixels computed by sample-to-pixel calculation unit CU(0,2) are mixed into video stream $B_{0,2}$ when the horizontal and vertical counts of video router VR(0,2) reside within the boundaries of Column (0,2) of channel B as shown in FIG. 19. When the horizontal or vertical counts of video router VR(0,2) reside outside of column (0,2), video router VR(0,2) transmits dummy pixel values from its letterbox color unit 506 into video stream $B_{0,2}$. Video router VR(0,2), because it is the lead video router of video group B, embeds:

(1) a horizontal reset pulse into video stream $B_{0,2}$ when its horizontal pixel counter corresponds to the left boundary of Channel B as exemplified by point 612; and (2) a vertical reset pulse into video stream $B_{0,2}$ when its vertical line counter and horizontal pixel counter correspond to the top left corner 610 of video channel B.

Furthermore, video router VR(0,2) transmits words out of its local video FIFO 510 and letterbox color unit 506 using pixel clock signal B generated by genlocking pixel clock 180B. Video router VR(0,2) may embed a synchronous copy of pixel clock signal B along with the data words into video stream $B_{0,2}$. Video router VR(0,3) in the next sample-to-pixel calculation unit CU(0,3) uses the embedded clock signal to clock video stream $B_{0,2}$ into its thru-video FIFO 504.

Video router VR(0,3) uses pixel clock signal B distributed from pixel clock 180B to clock data out of the thru-video FIFO 504. Because the embedded clock signal (received with the video stream $B_{0,2}$) and the centrally distributed clock signal B have the same frequency, and because thru-video FIFO 504 is written on every clock and read on every clock, thru-video FIFO 504 never overflows or underflows. Thus, the flow of video data through the video routers of video group B is insensitive to the delays induced by the thru-video FIFOs.

Video router VR(0,3) uses the centrally distributed pixel clock signal B to drive its horizontal counter. The vertical counter in video router VR(0,3) may increment once per horizontal scan line of channel B. In one embodiment, the vertical counter may increment in response to the horizontal reset received from thru-video FIFO 504. In another embodiment, the vertical counter may increment in response to the horizontal count value attaining a maximum value which corresponds to the right boundary of channel B. Also, video router VR(0,3) uses the vertical reset pulse and horizontal reset pulse from video stream $B_{0,2}$ as they emerge from thru-video FIFO 504 to reset its vertical counter and horizontal counter respectively.

When the horizontal and vertical counts of video router VR(0,3) reside within Column (0,3) of channel B, video router VR(0,3) clocks locally computed pixel values out of its local video FIFO 510, and mixes the locally computed pixel values into the stream of pixel values emerging from its thru-video FIFO 504. The mixing is performed in blend unit 512. The blend unit 512 may use alpha values provided by the local pixel stream or alpha value provided by the thru-video pixel stream depending on a local/thru selection signal provided by video timing generator VTG(0,3). The mixed output of blend unit 512 is transmitted as the output video stream $B_{0,3}$.

When the horizontal or vertical counts of video router VR(0,3) reside outside of Column (0,3) of channel B, video timing generator VTG(0,3) commands the local blend unit 512 to pass the video stream emerging from thru-video FIFO 502 to the channel B output unmodified. Thus, the output of thru-video FIFO 504 becomes the output video stream $B_{0,3}$.

Each slave sample-to-pixel calculation unit CU(I,J) in video group B mixes locally computed pixels into video stream B when its horizontal and vertical counter values reside within the corresponding column (I,J) of channel B. When its horizontal or vertical counter values reside outside the corresponding column (I,J), sample-to-pixel calculation unit CU(I,J) passes video stream B unmodified from its thru-video FIFO 504 to the next sample-to-pixel calculation unit in video stream $B_{I,J}$.

In general, each sample-to-pixel calculation unit CU(I,J) in a video group mixes locally computed pixels into the corresponding video stream when its local horizontal and vertical count values reside in the corresponding column (I,J). Each slave sample-to-pixel calculation unit in a video group passes the corresponding video stream unmodified to its output when its local horizontal and vertical count values reside outside the corresponding column (I,J). The lead sample-to-pixel calculation unit in a video group sources dummy pixels (i.e. timing "place-holder" pixels) when it is not sourcing locally generated pixels from its local video FIFO 510, i.e. when its local horizontal or vertical count values reside outside the corresponding column (I,J). These dummy pixels may be replaced with video pixels by the slave sample-to-pixel calculation units CU(I,J) of the same video group before the video stream is finally displayed, after having passed through the final sample-to-pixel calculation unit in the linear array. Note that "letterboxing" occurs in those regions for which none of the sample-to-pixel calculation units contribute computed image pixels. This is suggested in FIG. 14D. In order to have well-defined colors in letterboxed areas, the lead sample-to-pixel calculation unit (at the head of each video chain) may send out its dummy pixels from a programmable RGB register in letterbox color unit 506 instead of from a thru-Video FIFO.

As noted above, the video router VR(I,J) contains a vertical counter. The vertical counter is compared with vertical limit registers (also referred to herein as vertical boundary registers) indicating the vertical extent of the assigned column (I,J). This is useful in multi-board collaborative video applications, where it is desirable to tile a single screen (i.e. channel) vertically as well as horizontally with the video output from multiple graphics boards GB(I).

Figure 20:
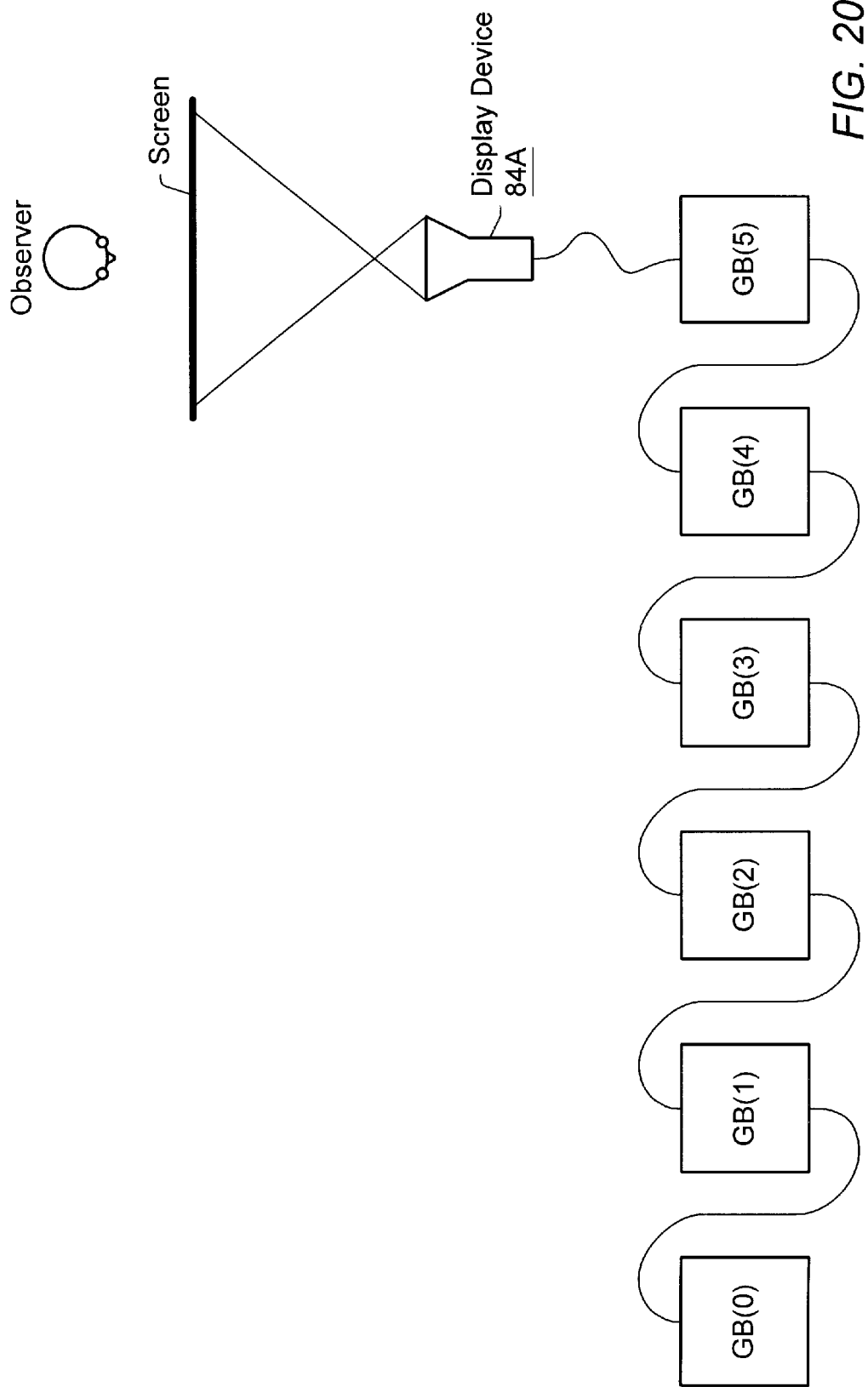
FIG. 20 illustrates one embodiment of a chain of graphics boards cooperating to generate a video signal for display device 84A.

FIG. 20 shows an example of multi-board collaboration where all six graphics boards GB(0) through GB(5) are assigned to video channel A, and none are assigned to channel B. Video stream A is daisy-chained digitally from graphics board GB(0) through GB(5), and displayed through display device 84A. Because the video timing generators VTG(I,J) in the sample-to-pixel calculation units CU(I,J) perform vertical bounds checking as well as horizontal bounds checking as described above, the graphics boards GB(I) contribute their locally computed pixel values to video stream A in an orderly fashion.

Figure 21:
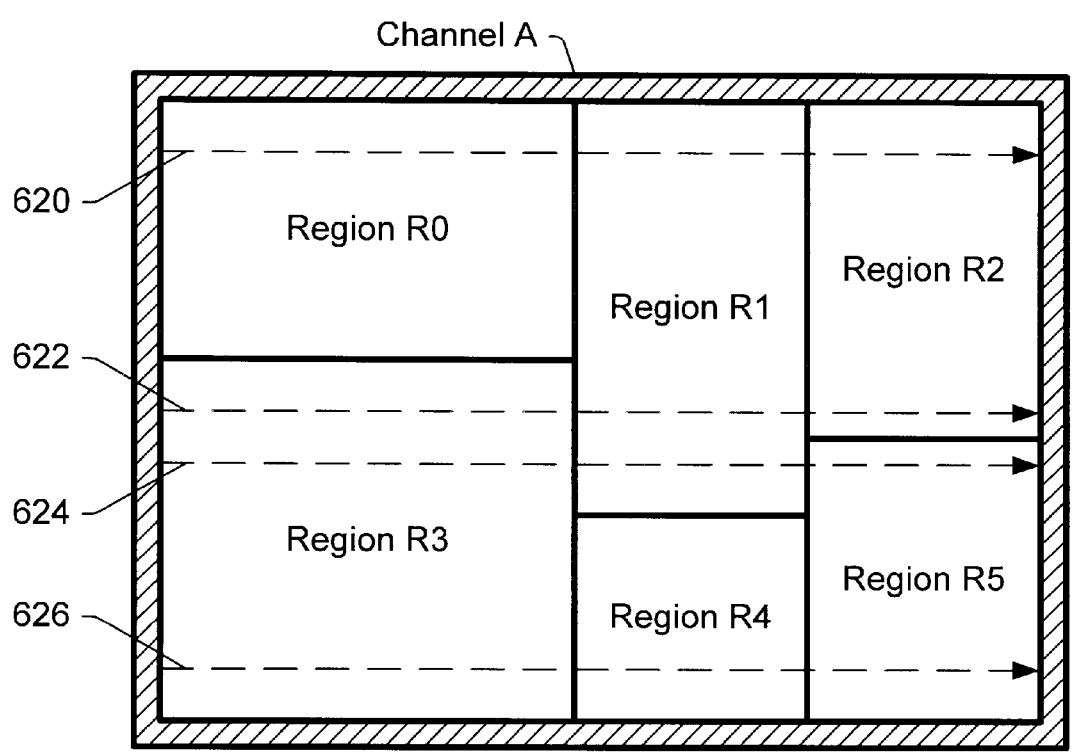
FIG. 21 illustrates one embodiment for the partitioning of channel A into regions R0–R5 corresponding to graphics boards GB(0) through GB(5) respectively.

FIG. 21 shows one possible mapping of regions to the graphics boards of FIG. 20. Regions R0–R5 of channel A are assigned respectively to graphics boards GB(0) through GB(5). Region RI is assigned to graphics board GB(I). Each sample-to-pixel calculation unit CU(I,J) in graphics board GB(I) operates on a column (I,J) within region RI. Four representative scan lines are illustrated and labeled 620, 622, 624 and 626 respectively.

Figure 22A:
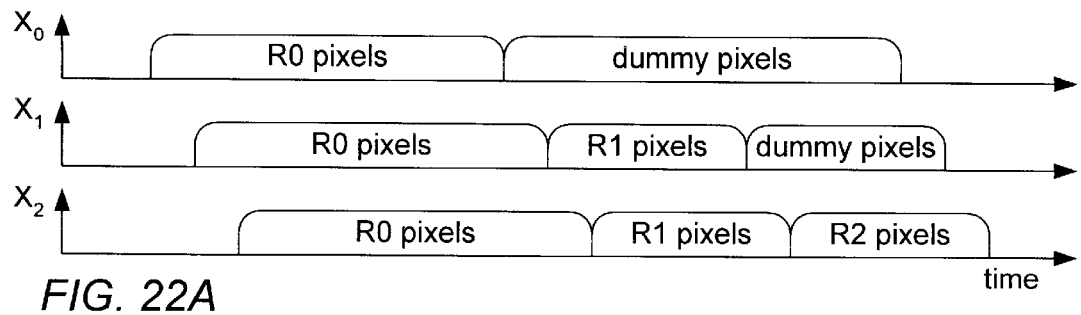
FIG. 22A illustrates the successive contribution of pixel values to video stream A by sample-to-pixel calculation units CU(0), CU(1) and CU(2) for scan line 620 of FIG. 21.

FIG. 22A illustrates the contribution of pixels to video stream A by graphics boards GB(0), GB(1) and GB(2) for scan line 620. Graphics board GB(0) contributes pixels to video stream $X_0$ during scan line 620, i.e. image pixels corresponding to region R0 during a first time segment and dummy pixels thereafter. Graphics board GB(1) receives video stream $X_0$, and mixes (or replaces) some of the dummy pixels in video stream $X_0$ with image pixels corresponding to region R1, thus generating video stream $X_1$. Graphics board GB(2) receives video stream $X_1$ and mixes (or replaces) dummy pixels in video stream $X_1$ with image pixels corresponding to region R2, thus generating video stream $X_2$. The pixel values comprising video stream $X_2$ pass through graphics boards GB(3), GB(4) and GB(5) without modification, and are displayed by display device 84A.

Figure 22B:
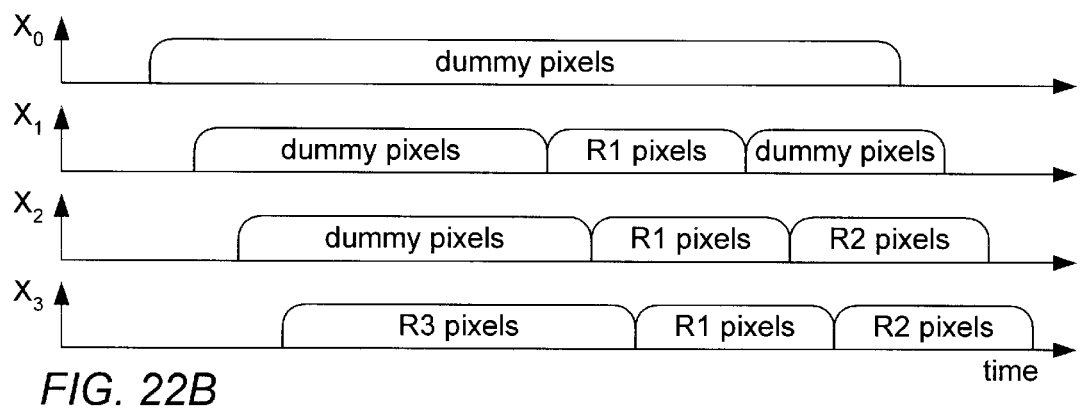
FIG. 22B illustrates the successive contribution of pixel values to video stream A by sample-to-pixel calculation units CU(0), CU(1), CU(2) and CU(3) for scan line 622 of FIG. 21.

FIG. 22B illustrates the contribution of pixels to video stream A by graphics boards GB(0), GB(1), GB(2) and GB(3) for scan line 622. Graphics board GB(0) generates video stream $X_0$ with only dummy pixels because region R0 never intersects scan line 622. Graphics board GB(1) receives video stream $X_0$ and mixes (or replaces) a middle segment of the dummy pixels, corresponding to region R1, with locally computed pixels corresponding to region R1 as shown in video stream $X_1$. Graphics board GB(2) receives video stream $X_1$ and mixes (or replaces) a last segment of dummy pixels, corresponding to region R2, with locally computed pixels corresponding to region R2 as shown in video stream $X_2$. Graphics board GB(3) receives the video stream $X_2$ and mixes (or replaces) a first segment of dummy pixels, corresponding to region R3, with locally computed pixels corresponding to region R3 as shown in video stream $X_3$. Video stream $X_3$ passes through graphics boards GB(4) and GB(5) without modification because regions R5 and R5 do not intersect scan line 622.

Figure 22C:
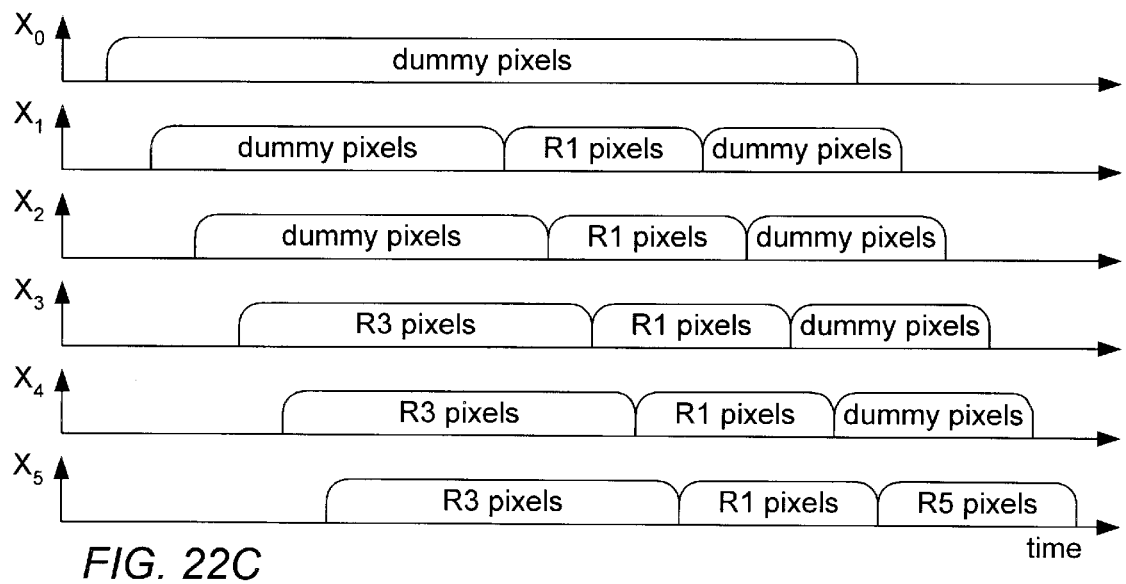
FIG. 22C illustrates the action of sample-to-pixel calculation units CU(0) through CU(5) on video stream A for scan line 624 of FIG. 21.

FIG. 22C illustrates the contribution of pixels to video stream A by graphics boards GB(0), GB(1), GB(3) and GB(5) for scan line 624. Graphics board GB(0) generates video stream $X_0$ with only dummy pixels because region R0 never intersects scan line 624. Graphics board GB(1) receives video stream $X_0$ and mixes (or replaces) a middle segment of the dummy pixels, corresponding to region R1, with locally computed pixels corresponding to region R1 as shown in video stream $X_1$. Graphics board GB(2) receives video stream $X_1$ and passes it unmodified to graphics board GB(3) in video stream $X_2$ because region R2 does not intersect scan line 624. Graphics board GB(3) receives video stream $X_2$ and mixes (or replaces) a first segment of the dummy pixels, corresponding to region R3, with locally computed pixels corresponding to region R3 as shown in video stream $X_3$. Graphics board GB(4) receives video stream $X_3$ and passes it unmodified to graphics board GB(5) in video stream $X_4$ because region R4 does not intersect scan line 624. Graphics board GB(5) receives video stream $X_4$ and mixes (or replaces) a last segment of dummy pixels, corresponding to region R5, with locally computed pixels corresponding to region R5 as shown in video stream $X_5$. Video stream $X_5$ is presented to DAC 178A for transmission to display device 84A.

For scan line 626, graphics board GB(0) generates video stream $X_0$ comprising dummy pixels. Graphics boards GB(1) and GB(2) pass the pixels of video stream $X_0$ unmodified because regions R1 and R2 do not intersect scan line 626. Graphics boards GB(3), GB(4) and GB(5) mix (or replace) corresponding segments of the dummy pixels with their locally computed dummy pixels.

As shown in FIGS. 15 and 16, video router VR(I,J) in sample-to-pixel calculation unit CU(I,J) includes a blend unit 512, a first set of multiplexors (i.e. multiplexors 516, 518, 520 and 522), and a second set of multiplexors (i.e. multiplexors 524 and 526). These components support a very flexible video environment for video signal generation. FIGS. 23A–B and FIGS. 24A–B illustrate various ways video can be made to flow through video router VR(I,J). Video router VR(I,J) comprises an upper pathway and lower pathway. Blend unit 512 resides on the upper pathway. The first set of multiplexors allow video streams to exchange pathways prior to blending. Thus, either input video stream may experience blending. The second set of multiplexors allow video streams to exchange pathways after blending. Thus, the blended stream may be presented at either the upper or lower output port. The terms upper and lower are used for convenience of discussion.

Figure 23A:
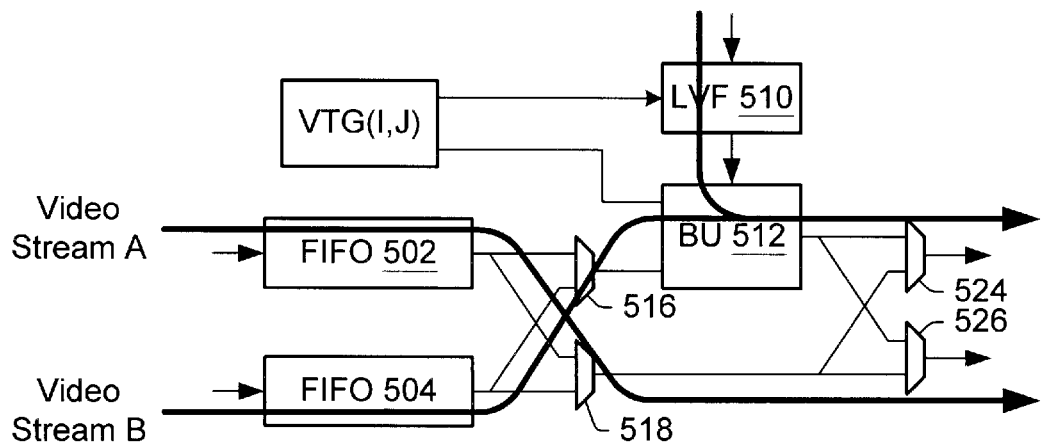
FIGS. 23A and 23B illustrate one embodiment for the mixing (or injection) of locally-computed pixels into video stream B in a generic sample-to-pixel calculation unit CU(I, J)
Figure 23B:
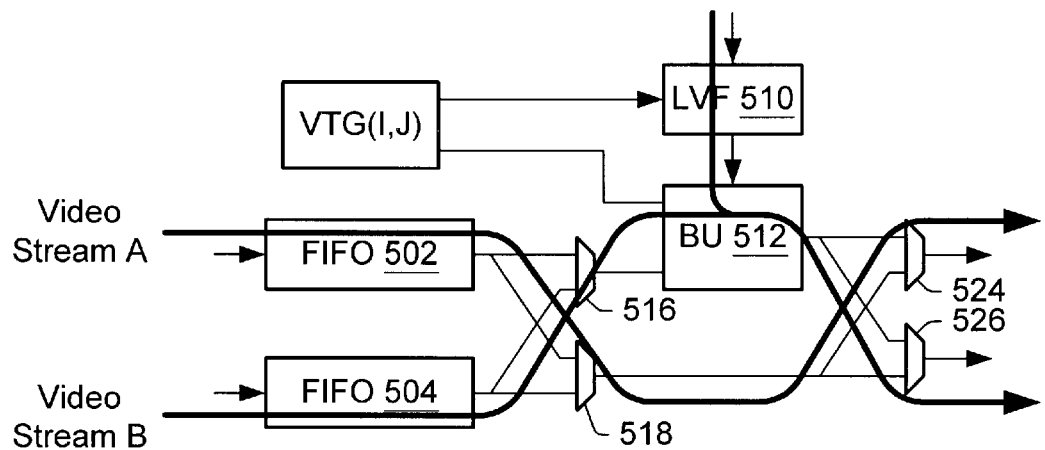

In FIG. 23A, video stream A is presented to thru-video FIFO 502 and video stream B is presented to thru-video FIFO 504. Video streams A and B exchange (upper and lower) pathway position through the first set of multiplexors. Thus, video stream B gets sent to blend unit 512. Blend unit 512 optionally (a) passes the video stream B through to its output, (b) mixes (i.e. blends) the video stream B with local pixel data from local video FIFO 510, or (c) replaces pixels from video stream B with local pixels data from local video FIFO 510. It is noted that (c) may be considered a subset of (b) because replacement is equivalent to mixing with alpha equal to zero. As shown, the optionally modified video stream B generated by blend unit 512 and the unmodified video stream A may be presented to the upper and lower output ports respectively.

The second set of multiplexors (i.e. multiplexors 524 and 526) allow the optionally modified video stream B (generated by blend unit 512) and unmodified video stream A to exchange up/down pathway position, and thus, to be presented to the lower and upper output ports respectively. The flexibility of being able to present the video streams at either output port implies that a user may connect cables to display device 84A and 84B in an arbitrary fashion.

Figure 24A:
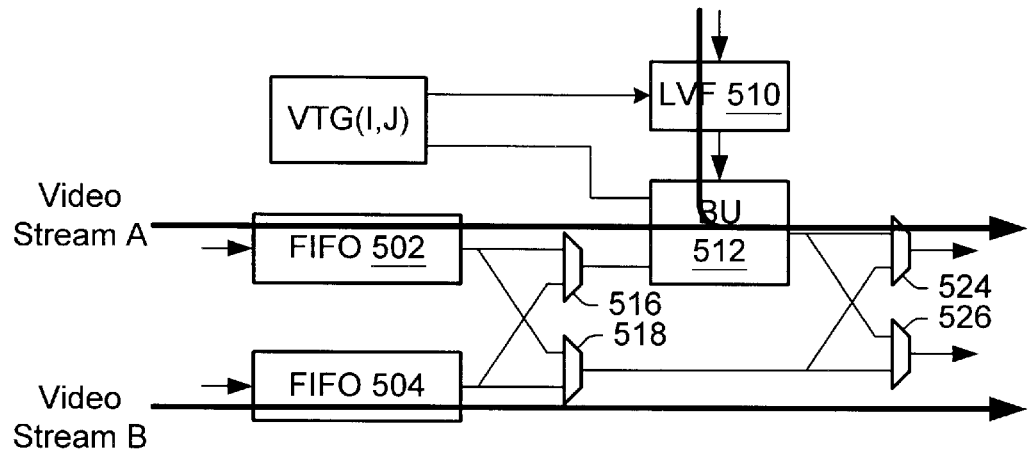
FIGS. 24A and 24B illustrate one embodiment for the mixing (or injection) of locally-computed pixels into video stream A in a generic sample-to-pixel calculation unit CU(I, J)
Figure 24B:
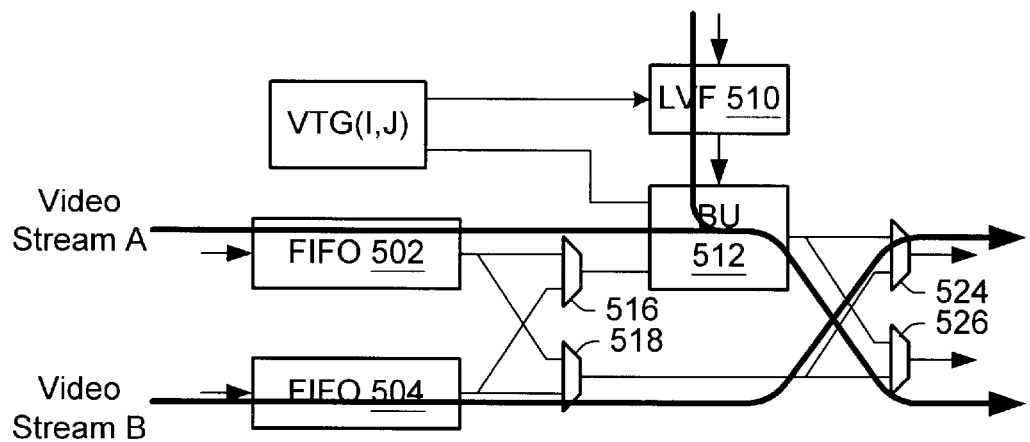

In FIG. 24A, video stream A is presented to thru-video FIFO 502, and video stream B is presented to thru-video FIFO 504. The first set of multiplexors 516 and 518 pass the video streams without positional exchange. Thus, video stream A gets sent to blend unit 512, and optionally mixed with local pixel data. The second set of multiplexors 524 and 526 pass the optionally modified stream A and unmodified stream B to the upper and lower output ports respectively. Alternatively, the second set of multiplexors 524 and 526 may perform a positional exchange so that the optionally modified stream A is presented at the lower output port and the unmodified stream B is presented to the upper output port as shown in FIG. 24B.

In one embodiment, a video router may be configured to support the generation of L video streams, where L is any desired positive integer value. The structure of such a video router may described in terms of a series of modifications of the video router of FIG. 15 as follows.

(A) The 2-to-2 crossbar switch comprised by multiplexors 516 and 518 may be replaced by a crossbar switch with L inputs and L outputs. The L inputs may couple to the output ports of L corresponding thru-video FIFOs. This crossbar switch may be referred to as the pre-blend crossbar switch.

(B) In one embodiment, the two multiplexors 520 and 522 may be replaced by a system of L multiplexors. Each of the L multiplexors may have two inputs. The first input of each of the L multiplexors may couple to a corresponding output of the pre-blend crossbar switch. The second input of each of the L multiplexors may couple to the letterbox unit 506. The topmost of the L multiplexors may send its output to the blend unit 512. The remaining (L−1) multiplexors may send their outputs to a "post-blend" crossbar switch to be described below. In another embodiment, the two multiplexors 520 and 522 may be replaced by a single multiplexor. The first input of the single multiplexor may couple to the topmost output of the pre-blend crossbar switch. The second input of the single multiplexor may couple to the letter box color unit. The output of the single multiplexor may couple to the blend unit 512.

(C) The 2-to-2 crossbar switch comprised by multiplexors 524 and 526 may be replaced by another L-to-L crossbar switch. This crossbar switch may be referred to as the post-blend crossbar switch. The topmost input of the post-blend crossbar switch may couple to the output of the blend unit 512. In the first embodiment of (B) above, the (L−1) remaining inputs of the post-blend crossbar switch may couple respectively to the outputs of the (L−1) multiplexors below the topmost multiplexor. In the second embodiment of (B) above, the (L−1) remaining inputs of the post-blend cross-bar switch may couple respectively to the (L−1) remaining outputs of the pre-blend crossbar switch.

The pre-blend crossbar switch, the system of one or more multiplexors, and the post-blend crossbar switch allow the video router to flexibly route up to L simultaneous video streams. The pre-blend crossbar switch allows the video router to switch its top-most input (received from the topmost thru-video FIFO) to any one of its lower outputs (i.e. outputs other than the topmost output). Thus, a lead video router in a given video group may send a "completed" video stream from a previous video group from the top-most thru-video FIFO to one of its lower output paths. This action effectively "saves" the completed video stream since video streams in the lower output paths do not interact with the blend unit, and thus, remain stable until they are output to a DAC or display device.

The system of one or more multiplexors allows the video router to send the stream of dummy pixels from the letterbox unit 506 to the upper output path to experience the mixing operation of blend unit 512. This occurs when the video router is the lead video router of a video group.

The post-blend crossbar switch allows the video router to permute the order of the output video streams after the blend unit 512. Thus, any of the video streams may appear at any output. This may be particular useful at the final output stage where the completed video streams are presented to display devices.

Digital video streams A and B may be passed from one sample-to-pixel calculation unit to the next using source-synchronous signaling. In other words, a pixel clock is sent along with the data from one video router to the next, so that the setup-hold relationships between data and clock are maintained as the signals propagate. All signals are received with first-in first-out buffers (i.e. thru-video FIFOs 502 and 504) whose inputs are clocked using the source-synchronous clock which came with the data, and whose outputs are clocked with a version of the clock which is supplied in parallel to all sample-to-pixel calculation units CU(I,J) (i.e. one clock per video group). See FIG. 17.

Several benefits are derived from source-synchronous clocking. First, input and output from the thru-video FIFOs 502/504 are insensitive to clock-skew, tolerating a full 360 degree phase shift between input and output clocks. Second, board-level lock distribution of a parallel clock (e.g. pixel clock A or B) to all sample-to-pixel calculation units CU(I,J) need not be phase-matched, i.e., propagation delays may be unmatched. Third, all clocking is point-to-point and unidirectional. Thus, termination is simplified and high-speed operation is assured. Fourth, the clock distribution method is insensitive to buffer delays. Thus, point-of-use clock phase locked loops (PLLs) are not needed.

In the preferred embodiment, data is transmitted through the segments $S_{-1}, S_0, S_1, S_2, \ldots, S_{V-1}$ comprising the segmented communication bus using source-synchronous signaling. The segmented communication bus operates at a frequency determined by a bus clock signal which may be different from the video pixel clocks.

Figure 25:
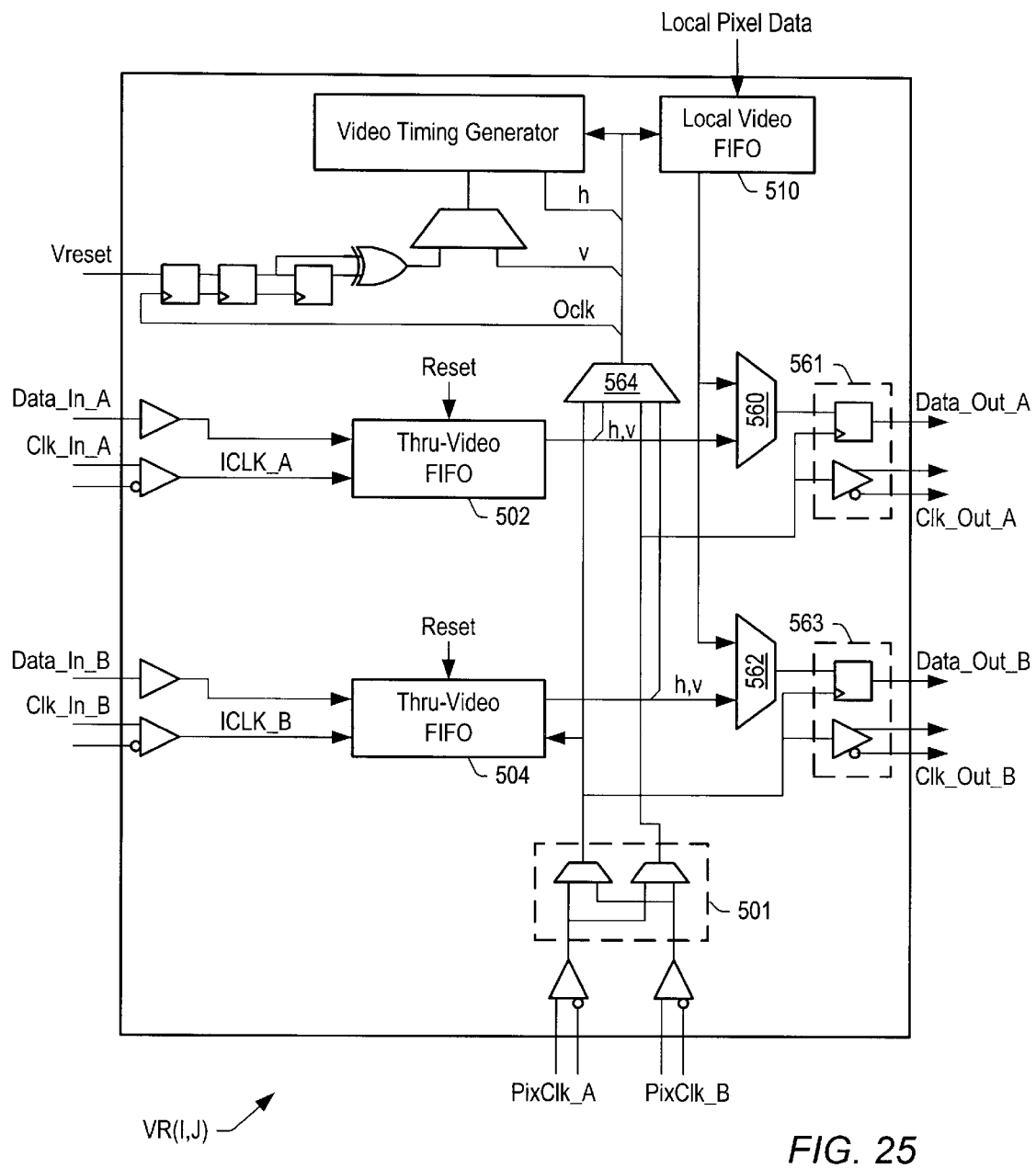
FIG. 25 is a circuit diagram for one embodiment of video router VR(I,J) in generic sample-to-pixel calculation unit CU(I,J)

Video router VR(I,J) in sample-to-pixel calculation unit CU(I,J) receives video stream A from a previous sample-to-pixel calculation unit. Video stream A comprises data signals denoted Data_In_A, and an embedded version of pixel clock A denoted Clk_In_A as shown in FIG. 25. The clock signal Clk_In_A is used to clock data signals Data_In_A into thru-video FIFO 502.

Similarly, video stream B comprises data signals denoted Data_In_B, and an embedded version of pixel clock B denoted Clk_In_B. The clock signal Clk_In_B is used to clock data signals Data_In_B into thru-video FIFO 504.

The embodiment of video router VR(I,J) shown in FIG. 25 does not include blend unit 512. Instead multiplexor 560 is used to selectively transmit pixels from either thru-video FIFO 502 or local video FIFO 510. Similarly, multiplexor 562 is used to selectively transmit pixels from either thru-video FIFO 504 or local video FIFO 510. However, the embodiment of FIG. 25 may be modified to use a blend unit in place of multiplexors 560 and 562.

Video router VR(I,J) receives pixel clock signals A and B (denoted PixClk_A and PixClk_B in the figure) which originate from genlocking pixel clocks 180A and 180B respectively. The pixel clock signals are provided to a 2-to-2 crossbar switch 501. A first output of the crossbar switch drives thru-video FIFO 502 and a corresponding output unit 561. The second output of the crossbar switch drives thru-video FIFO 504 and a corresponding output unit 563. The crossbar switch 501 allows either pixel clock to drive either data path. A multiplexor 564 receives the two clock outputs from the crossbar switch 501. The output of multiplexor 564, denoted Oclk, is presented to the video timing generator and local video FIFO 510. Multiplexor 564 selects one of the two pixel clock signals based on the video group assignment of the video router. The signal Oclk is used to clock data out of local video FIFO 510.

Multiplexor 560 couples to thru-video FIFO 502 and local video FIFO 510, and multiplexes the data streams received from these two sources into a single data stream in response to a selection signal controlled by the video timing generator. Output unit 561 receives and transmits the single data stream denoted Data_Out_A in response to one of the pixel clock signals. Observe that the output unit 561 transmits a synchronous version of the clock signal which is used to transmit data stream Data_Out_A. This synchronous clock is denoted Clk_Out_A.

Multiplexor 562 couples to thru-video FIFO 504 and local video FIFO 510, and multiplexes the data streams received from these two sources into a single data stream in response to another selection signal controlled by the video timing generator. Output unit 563 receives and transmits the single data stream denoted Data_Out_B in response to one of the pixel clock signals. Again, observe that the output unit 563 transmits a synchronous version of the clock signal which is used to transmit data stream Data_Out_B. This synchronous clock is denoted Clk_Out_B.

Figure 26:
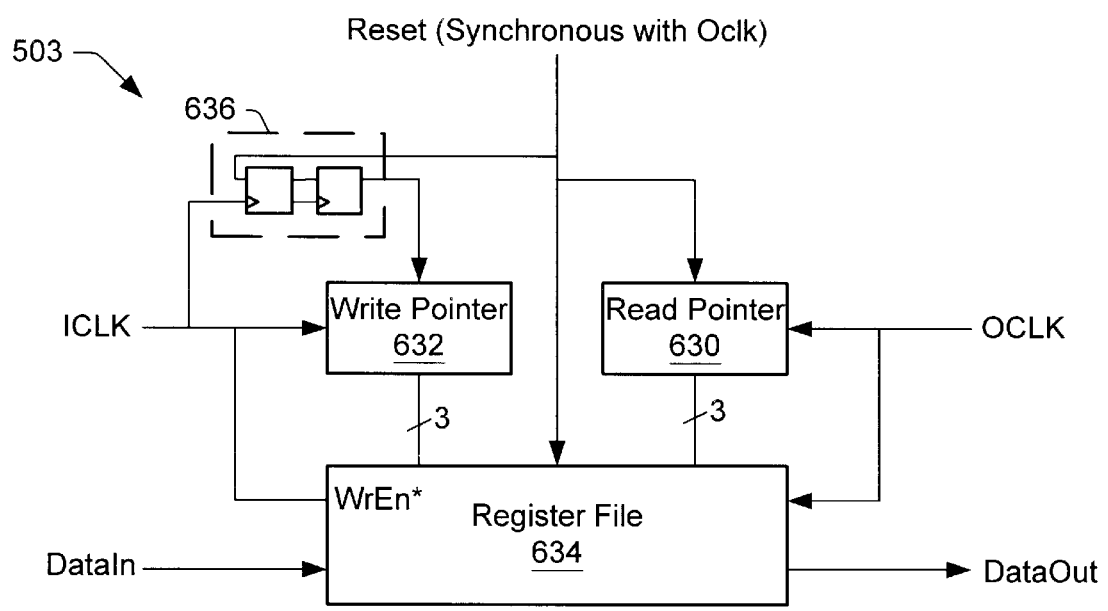
FIG. 26 is a circuit diagram for generic thru-video FIFO 503.

A detailed diagram of a thru-video FIFO 503 (which is intended to be one possible embodiment of thru-video FIFOs 502 and 504) is shown in FIG. 26. Thru-video FIFO 503 is designed to be insensitive to phase difference between ICLK and OCLK as long as the read pointer counter 630 and write pointer counter 632 are initialized far enough apart that their values cannot become equal during the time-skew, if any, between the removal of reset from the read pointer counter 630 and write pointer counter 632. This time-skew corresponds to the delay through synchronizer 636.

The output of the read pointer counter 630 comprises a read pointer which addresses a read location in register file 634. The output of write pointer counter 632 comprises a write pointer which addresses a write location in register file 634. In one embodiment, register file 634 may be a 8×40 2-port asynchronous register file. Thus, the read pointer and write pointer may be 3 bit quantities to address the eight locations of register file 634. Input data signals DataIn are clocked into register file 634 using ICLK, and data signals DataOut are clocked out of register file 634 using OCLK. Write pointer counter 632 is driven by ICLK, and read pointer counter 630 is driven by OCLK.

In the embodiment shown, the synchronizer delay is nominally 2 clocks. Therefore, initializing read pointer counter 630 to 0x0 and write pointer counter 632 to 0x6 should result, after both pointer counters are running, in a difference of about 4, i.e. approximately half the depth of the register file 634. In other words, the depth of register file 634 is chosen to be more than twice the worst-case synchronizer delay for synchronizing reset with ICLK.

In one embodiment, the reset signal provided to thru-video FIFO 503 is the logical OR of a chip reset and a software reset. The software reset is programmable via the segmented communication bus, is activated by a chip reset, and remains active after the chip reset. The reset signal is synchronized with OCLK before being presented to the reset port of the thru-video FIFO 503.

Reset clears any horizontal reset (Hreset) and vertical reset (Vreset) bits in register file 634, so that when reset is removed, register file 634 should be approximately half-full of "safe" data. This ensures that the horizontal and vertical counters of the local Video Timing Generator VTG(I,J) will not be affected by "garbage" in the thru-video FIFO 503 during or after reset.

Because ICLK and OCLK are distributed from a common source on the board, they have the same frequency. (Preferably, the distribution is done through buffers, and not via phase-locked loops.) Therefore, thru-video FIFO 503 will remain approximately half-full forever. Thru-video FIFO 503 is written and read each cycle. Hreset and Vreset are always valid in thru-video FIFO 503, as long as the video timing generator upstream is running. Hreset and Vreset will always be valid in the thru-video FIFO 503, even at times when there is no active video data flowing through thru-video FIFO 503, such as during horizontal and vertical retrace.

To guarantee ICLK/OCLK phase insensitivity, the thru-video FIFOs in a video group (e.g. the thru-video FIFOs 502 in video group A) may be set running so as to preserve the half-full state of each thru-video FIFO and the integrity of the Hreset and Vreset stream in all thru-video FIFOs during every clock subsequent to the removal of reset from the thru-video FIFOs. A software configuration routine should program all video timing generators VTG(I,J) in a video group with the same video timing parameters, and the pixel clock generator (e.g. genlocking pixel clock 180A) for that video group. The pixel clock (e.g. pixel clock A) is set running, and the software configuration routine waits to ensure that the pixel clock is stable. Then, the software configuration routine may enable the video timing generators VTG(I,J) of the video group to run. Then, beginning at the lead sample-to-pixel calculation unit CU(I,J) and working down the chain to the last sample-to-pixel calculation unit in the video group, the software configuration routine removes reset from each thru-video FIFO, one at a time. This ensures that a valid stream of Hreset and Vreset is available at the input to each thru-video FIFO from the instant reset is removed from its write pointer counter. Note that, if the SCB routing between sample-to-pixel calculation units is the same as that of the digital video routing between sample-to-pixel calculation units, it should be possible to remove reset "simultaneously" from all thru-video FIFOs by writing to the global address space associated with the video stream to which they belong. Because of the way global writes propagate on the SCB, reset will be removed from each thru-video FIFO sequentially, beginning at the head of the video chain.

For safety, it may be preferable to make the video timing generator VTG(I,J) on the lead sample-to-pixel calculation unit CU(I,J) ignore any Hreset and Vreset from the thru-video FIFO. This feature is what differentiates leader and slave video timing modes in the video timing generators VTG(I,J).

The video timing generators VTG(I,J) in the video chain may be started in an asynchronous manner, and may initially have random horizontal and vertical phase with respect to one another. They will, within a video frame time, become correctly synchronized with one another, as their horizontal and vertical counters are reset by the receipt of Hreset and Vreset signals from the head of the video chain.

In the preferred embodiment, a software configuration routine waits for the pixel clock A to stabilize and for the video routers VR(I,J) of previous graphics boards GB(0), GB(1), ..., GB(I-1) to be completely initialized before removing reset from the thru-video FIFOs 502 on graphics board GB(I). This ensures a valid stream of horizontal reset and vertical reset flows into thru-video FIFO 502 in the first sample-to-pixel calculation unit CU(I,0) of graphics board GB(I) when reset is removed from the thru-video FIFOs 502 on graphics board GB(I).

The present invention also contemplates a video signal integration system comprising a linear chain of video routers as described above. Each video router of the linear chain receives a corresponding stream of pixel values computed for a corresponding column of a global managed area. Each stream of pixel values may be computed by filtering hardware operating on super-samples (or samples) stored in one or more sample buffers. Alternatively, each stream of pixel values may arise from pixel rendering hardware which computes pixels values from graphics primitives without intervening super-samples.

It is noted that the method of integrating computed image pixels into a video stream through successive video router stages is independent of the method used to originate the video stream. In one application scenario, one or more of the video streams received by a graphics board (e.g. see input streams $X_{k-1}$ and $Y_{k-1}$) may arise from one or more digital cameras instead of from a previous graphics board. Thus, a chain of one or more graphics boards may be used to mix computed image pixels with video pixels generated by the digital camera(s). In other applications, the source video stream may originate from a VCR, a DVD unit, a received MPEG transmission, etc.

Video Readback Issues

During readback mode, readback FIFO 514 is written in a burst-oriented fashion. Writes occur when the Y count of the Y readback counter falls between the top and bottom boundaries of the readback region and the X count of the X readback counter falls between the left and right boundaries of the readback region, i.e.

$$X_{left} \leq X < X_{right}, \text{ and}$$

$$Y_{top} \leq Y < Y_{bottom}.$$

As noted above, the choice of a permissive inequality at the left (top) boundary and a strict inequality at the right (bottom) boundary is arbitrary and other choices are contemplated. The left boundary value $X_{left}$ and the right boundary value $X_{right}$ of the readback region are assigned values so that:

$$0 \leq X_{left} < X_{right} \leq N_{line},$$

where $N_{line}$ is the number of pixels in a horizontal line of the readback video channel.

Let $R_{out}$ denote the nominal rate at which bus interface 536 reads pixels from readback FIFO 514 and forwards the video pixels to control unit 140 through the segmented communication bus, i.e. the output rate that prevails when readback FIFO 514 is nonempty. Let $R_{in}$ denote the nominal rate at which video pixels are written into readback FIFO 514, i.e. the rate that prevails when both the X and Y count fall inside the readback region. In the preferred embodiment, bus interface 536, the segmented communication bus and control unit 140 are configured so that the nominal output rate $R_{out}$ is greater than or equal to the nominal input rate $R_{in}$ for all possible video formats. Thus, there are no restrictions on the width of the readback region. In other words, the left, right, top and bottom boundary values may be set so that the readback region covers up to the whole of the readback video channel. Thus, a whole frame of the readback video stream may be captured into system memory.

In some embodiments, the nominal output rate $R_{out}$ is smaller than the nominal input rate $R_{in}$. Thus, the width $(X_{right}-X_{left})$ of the readback region may be constrained so that the nominal output rate $R_{out}$ is greater than or equal to the average rate of input to readback FIFO 514. Let $N_{total}$ denote the total number of pixel clocks per horizontal period including horizontal retrace. The average rate of video pixel input to readback FIFO 514 is given by:

$$AVGR_{in} = (R_{in})(X_{right}-X_{left})/N_{total}.$$

Thus, the width $(X_{right}-X_{left})$ may be restricted to a value less than or equal to $(R_{out}/R_{in})N_{total}$.

As noted above, control unit 140 may mediate a transfer of video pixels for a selected video channel from a selected sample-to-pixel calculation unit to system memory 106 in response to a GET FRAME request received from a host software application (e.g. a user application program) running on CPU 102. The GET FRAME request may specify the selected video stream, and values for the left, right, top and bottom boundaries of the readback region. In response to the GET FRAME request, control unit 140 may transfer an indication of the selected video stream and the readback region boundary values to the selected sample-to-pixel calculation unit CU(I,J) in a FRAME READBACK request message. The selected sample-to-pixel calculation unit CU(I,J) may be the last sample-to-pixel calculation unit of the graphics board GB(I). In multi-board collaborative video embodiments, the last sample-to-pixel calculation unit CU(R−1,V−1) of the last graphics board GB(R−1) may be the most natural choice for sourcing the video pixel readback because all video streams are available in a completed form at this last sample-to-pixel calculation unit of the multi-board linear array.

Furthermore, as described above, control unit 140 includes (or couples to) a DMA engine. The DMA engine is responsible for transferring video pixels from the staging FIFO to a buffer in system memory 106. In response to the GET FRAME request, control unit 140 may arm the DMA engine for a transfer of $N_{DMA}$ video pixels to a buffer given by a destination address Start_Addr in system memory 106, where the value $N_{DMA}$ is consistent with the number of the video pixels in the readback region.

After the DMA engine has completed the transfer of the $N_{DMA}$ video pixels to a buffer in system memory 106, it asserts a Transfer Complete Signal. Control unit 140 sends a corresponding Transfer Complete message to host software in response to the Transfer Complete Signal. The host software may then access the buffer from system memory 106 in response to receiving the Transfer Complete message.

In response to the FRAME READBACK request message, the readback timing generator in the selected sample-to-pixel calculation unit is configured to transfer a portion of the next frame (i.e. the frame after the current frame) of the readback video stream as determined by the readback region boundary values received in the FRAME READBACK request. Thus, in order to acquire a frame L to system memory, host software asserts the GET FRAME request during the previous frame (L−1), i.e. some time before time $T_L-T_{setup}$, where $T_L$ is the start time for frame L, and $T_{setup}$ is a positive setup time.

In one embodiment, a user application program asserts the GET FRAME request. In another embodiment, the user application program asserts a higher level command to a system software routine also running on CPU 102, and the system software routine interprets the higher level command by transmitting one or more GET FRAME requests to control unit 140.

As mentioned above, the DMA engine may be programmed to transfer video pixels from a selected video channel to memory resident within graphics board GB(I), i.e. the graphics board in which the DMA engine resides, or one or more other graphics boards. Thus, an image generated in a first frame of a selected video channel may be used to generate samples for one or more succeeding frames of the same video channel or another video channel. For example, the DMA engine may transfer video pixels of the selected video channel to a texture memory accessible by one or more rendering units 150A–D. Rendering units 150A–D may then use the texture map generated by the readback process to render succeeding frames of a scene.

In one embodiment, one or more of rendering units 150A–D may render a frame of samples from the point of view of a light source. The frame of pixels which result from filtering these samples may be fed back to one or more of rendering memories 152A–D (through the segmented communication bus and DMA engine) and used as a shadow map for the rendering of successive frames. The successive frames may be rendered with respect to an arbitrary viewpoint.

Furthermore, in one set of embodiments, rendering units 150A–D may be partitioned into two or more subsets. One subset of rendering units may generate frames of samples that are intended primarily to support the rendering of another subset of rendering units as follows. The first subset generates a first stream of frames (comprising samples) which are filtered by a first group of the sample-to-pixel calculation units. The resulting frames of pixels are fed back to memory associated with a second subset of the rendering units. The second subset of rendering units generates a second stream of frames using the stored information in the associated memories. The second stream of frames are filtered by a second group of sample-to-pixel calculation units to generate a video stream for output to a display device. Thus, one subset of rendering units may generate supporting information (such as shadow maps or texture maps) for use by a second subset of rendering units.

The depth of readback FIFO 514 is preferably large enough to handle the transient input bursts at input rate $R_{in}$ without overflowing, but significantly smaller than a frame of video pixels. For example, in one embodiment, readback FIFO 514 has a depth of 2048 video pixels.

As mentioned above, control unit 140 programs the DMA engine with a transfer count value consistent with the number of video pixels in the readback region, and transfers the readback region boundary values to the sample-to-pixel calculation unit which is elected for sourcing the readback. If, due to some error, the elected sample-to-pixel calculation unit transfers fewer pixels than the $N_{DMA}$ pixels expected by the DMA engine, the DMA engine stalls and does not assert the Transfer Complete signal. A host software routine which asserts a GET FRAME request may discern that an error has occurred if two vertical interrupts transpire after the GET FRAME request without receiving a corresponding Transfer Complete message from control unit 140. In this case, the host software routine may take corrective action, e.g. commanding the DMA engine to reinitialize.

Conversely, if control unit 140 receives more video pixel data (in the readback process through the segmented communication bus) than the DMA engine is programmed to expect, control unit 140 may send an Overflow message to the host software routine. Control unit 140 may be configured to detect any writes to the staging FIFO after the DMA engine has completed its programmed transfer.

Multiple Readback Paths

In some embodiments, the control unit 140 and sample-to-pixel calculation units CU may be interconnected by two or more busses similar to the segmented communication bus described above. Thus, graphics system 112 may support the multiple simultaneous transfers to and/or from the sample-to-pixel calculation units. For example, graphics system 112 may simultaneously readback $N_1$ video channels through a first subset of the multiple busses, perform $N_2$ write transfers through a second subset of the multiple busses, and perform $N_3$ read transfers through a third subset of the multiple busses.

Although the embodiments presented herein have been described in considerable detail, other versions are possible. Numerous variations and modifications will become apparent to those skilled in the art once the above disclosure is fully appreciated. It is intended that the following claims be interpreted to embrace all such variations and modifications. Note that the headings used herein are for organizational purposes only and are not meant to limit the description provided herein or the claims attached hereto.

What is claimed is:

1. A graphics system comprising:
   a control unit configured for coupling to an interconnecting bus;
   a series of calculation units, wherein each of said calculation units is configured to modify a first video stream comprising pixel values;
   a segmented communication bus comprising multiple bus segments which interconnect the control unit and the calculation units;
   wherein a first of said calculation units is configured to transmit a selected subset of said pixel values of said first video stream to the control unit through the segmented communication bus;
   wherein the control unit is configured to send said selected subset of said pixel values to a data destination through the interconnecting bus;
   wherein each calculation unit of said series includes a readback timing generator, a readback buffer and a bus interface, wherein the readback timing generator includes an X counter and a Y counter which are responsive to a pixel clock signal associated with the first video stream, wherein the readback timing generator controls the storage of pixels from the first video stream into the readback buffer, wherein the bus interface forwards said pixels from the readback buffer to the control unit through the segmented communication bus.

2. The graphics system of claim 1, wherein the data destination is a system memory of a host computer system, wherein the interconnecting bus couples the graphics system to the host computer.

3. The graphics system of claim 1, wherein the control unit is configured to send a frame readback request to the first calculation unit through the segmented communication bus, where the frame readback request specifies said selected subset of said pixel values, wherein the first calculation unit is configured to perform said transmission of said selected subset of said pixel values to the control unit in response to receiving the frame readback request.

4. The graphics system of claim 1, wherein the control unit is configured to receive a get frame request from a host program executing on a host computer through the interconnecting bus, wherein the get frame request specifies said selected subset of said pixel values, wherein the control unit is configured to send the frame readback request to the first calculation unit in response to receiving the get frame request.

5. The graphics system of claim 1, wherein the selected subset of said pixel values of the first video stream comprises a rectangular region of a next frame of said second video stream, wherein the next frame is the frame that immediately follows said get frame request.

6. The graphics system of claim 1, wherein the control unit is further configured to transmit first data to memory locations internal to one or more of the calculation units through the segmented communication bus.

7. The graphics system of claim 1, wherein the control unit is further configured to send a read request to one of said calculation units through the segmented communication bus, and wherein said one calculation unit is configured to read one or more memory locations internal to said one calculation unit and transfer second data from said one or more memory locations to the control unit through the segmented communication bus.

8. The graphics system of claim 1, wherein the multiple bus segments $S_{-1}, S_0, S_1, \ldots, S_{v-1}$ and the calculation units $U_0, U_1, U_2, \ldots, U_{v-1}$ of said series are configured so that (a) bus segment $S_{-1}$ couples the control unit and an initial calculation unit $U_0$ of said series, (b) bus segment $S_{v-1}$ couples the control unit and a last calculation unit $U_{v-1}$ of said series, (c) each intermediate calculation unit $U_k$ of said series couples to a previous calculation unit $U_{k-1}$ of said series through bus segment $S_{k-1}$ and to a next calculation unit $U_{k+1}$ of said series through bus segment $S_k$, where unit integer index k ranges from 1 through V−2, where V is the number of calculation units in said series.

9. The graphics system of claim 1, wherein the control unit comprises a direct memory access (DMA) controller and a staging FIFO, wherein the staging FIFO is configured temporarily store said selected subset of pixel values received from the segmented communication bus, wherein the DMA controller is programmable to transfer the selected subset of pixel values to the data destination through the interconnecting bus.

10. The graphics system of claim 1 further comprising a rendering unit and a sample buffer, wherein the rendering unit is configured to generate samples in response to received graphics data and to store the samples into the sample buffer, wherein each of the calculation units is configured read a portion of said samples from the sample buffer, to compute corresponding local pixels in response to said portion of said samples, and to modify the first video stream by contributing the local pixels to the first video stream.

11. The graphics system of claim 10 further comprising a rendering memory, wherein the data destination is the rendering memory, wherein the rendering unit is configured to read the rendering memory and apply one or more of said selected subset of pixel values accessed from the rendering memory to said samples prior to storing said samples into the sample buffer.

12. A graphics system comprising:
   a control unit configured for coupling to an interconnecting bus;
   a set of calculation units coupled in a series and configured to generate two or more video streams, wherein each calculation unit of said series is programmably assigned to contribute corresponding pixel values to one of said two or more video streams;
   wherein the control unit and the set of calculation units are coupled in a closed chain configuration by a segmented communication bus comprising multiple bus segments;
   wherein the control unit is configured to transmit a readback request to a selected one of said calculation units through the segmented communication bus, wherein the readback request designates one of the video streams;
   wherein the selected calculation unit is configured to transmit a selected portion of a next video frame of the designated video stream to the control unit through the segmented communication bus;
   wherein the control unit is further configured to transmit the selected portion of the next video frame of the designated video stream to a destination memory block through the interconnecting bus;
   wherein each calculation unit of said set includes a readback timing generator, a readback buffer and a bus interface, wherein the readback timing generator includes an X counter and a Y counter which are responsive to a pixel clock signal associated with the designated video stream, wherein the readback timing generator controls the storage of pixels from the designated video stream into the readback buffer, wherein the bus interface forwards said pixels from the readback buffer to the control unit through the segmented communication bus.

13. The graphics system of claim 12, wherein the destination memory block resides in a system memory of a host computer system.

14. The graphics system of claim 12, wherein the control unit is configured to receive a get frame request from a host computer through the interconnecting bus, wherein the get frame request specifies the selected calculation unit from among said set of calculation units, wherein the control unit is configured to transmit the readback request to the selected calculation unit in response to receiving the get frame request.

15. The graphics system of claim 14, wherein the get frame request also specifies the designated video stream and the selected portion of the next video frame of the designated video stream.

16. The graphics system of claim 12, wherein the multiple bus segments $S_{-1}, S_0, S_1, \ldots, S_{v-1}$ and the set of calculation units $U_0, U_1, U_2, \ldots, U_{v-1}$ are configured so that each calculation unit $U_k$ receives a data packet from bus segment $S_{k-1}$ and forward the data packet onto bus segment $S_k$ if the data packet is not targeted for calculation unit $U_k$.

17. The graphics system of claim 12, wherein the readback timing generator is configured to assert the write enable signal during the next video frame in response to an X count value of the X counter and a Y count value of the Y counter falling within a readback region defined by the readback request, wherein the selected portion of the next video frame corresponds to the readback region.

18. The graphics system of claim 12, wherein each bus segment of the segmented communication bus employs source synchronous signaling.

19. The graphics system of claim 12, wherein the selected calculation unit is the last calculation unit in said series.

20. A graphics system comprising:
a local video buffer configured to receive and store local pixels corresponding to an assigned column of a first display area;
a blend unit configured to receive a first video stream comprising first pixels and to mix the first pixels with the local pixels from the local video buffer, thus generating a modified video stream;
a readback multiplexor configured to receive the modified video stream and a second video stream, and to output a readback video stream equal to a selected one of the modified video stream or the second video stream;
a readback buffer configured to store pixels of the readback video stream in response to one or more assertions of a write enable signal
a bus interface unit configured to read the pixels from the readback video stream, and to transmit the pixels of the readback video stream onto a first bus.

21. The graphics system of claim 20 further comprising:
an output crossbar network comprising two inputs and two outputs, wherein the output crossbar network is configured to receive the modified video stream and the second video stream at the two inputs respectively and two pass the modified video stream and second video stream to the two outputs with or without exchange depending on a control select signal.

22. A method for capturing video data, the method comprising:
(a) rendering graphics data to form samples;
(b) storing the samples into a sample buffer;
(c) a series of calculation units accessing and filtering corresponding sets of samples from the sample buffer to generate a stream of video pixels;
(d) generating a video signal from the stream of video pixels;
(e) providing the video signal to a video output port;
(f) a first of said series of calculation units directing a selected portion of the stream of video pixels for storage into a buffer in response to receiving a frame capture request;
(g) forwarding said selected portion of the stream of video pixels from the buffer to a destination memory;
wherein (f) and (g) are performed in parallel with (d) and (e);
wherein said directing comprises incrementing an X counter in response to pixel clock signal associated with the stream of video pixels, incrementing a Y counter in response to the X counter attaining an upper limit value corresponding to an end of a horizontal line, comparing values of the X counter and Y counter to boundary values defining a readback region, and asserting a write enable signal in response to the X counter and the Y counter achieving values in the readback region.

23. The method of claim 22, wherein said buffer has a storage capacity which is less than a frame of said video pixels.

24. The method of claim 22, wherein said frame capture request specifies said selected portion of the stream of video pixels for storage into the buffer.

25. A graphics system comprising:
a rendering unit configured to generate samples in response to received graphics data;
a sample buffer configured to store said samples;
a series of calculation units configured to access and filter said samples from the sample buffer to generate one or more streams of video pixels for output to one or more display devices, wherein a first calculation unit of said calculation units is configured to direct a selected portion of a selected one of said one or more streams to a buffer in parallel with said generation of the one or more streams of video pixels;
a transfer unit configured to forward said selected portion of the selected one of said one or more streams from the buffer to a destination memory;
a segmented communication bus comprising multiple bus segments which interconnect the transfer unit and the calculation units;
wherein each calculation unit of said series includes a readback timing generator, a readback buffer and a bus interface, wherein the readback timing generator includes an X counter and a Y counter which are operable to respond to a pixel clock signal associated with the selected video stream, wherein the readback timing generator is configured to control the storage of pixels from the selected video stream into the readback buffer, wherein the bus interface is configured to forward said pixels from the readback buffer to the transfer unit through the segmented communication bus.

26. The graphics system of claim 25, wherein the buffer has a storage capacity which is less than a frame of said selected one of the one or more streams.

27. The graphics system of claim 25, wherein the first calculation unit is configured to direct said selected portion of the selected stream to the buffer in response to receiving a frame readback request which specifies said selected one of the one or more streams which is selected for readback to the destination memory, and said selected portion of said selected stream.

* * * * *